US010690560B2

(12) United States Patent
Wiseman

(10) Patent No.: US 10,690,560 B2
(45) Date of Patent: Jun. 23, 2020

(54) DIRECTIONAL DIFFERENTIAL PRESSURE DETECTOR HAVING AN ADJUSTABLE PIVOT ARM

(71) Applicant: Brian M. Wiseman, Newbury, MA (US)

(72) Inventor: Brian M. Wiseman, Newbury, MA (US)

( * ) Notice: Subject to any disclaimer, the term of this patent is extended or adjusted under 35 U.S.C. 154(b) by 368 days.

(21) Appl. No.: 15/821,440

(22) Filed: Nov. 22, 2017

(65) Prior Publication Data

US 2018/0164174 A1 Jun. 14, 2018

Related U.S. Application Data

(60) Provisional application No. 62/426,172, filed on Nov. 23, 2016.

(51) Int. Cl.
*G01P 13/00* (2006.01)
*G01L 19/10* (2006.01)
(Continued)

(52) U.S. Cl.
CPC ............... *G01L 19/10* (2013.01); *G01C 9/02* (2013.01); *G01L 13/00* (2013.01); *G01L 13/04* (2013.01);
(Continued)

(58) Field of Classification Search
None
See application file for complete search history.

(56) References Cited

U.S. PATENT DOCUMENTS

| 2,542,442 A | 2/1951 | Weber |
| 3,930,568 A | 1/1976 | Levey |

(Continued)

FOREIGN PATENT DOCUMENTS

| GB | 394 145 A1 | 6/1933 |
| WO | WO 98/52050 A1 | 11/1998 |
| WO | WO 2015/179516 A1 | 11/2015 |

OTHER PUBLICATIONS

International Preliminary Report on Patentability for International Application No. PCT/US2017/063090, dated Jun. 6, 2019.
(Continued)

*Primary Examiner* — Harshad R Patel
(74) *Attorney, Agent, or Firm* — Wolf, Greenfield & Sacks, P.C.

(57) ABSTRACT

Methods and apparatuses for indicating the presence of a threshold directional differential pressure between separated adjacent spaces. A conduit contains a movable element that indicates whether the pressure difference between the two spaces is at least as high as a threshold pressure difference. The apparatus is adjustable to have different threshold set points by adjusting the pivot arm inclination. The device may include at least two pivot axes. A rotating base may rotate relative to the barrier or wall, and a pivot arm may be attached and rotate relative to the rotating base. With the rotating base set at a first rotation angle, the pivot arm may be adjustable within a single plane. When the rotating base is set at a second rotation angle, the pivot arm may be adjustable within a different single plane. The device may include a single pivot axis where a pivot arm is parallel to the wall and rotates about a horizontal axis perpendicular to the wall.

20 Claims, 45 Drawing Sheets

(51) Int. Cl.
    *G01L 19/00*     (2006.01)
    *G01C 9/02*     (2006.01)
    *G01L 13/00*     (2006.01)
    *G01L 13/04*     (2006.01)
    *G01P 13/02*     (2006.01)

(52) U.S. Cl.
    CPC ...... *G01L 19/0092* (2013.01); *G01P 13/0006* (2013.01); *G01P 13/02* (2013.01)

(56) References Cited

U.S. PATENT DOCUMENTS

| | | |
|---|---|---|
| 4,040,650 A | 8/1977 | Shotbolt |
| 4,139,466 A | 2/1979 | Rosaen |
| 4,154,101 A | 5/1979 | Buchanan et al. |
| 4,271,693 A | 6/1981 | Bute |
| 4,486,744 A | 12/1984 | Pratt et al. |
| 4,679,827 A | 7/1987 | Law |
| 4,787,251 A | 11/1988 | Kolodiski |
| 4,819,577 A | 4/1989 | Campau |
| 5,195,376 A | 3/1993 | Banks et al. |
| 5,291,182 A | 3/1994 | Wiseman |
| 5,410,298 A | 4/1995 | Wiseman |
| 5,461,910 A | 10/1995 | Hodson |
| 5,589,643 A | 12/1996 | Pyle |
| 5,661,461 A | 8/1997 | Wiseman |
| 5,787,919 A | 8/1998 | Pyle |
| 5,798,697 A | 8/1998 | Wiseman |
| 5,981,877 A | 11/1999 | Sakata et al. |
| 6,477,896 B1 | 11/2002 | Nyberg |
| 6,506,974 B2 | 1/2003 | Nakata |
| 6,569,219 B1 | 5/2003 | Connor et al. |
| 7,891,311 B2 | 2/2011 | Logan et al. |
| 8,003,014 B2 | 8/2011 | Breay et al. |
| 8,910,516 B2 | 12/2014 | Wiseman |
| 9,395,260 B2 | 7/2016 | Pyle |
| 10,191,077 B2 | 1/2019 | Wiseman |
| 2009/0301213 A1 | 12/2009 | Barmettler et al. |
| 2011/0094294 A1 | 4/2011 | Townsend et al. |
| 2014/0260594 A1 | 9/2014 | Wiseman |
| 2015/0059464 A1 | 3/2015 | Wiseman |
| 2017/0067929 A1 | 3/2017 | Wiseman |
| 2019/0154724 A1 | 5/2019 | Wiseman |

OTHER PUBLICATIONS

International Search Report and Written Opinion for International Application No. PCT/US2017/063090, dated Feb. 5, 2018.

DIRECTIONAL DIFFERENTIAL PRESSURE DETECTOR HAVING AN ADJUSTABLE PIVOT ARM

CROSS-REFERENCE TO RELATED APPLICATIONS

This application claims the benefit under 35 U.S.C. § 119(e) of U.S. Provisional No. 62/426,172, filed Nov. 23, 2016, which is hereby incorporated by reference in its entirety.

FIELD

Aspects of the present disclosure relate generally to methods and apparatuses for detecting the presence of a directional differential pressure.

DISCUSSION OF RELATED ART

Various applications within hospitals, laboratories, pharmaceutical facilities, clean room facilities, etc., often require a particular direction of air flow to be maintained, such as between neighboring rooms, compartments, corridors, ducts, or other spaces. The pressure of a room relative to adjacent space(s) will determine the net direction of air flow through an opening into or out of the room.

For example, a hospital operating room may be kept under a positive pressure so that air flows out of the room, thereby preventing unfiltered or contaminated air from entering the room from adjacent spaces. This positive pressure is accomplished by supplying clean air to the operating room at a greater flow rate than the flow rate at which air is exhausted from the room by the room's ventilation system.

Or, if a hospital patient is infected with an airborne communicable pathogen, a patient isolation room may be kept under a negative pressure which is accomplished when the rate at which potentially contaminated air is exhausted from the room is greater than the rate at which air is supplied to the room from the room's ventilation system. Such a negative pressure arrangement, where the room is under a comparatively lower pressure than its immediate surroundings, prevents potentially contaminated air from exiting the room and escaping into surrounding space(s).

The net differential pressure between rooms will cause air to flow through an opening from one room to the other in the direction from a higher pressure to a lower pressure. The desired degree of differential pressure to be maintained between rooms, compartments, corridors, etc. will vary, depending on the application.

Accordingly, it is often desirable to closely monitor the general direction of potential or actual air flow between compartments as well as the particular magnitude of differential pressure causing the net air flow.

SUMMARY

According to one embodiment a device for indicating a presence of a directional differential pressure between a first space and a second space separated from the first space by a barrier is provided. The device permits fluidic pressure connection between second space and a pivot arm in the first space. The device includes a first conduit arranged to extend through at least a portion of the barrier separating the first space and the second space. The device further includes a rotating base which is rotatable relative to the first conduit. A pivot arm is arranged to form a fluidic pressure connection with the first conduit. The pivot arm is rotatably attached to the rotating base to permit adjustment of an inclination of the pivot arm relative to a horizontal plane among a plurality of inclination angles in which a first, vertically lower region of the pivot arm is vertically lower than a second, vertically higher region of the pivot arm. The device also includes at least one movable element disposed within the pivot arm and movable from the first, vertically lower region of the pivot arm to the second, vertically higher region of the pivot arm in response to a directional differential pressure between the first and second spaces.

According to one embodiment, a device for indicating directional differential pressure between two spaces is disclosed. The device permits fluidic pressure connection of a first space and a second space separated by a barrier. The device includes a first conduit arranged to extend through at least a portion of the barrier separating the first space and the second space. Also included is a pivot arm fluidically connected to the first conduit and arranged to pivot relative to the first conduit to adjust an inclination of the pivot arm within a vertical plane and relative to a horizontal plane among a plurality of inclination angles in which a first, vertically lower region of the pivot arm is vertically lower than a second, vertically higher region of the pivot arm, wherein the first conduit and the pivot arm form a passageway for fluid. A transition region is present where the passageway is first surrounded by the pivot arm when traveling in a direction toward the pivot arm, wherein the pivot arm is arranged such that pivoting the pivot arm within the vertical plane does not change a location of the transition region relative to the first conduit. The device also includes at least one movable element disposed within the pivot arm and movable from the first, vertically lower region of the pivot arm to the second, vertically higher region of the pivot arm in response to a directional differential pressure between the first and second spaces.

According to another embodiment, a device for indicating directional differential pressure between two spaces is disclosed. The device permits fluidic pressure connection of a first space and a second space separated by a barrier. The device includes a first conduit arranged to extend through at least a portion of the barrier separating the first space and the second space. Also included is a pivot arm fluidically connected to the first conduit and arranged to pivot relative to the first conduit about a pivot axis, wherein pivoting the pivot arm about the pivot axis adjusts an inclination of the pivot arm relative to a horizontal plane among a plurality of inclination angles in which a first, vertically lower region of the pivot arm is vertically lower than a second, vertically higher region of the pivot arm, and wherein pivoting the pivot arm about the pivot axis does not change a direction of the pivot axis, wherein the first conduit and the pivot arm form a passageway for fluid. A transition region exists where the passageway is first surrounded by the pivot arm when traveling in a direction toward the pivot arm, wherein the pivot arm is arranged such that pivoting the pivot arm within the vertical plane does not change a location of the transition region relative to the first conduit. The device also includes at least one movable element disposed within the pivot arm and movable from the first, vertically lower region of the pivot arm to the second, vertically higher region of the pivot arm in response to a directional differential pressure between the first and second spaces.

According to a further embodiment, a device for indicating directional differential pressure between two spaces is disclosed. The device permits fluidic pressure connection of a first space and a second space separated by a barrier. The device includes a first conduit arranged to extend through at least a portion of the barrier separating the first space and the second space. Also included is a pivot arm fluidically connected to the first conduit and arranged to pivot relative to the first conduit to adjust an inclination of the pivot arm within a vertical plane and relative to a horizontal plane among a plurality of inclination angles in which a first, vertically lower region of the pivot arm is vertically lower than a second, vertically higher region of the pivot arm. The device forms a fluid flow passageway from the first conduit to an entrance of the pivot arm, and the pivot arm is arranged such that pivoting the pivot arm does not change a path of the fluid flow passageway from the first conduit to the pivot arm entrance. The device includes at least one movable element disposed within the pivot arm and movable from the first, vertically lower region of the pivot arm to the second, vertically higher region of the pivot arm in response to a directional differential pressure between the first and second spaces.

According to yet another embodiment, a device for indicating directional differential pressure between two spaces is disclosed. The device permits fluidic pressure connection of a first space and a second space separated by a barrier. The device includes a first conduit arranged to extend through at least a portion of the barrier separating the first space and the second space. Also included is a pivot arm fluidically connected to the first conduit and arranged to pivot relative to the first conduit to adjust an inclination of the pivot arm within a vertical plane and relative to a horizontal plane among a plurality of inclination angles in which a first, vertically lower region of the pivot arm is vertically lower than a second, vertically higher region of the pivot arm, wherein the pivot arm is pivotable to an inclination angle of at least 10° relative to the horizontal plane. The device includes at least one movable element disposed within the pivot arm and movable from the first, vertically lower region of the pivot arm to the second, vertically higher region of the pivot arm in response to a directional differential pressure between the first and second spaces.

According to another embodiment, a device for indicating directional differential pressure between two spaces is disclosed. The device permits fluidic pressure connection of a first space and a second space separated by a barrier. The device includes a first conduit arranged to extend through at least a portion of the barrier separating the first space and the second space. Also included is a pivot arm fluidically connected to the first conduit and arranged to pivot relative to the first conduit to adjust an inclination of the pivot arm within a vertical plane and relative to a horizontal plane among a plurality of inclination angles in which a first, vertically lower region of the pivot arm is vertically lower than a second, vertically higher region of the pivot arm. A level is positioned to indicate whether an axis of rotation of the pivot arm is horizontal. A directional differential set point indicator is configured to indicate a threshold directional differential pressure between first and second spaces that is sufficient to cause the at least one movable element to move from the first, vertically lower region of the pivot arm to the second, vertically higher region of the pivot arm, based on the angle of inclination of the pivot arm. The device also includes at least one movable element disposed within the pivot arm and movable from the first, vertically lower region of the pivot arm to the second, vertically higher region of the pivot arm in response to a directional differential pressure between the first and second spaces.

According to a further embodiment, a device for indicating directional differential pressure between two spaces is provided. The device permits fluidic pressure connection of a first space and a second space separated by a barrier. The device includes a first conduit arranged to extend through at least a portion of the barrier separating the first space and the second space. Also included is a pivot arm fluidically connected to the first conduit and arranged to pivot relative to the first conduit to adjust an inclination of the pivot arm within a vertical plane and relative to a horizontal plane among a plurality of inclination angles in which a first, vertically lower region of the pivot arm is vertically lower than a second, vertically higher region of the pivot arm. A level is positioned to indicate whether an axis of rotation of the pivot arm is horizontal. A differential set point indicator is configured to indicate a threshold differential pressure between first and second spaces that is sufficient to cause the at least one movable element to move from the first, vertically lower region of the pivot arm to the second, vertically higher region of the pivot arm, based on the angle of inclination of the pivot arm. At least one movable element is disposed within the pivot arm and movable from the first, vertically lower region of the pivot arm to the second, vertically higher region of the pivot arm in response to a directional differential pressure between the first and second spaces.

Advantages, novel features, and objects of the present disclosure will become apparent from the following detailed description of the present disclosure when considered in conjunction with the accompanying drawings, which are schematic and which are not intended to be drawn to scale. For purposes of clarity, not every component is labeled in every figure, nor is every component of each embodiment of the present disclosure shown where illustration is not necessary to allow those of ordinary skill in the art to understand the present disclosure.

BRIEF DESCRIPTION OF THE DRAWINGS

The accompanying drawings are not intended to be drawn to scale. In the drawings, each identical or nearly identical component that is illustrated in various figures is represented by a like numeral. Various embodiments of the present disclosure will now be described, by way of example, with reference to the accompanying drawings. The embodiments and drawings shown are not intended to narrowly define the present disclosure.

DETAILED DESCRIPTION

Figure 1:
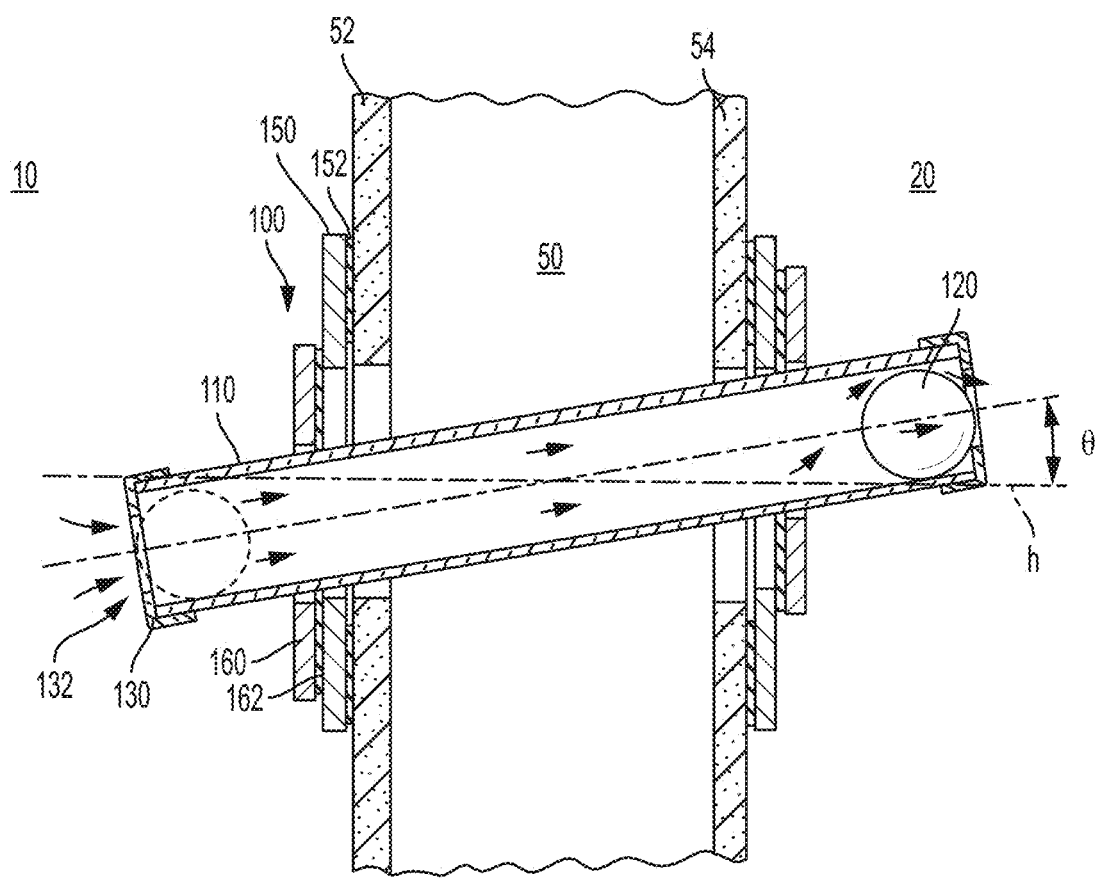
FIG. 1 is a cross-sectional view of a device subject to a differential pressure in accordance with some embodiments.

The present disclosure relates to devices and systems which provide an indication of potential or actual directional air flow and/or whether a particular degree of directional differential pressure exists between spaces (e.g., two neighboring rooms or a room and an adjacent corridor) separated by a barrier such as a wall. In some embodiments, the device includes one or more elongated conduits with openings, for example, located at opposite ends. As described further herein, the conduit(s) may extend through the wall, and adjustability of the incline of portions of the device may reside on both sides or a single side of the wall. At least one ball, or other movable element, is disposed within a passageway of the conduit and moves freely back and forth along at least a portion of the length of the conduit. Restraints or end stops located at the ends or at other areas of the conduit to contain the ball within the conduit. The end stops may have openings that allow fluid (e.g., air, gas, liquid, water vapor) to flow through the passageway of the conduit from one end to an opposite end.

Systems are available for detecting whether a differential pressure between two spaces (e.g., between a clean room and an adjacent corridor) is above a threshold pressure difference. In some conventional systems, an inclined single conduit passes from one space to another through a wall, and a movable ball is placed in the conduit. On one side of the wall, for example the corridor side, the conduit has a lower region near the wall and a higher region away from the wall. Gravity pulls the ball toward the lower region of the conduit near the wall. As the pressure in the clean room is raised higher than the corridor pressure, air pressure and/or air flow apply forces against the ball. Once the pressure difference between the clean room and the corridor reaches a threshold level, the force of the air against the ball overcomes the force of gravity, and the ball moves to higher region of the conduit. By observing the presence of the ball in the higher region, a user can quickly see that the pressure difference between the two spaces equals or exceeds the desired directional differential pressure threshold level. To change the threshold pressure difference, the angle of inclination of the conduit is adjusted such that the amount of gravitational force on the ball in the direction of the conduit is adjusted. A greater incline of the conduit in which the ball travels requires a greater pressure differential between the two rooms to overcome gravity and move the ball from a lower to a higher region in some embodiments.

Applicant has appreciated that it would be beneficial to provide a differential pressure monitoring system where the threshold value of directional differential pressure detection is adjustable from one side of the wall (or other barrier) and/or the system can account for the wall being out of plumb. In some embodiments, a monitoring system includes a pivot arm (or multiple pivot arms) on one side of the wall, and the pivot arm includes a set point indicator that measures an angle of inclination using gravity instead of a measured reference to another physical structure. In some embodiments, the arrangement of the pivot arm relative to the system permits pivoting of the pivot arm within a vertical plane. The pivot arm may include a conduit which contains a movable element.

By providing independent adjustment of the inclination of a conduit on one side of the wall, adjustments to the threshold directional differential pressure level can be made without having to access the device on both sides of the wall. Such an arrangement can be especially helpful when various protocols must be followed to enter a room being monitored.

The walls or other barriers on which the monitoring devices disclosed herein are being installed may be out of plumb, that is, not strictly vertical. Applicant has recognized that in such circumstances, pivot arms with angle indicators and/or threshold pressure indicators may provide inaccurate information if the indicators are based on an assumption that the wall is plumb. Embodiments disclosed herein provide arrangements where accurate threshold directional differential pressure adjustment can be achieved even when the device is installed on an out-of-plumb wall. For example, in some embodiments, a conduit with the movable element therein is adjustable from one side of the wall, the conduit is pivotable within a vertical plane, and a set point indicator is tied to gravity rather than being based on markings on portions of the device that are static relative to the wall. A device that links a threshold set point to markings on the wall and/or markings on portions of the device that do not move relative to the wall may cause errors when mounted to an out-of-plumb wall. Additionally, if a conduit does not pivot in a single plane, improper initial mounting of the device to a wall may cause inclination measurement errors.

In some embodiments, one or more levels, such as bubble levels, may be used to confirm proper device installation and/or to provide an indication as to set points that are based on the vertical inclination of a conduit relative to the horizontal plane. In some embodiments, the bubble level, or other measurement device, is used as a directional differential pressure set point indicator.

Certain embodiments disclosed herein provide a large range of available inclination angles. By providing a large angle range, a large range of threshold differential pressure set points are available. In some embodiments, the device is also arranged to permit pivoting such that the conduit containing the movable element (e.g., a ball), can be placed in different orientations relative to its associated wall (or other barrier), in some cases while maintaining its same inclination relative to a horizontal plane. In some embodiments, the conduit that is perpendicular to an axis of rotation may be rotated a full 360° about the axis of rotation.

As mentioned above, various embodiments disclosed herein may include a directional differential pressure set point indicator associated with the conduit that contains the moveable element. The set point indicator may be configured to correlate the incline of the conduit with respect to the earth's gravitational horizontal or vertical plane to a respective threshold directional differential pressure between the two adjacent spaces—the threshold directional pressure difference being sufficient to cause the movable element to move from a lower region of the inclined conduit to a higher region. The directional differential pressure set point indicator may include, for example, a bubble vial, a rotating weighted pendulum pointer, or any other suitable component that responds to the incline of the conduit. The differential pressure set point indicator may be appropriately calibrated such that the markings on the directional differential pressure set point indicator correspond to threshold directional pressure differences that may exist between spaces separated by a wall or other barrier. Accordingly, the directional differential pressure set point indicator may provide an indication of what angle of conduit inclination corresponds to the directional threshold differential pressure set point between the two separated spaces.

In some embodiments, when installed, a conduit extends from one side of a barrier, e.g., wall to the other side such that opposite ends of the conduit extend outwardly into neighboring spaces that are separated by the wall. In some embodiments, only one end of the conduit extends outwardly from the wall. Fluid (such as air) is permitted to flow between the spaces through the conduit in some embodiments. When the conduit is inclined, and there is little to no net differential pressure between the spaces to which opposite ends of the conduit extend, the force of gravity acting on the ball causes the ball to move toward or remain at the lower end of the conduit.

In some embodiments, the incline of the conduit is such that the lower end of the conduit is placed in the room desired to be of a higher pressure relative to the adjacent communicating room via the conduit where the higher end of the conduit resides. In this arrangement, the desired direction of potential or actual air flow caused by this pressure differential will be from the higher pressure room with the lower end of the conduit toward the lower pressure room with the higher end of the conduit.

The pressure difference required to move the ball from a home position (the ball's position when there is no pressure difference between the rooms) can vary based at least on the physical features of the conduit (e.g., passageway diameter, straightness/curvature, surface finish), physical features of the ball (e.g., diameter, weight, surface finish), degree of incline of the conduit, fluid properties of the media between compartments, and the orifice sizes at the end stops. In many cases, each of the above parameters is known to a sufficient degree such that threshold directional pressure differences can be linked to the angle of inclination. In some embodiments, balls of different weights may be used to adjust the threshold pressure differences. In such embodiments, the conduit angle may or may not be adjustable.

As an example, for a hospital isolation room occupied by a patient with an infectious disease that is capable of airborne transmission, it may be desirable to keep the room at a negative differential pressure relative to one or more adjacent rooms, so as to substantially prevent airborne transmission of the disease to an adjacent room. In such an arrangement, the room's ventilation system exhausts more air than is supplied within it to an extent that the negative pressure is of a greater magnitude than any adjacent space. Thus, the conduit may be installed such that the end of the conduit that extends toward the isolation room (e.g., extends inside the isolation room) is at a higher position than the opposite end of the conduit that extends toward a space immediately exterior to the isolation room (e.g., into a corridor, a compartment, duct, or another room).

When the net directional differential pressure between the isolation room and the outside space is zero (e.g., a door between the room and the outside space is opened), or the pressure on the room is greater than the adjacent spaces, the ball will fall to the lower end of the conduit such that an observer inside the isolation room would not be able to view the ball; and where the opposite end of the conduit is located within the neighboring room, it follows that an observer outside the isolation room in the neighboring room would be able to see the ball. Or, if the conduit is substantially located within the isolation room (e.g., in a turret-type configuration), the ball may fall to the lower end of the conduit yet remain within the isolation room (e.g., exposed or covered from view), or within the wall cavity between rooms. When the appropriate degree of negative pressure is applied to the room, the ball moves upwardly within the conduit to the vertically higher end. That is, the difference between the pressure of the isolation room and the pressure in the outside space on the opposite side of the wall causes forces on the ball are sufficient to move the ball upwardly where it can be conspicuously viewed from inside the isolation room— thereby indicating that at least the appropriate direction of air flow through an opening between the rooms and degree of negative pressure is applied to the isolation room. In the case of a hospital operating room that is required to exhibit a positive pressure, so as to substantially prevent potentially contaminated air from flowing into a room from a surrounding spaces. The conduit may be installed such that the end of the conduit that extends toward the operating room (e.g., extends inside the operating room) is at a lower position than the opposite end of the conduit that extends toward the surrounding space exterior to the room. Thus, when a suitable amount of positive pressure is applied to the operating room, there is sufficient directional differential pressure to move the ball upwardly within the conduit to the conduit end toward the surrounding space.

As discussed above, it may be desirable to adjust the device for different threshold differential pressures that give rise to respective directions of air flow between the spaces. If it is desired that the magnitude of the negative pressure difference between a room and the outside space be increased, the conduit may be adjusted to be inclined at a greater angle relative to a horizontal reference plane. Devices described herein may permit straightforward and convenient adjustment of the angle of the conduit relative to a horizontal reference plane, so as to provide a clear indication as to whether the newly desired net differential pressure exists to cause a desired potential or actual direction of air flow between the separate spaces.

When installed, the conduit may be set at an appropriate angle of inclination that corresponds to the desired threshold differential pressure set point to cause a desired direction of air flow between separate spaces. In some embodiments, the desired differential pressure between separate spaces to which the device may provide an indication of the appropriate degree of incline may be between 0.001 inch of $H_2O$ and 10 inches of $H_2O$ (e.g., between 0.001 inch of $H_2O$ and 1 inch of $H_2O$, between 0.001 inch of $H_2O$ and 5 inch of $H_2O$, between 0.005 inches of $H_2O$ and 0.5 inches of $H_2O$, between 0.1 inch of $H_2O$ and 0.5 inches of $H_2O$, between 0.01 inch of $H_2O$ and 0.1 inches of $H_2O$, between 0.01 inch of $H_2O$ and 0.05 inches of $H_2O$, between 0.01 inch of $H_2O$ and 0.03 inches of $H_2O$, between 0.005 inches of $H_2O$ and 0.1 inch of $H_2O$, between 0.001 inch of $H_2O$ and 0.005 inches of $H_2O$, between 0.001 inch of $H_2O$ and 0.003 inches of $H_2O$, etc.), as measured by a standard water column manometer. It will be appreciated that devices of the present disclosure may provide an indication of other differential pressures between adjacent spaces outside of these ranges.

As discussed above, a differential pressure set point indicator may be secured to the conduit so as to provide a correlation between the angle of inclination of the conduit and the threshold differential pressure between the spaces.

As an example, if the desired differential pressure leading to air flow in a particular direction between compartments separated by a wall is 0.02 inches of $H_2O$, then, given the components of the system (e.g., ball, conduit, orifices), the conduit may be angled in such a manner where the lower end of the conduit is toward the higher pressure compartment and the higher end of the conduit is toward the lower pressure compartment, that the force of gravity on the ball will be overcome by the pressure and any air flow forces on the ball in the direction opposite gravity from the low to the high end of the conduit, created by at least 0.02 inches of $H_2O$ pressure difference between the compartments. Accordingly, if the angle of inclination of the conduit is set for a differential pressure of 0.02 inches of $H_2O$ between compartments, and the differential pressure between the compartments is actually 0.01 inches of $H_2O$, then the amount of directional forces on the ball generated by the only 0.01 inches of $H_2O$ differential pressure in the direction from the lower end to the upper end of the conduit will be insufficient to overcome the force of gravity on the ball, due to the angle of incline of the conduit being too large. The same holds if the direction of potential or actual air flow within the conduit is from the higher end toward the lower end caused by a reversal of the directional differential pressure. As a result, the ball will remain at the lower end of the conduit because the directional threshold differential pressure in the desired direction of potential or actual air flow from the lower end to the higher end has not been met. However, if the angle of inclination of the conduit is lowered so as to correspond to a lower, 0.01 inch of $H_2O$ differential pressure in the desired direction of air flow between compartments, then the amount of directional differential pressure and any air flow forces on the ball will be sufficient to overcome gravity and move the ball from the lower end to the higher end of the conduit.

Applicant has recognized that external calibration methods are used to establish an accurate relationship between the angle of tilt of the conduit and the threshold differential pressure required to move the ball from one end of the conduit to the other. For example, once the device is installed, such external calibration methods may include the use of a manometer to measure the pressure differential between the adjacent spaces to which the device/conduit is coupled, and noting the angle of tilt of the conduit at which the ball moves from one end to an opposite end (e.g., falling from the higher end to the lower end, or moving from the lower end to the higher end). To continue the calibration process, the pressure difference between the adjacent spaces is adjusted and measured, and the corresponding angle of tilt of the conduit at which the ball moves from one end to the other is further noted. These steps of calibration are repeated for multiple pressure differentials and corresponding angles of tilt for the device. Such steps of pressure measurement and calibration may be expensive and time-consuming.

One possible method to avoid re-calibrating a device each time it is installed to a wall involves including markings on the device that correlate the conduit's angle of inclination directly to the differential pressure between spaces that causes the ball to move from one end to the other. Applicant has recognized that such a method may rely on the orientation of the wall to which the device is mounted or resides against, which might not be aligned with the direction of gravity (i.e., the wall might not be plumb). That is, providing markings that indicate particular threshold differential pressure values thereon may lead to inaccurate results unless the wall is vertically aligned with the direction of gravity (i.e., the wall is plumb) and the indicator is properly installed to the wall.

Applicant has appreciated that it may be advantageous to employ an indicator that is directly calibrated to gravity. For example, an inclinometer that responds to the force of gravity (e.g., bubble inclinometer, pendulum inclinometer, etc.) may be mounted to an appropriate portion of the differential pressure detection device so that an accurate determination can be made as to the actual degree of tilt of the conduit required to reach an equilibrium between the force of gravity and the forces on the ball, arising from directional differential pressure across the ball resulting from the directional differential pressure between the adjacent spaces. Accordingly, the accuracy of such a device is not reliant on whether the wall to which it is mounted or otherwise resides against is aligned with the direction of gravity (i.e., plumb).

Further, Applicant has recognized that it may be advantageous to be able to adjust the angle of inclination of the conduit containing the ball from only one side of the wall while maintaining the conduit in a single plane, for example, a vertical plane. When pivoting the conduit in only a vertical plane, various inclinometers, such as a weighted ball, or a weighted pendulum, that are positioned at a given roll orientation relative to a longitudinal axis of the conduit (e.g. on the top of the conduit) will remain positioned at the same roll orientation relative to the conduit throughout pivoting of the conduit. In a device where adjusting the vertical inclination requires a lateral inclination as well, the weighted pendulum may have a roll component when the conduit is moved, which may re-orient the bubble vial to an orientation that makes reading difficult, or in some cases, prevents proper measurement. For example, if a conduit rotates only within a conical space (rather than a planar space), any change in vertical inclination results in a rolling of the conduit about its own axis, which would change the roll and yaw orientation of the inclinometer, such as the weighted pendulum. As with some embodiments disclosed herein, when pivoting in a vertical plane is possible without requiring other reorientation, the weighted pendulum would only change its pitch orientation.

In further embodiments of the present disclosure, a device for detecting whether a threshold directional differential pressure is present between two spaces separated by a wall may include multiple conduits that provide a continuous passageway through which air may flow between spaces on opposing sides of the wall. In some cases, such arrangements may allow for the angle of incline of the conduit that contains the moveable element to be adjusted from one side of the wall, rather than having to make adjustments to the angle of the incline of the conduit, coordinated from both sides of the wall.

For example, a conduit having at least one movable element (e.g., lightweight ball) located therein may be arranged to extend along, parallel to, or be rigidly coupled to an axis that rotates about a pivot point, where rotation of the conduit about the pivot point is accessible from one side of the wall. In some embodiments, the pivot point is positioned on one side of the wall, or is offset a suitable distance from one side of the wall. For example, the pivot point may be located within a space outside of the wall (e.g., spaced away from an exterior surface of the wall) or within a space between exterior surfaces of the wall. In some embodiments, the conduit may rotate without a set pivot point. For example, the conduit may be configured to translate and rotate at the same time.

In various embodiments, a first conduit may extend between the walls or within a wall, providing a passageway between the respective spaces separated by the wall, similar to that described above with respect to some embodiments. The first conduit may be a rigid tube or flexible hose or combination thereof, installed in any fashion that allows fluid communication between the adjacent spaces. Here, the angle of incline of the first conduit with respect to a horizontal reference plane does not affect the accuracy of the pressure detection, in contrast with other conduits described herein, which extend from one side of the wall to the other side and are adjustable between various angles of incline.

A second conduit may be positioned at substantially one end of the first conduit, extending the passageway through which air flows between spaces on opposing sides of the wall. In various embodiments, as discussed above, adjustability of the angle of incline of the second conduit may be accessible from one side of the wall, without having to access the second conduit from the other side of the wall. In some cases, the second conduit may be rotatable about a pivot point located on or near one side of the wall. For example, the second conduit may have a free end that extends away from the wall and an attached end that extends substantially toward the pivot point (e.g., located on the same side of the wall, within the wall cavity, or at another location).

Similar to that described with respect to various embodiments discussed above, the angle of inclination of the second conduit with respect to the horizontal or vertical plane may be employed in conjunction with one or more movable elements to provide an indication as to whether a directional differential pressure meeting a desired threshold exists between opposing sides of the wall.

When it is desirable for the device to provide an indication of the existence of a different directional differential pressure threshold between spaces separated by the wall, the angle of inclination of the second conduit may be suitably adjusted. This function is similar to embodiments of conduits described above, except in this embodiment, rather than having to adjust the angle of inclination of a conduit from both sides of the wall, the second conduit is able to be adjusted solely on one side of the wall.

Such an arrangement makes adjustability of the device to provide indications of various directional differential pressure thresholds more convenient. For example, if it is desired that the magnitude of the pressure difference between a room and an adjacent space be increased, the second conduit may be adjusted to be inclined at a greater angle relative to a horizontal or vertical reference plane.

The conduit(s) may include any suitable material. In some embodiments, the conduit(s) may be made up of glass, plastic, or another appropriate material. In some cases, the conduit(s) may be transparent or translucent so that the movable element within the conduit is viewable to an observer. In some embodiments, the conduit(s) are rigid, though, in various embodiments, the conduit(s) are flexible. The device may include a combination of rigid and flexible conduits. A conduit need not be cylindrical in shape as any suitable shape may be used.

Turning to the figures, FIG. 1 depicts a device 100 for detecting whether a directional differential pressure is present between two spaces separated by a wall 50. The device 100 includes a conduit 110 (e.g., tube) which has openings at opposite ends. Though, as noted herein, the openings are not required to be located at opposite ends of the conduit.

The conduit 110 extends from one surface 52 of a wall 50 to the opposite surface 54. In this embodiment, the surface 52 corresponds to a first room 10 and the surface 54 corresponds to a second room 20 on the opposite side of the wall. The conduit 110 extends between neighboring rooms 10, 20 at an angle θ with respect to a horizontal reference plane h.

At least one movable element, such as a ball 120 (e.g., a ping pong ball, other spherical ball, non-spherical object, etc.) or other suitable article, is contained by end stops 130 (e.g., end caps) that allow fluid flow through the end stop within a passageway of the conduit. The ball 120 has an outer diameter that is less than the inner diameter of the conduit 110. In some embodiments, the ball is made of a lightweight material and moves freely along the length of the conduit 110 between opposite ends. Any other suitable movable element may be used, for example, a slidable block, a cylindrically shaped article, etc. In some embodiments, multiple movable elements may be used by the device simultaneously.

Each end of the conduit may be fitted securely with restraints or end stops 130. The end stops 130 have respective openings 132 through which fluid (e.g., air) may readily flow. The openings 132 have respective shapes and sizes that prevent the ball from falling out of the conduit when the ball moves toward and impacts the end stop 130. For example, the opening 132 may have a diameter that is smaller than the outer diameter of the ball 120, keeping the ball retained within the passageway of the conduit.

The end stops 130 may be suitably secured as caps at the ends of the conduit 110, for example, by a friction fit, snap fit, or otherwise. In some embodiments, the end stops 130 and the conduit 110 are transparent or translucent so that the ball 120, when present, can be readily seen by a person observing the device from either space 10, 20 on opposite sides of the wall 50 in which the device is installed. In some cases, the ball 120 is brightly colored so that the ball is easily noticeable to a person who is looking at the device.

The conduit 110 is attached to the wall by a series of wall flanges. In particular, FIG. 1 shows inner wall flanges 150 and outer wall flanges 160, along with inner sealing materials 152 and outer sealing materials 162. The flanges 150, 160 are appropriately positioned so as to accommodate the desired angle of inclination of the conduit. The conduit is held by the outer sealing materials 162 at the desired angle of inclination, described further below.

An inner sealing material 152 is disposed between an inner wall flange 150 and the surface 52. The inner wall flange 150 and inner sealing material 152 may be secured (e.g., attached, adhered, fastened) together to the wall surface 52. As such, the inner sealing material 152 may provide an appropriate seal, preventing unwanted air leakage between rooms 10, 20 via the wall cavity space, should such a cavity exist. Additionally, the inner wall flange 150 and inner sealing material 152 have respective openings that are large enough through which the conduit 110 may extend without contact.

Outer wall flange 160, in turn, is secured (e.g., attached, adhered, fastened) to the inner wall flange 150 with the outer sealing material 162 being disposed between the flanges 150, 160. The outer wall flange 160 and outer sealing material 162 have openings through which the conduit 110 may extend. The inner sealing material 162 provides an appropriate seal preventing unwanted air leakage between rooms 10, 20, or via a wall cavity space. However, in various embodiments, the opening of the outer sealing material 162 has a diameter that is less than the outer diameter of the conduit 110 so that an appropriate seal may be formed between the outer sealing material 162 and the conduit 110. Such an arrangement further allows the conduit 110 to be suitably supported and held in a steady position when installed at an angle.

The wall flanges 150, 160 and sealing materials 152, 162 may be attached to respective wall surfaces 52, 54 and to each other by any suitable method, for example, via an adhesive and/or fastener. The wall flanges 150, 160 and sealing materials 152, 162 may be adjustable in position so as to accommodate variations in the angle of inclination θ of the conduit. In some embodiments, the inner wall flange 150 is attached to the wall 50; however, the position of the outer wall flange 160 may be adjusted vertically with respect to the inner wall flange 150. Accordingly, the outer wall flanges 160 may be re-positioned to permit the angle of the conduit to be appropriately altered.

The device 100, when installed, may be used to detect whether a desired directional differential pressure exists between the separate rooms 10, 20. When the air pressure between the separate rooms 10, 20 is the same, there will be no net flow of fluid through the conduit from one room to the other. Therefore, if the conduit is held at an angle of inclination with respect to the horizontal, due to gravity, the ball will fall down toward the lower of the two end stops and rest against that stop.

However, when the air pressure between the rooms 10, 20 is not equal, there will be a net flow of fluid through the conduit from the room with a comparatively higher pressure toward the other room. In FIG. 1, the pressure within room 10 is higher than the pressure within room 20. Accordingly, air will potentially flow in a direction from room 10 to room 20, as indicated by the arrows shown within the conduit. If the differential pressure from room 10 to room 20 meets a certain threshold, the pressure and any air flow forces on the ball in the direction opposite gravity from the low to the high end of the conduit will overcome the force of gravity on the ball causing the ball to move from the lower end of the conduit within room 10 toward the higher end of the conduit within room 20. Thus, for the embodiment of FIG. 1, when the ball moves from room 10, through the wall and into room 20, the device has indicated that the differential pressure between room 10 and room 20 has met a certain threshold directional differential pressure causing potential or actual air flow through the conduit to travel in the direction from room 10 toward room 20.

Figure 2:
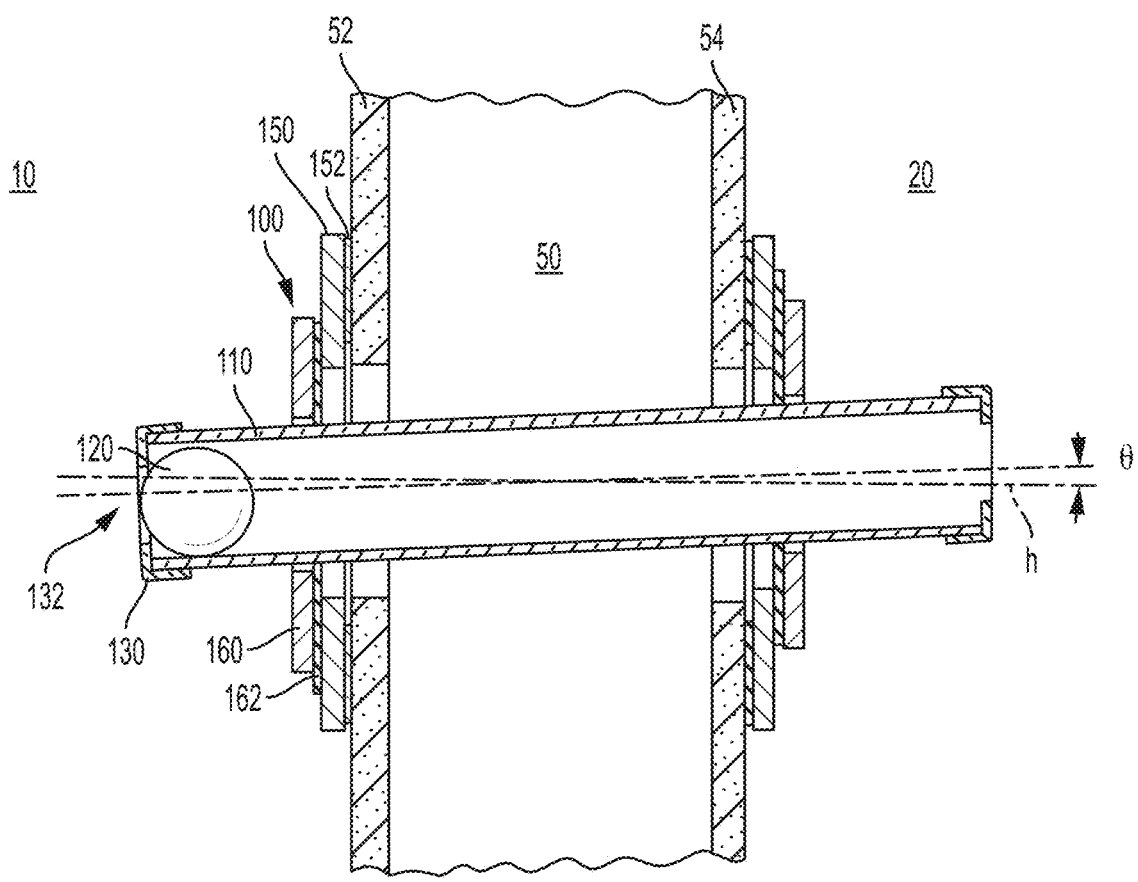
FIG. 2 is a cross-sectional view of the device of FIG. 1 at a different orientation.

In FIG. 2, there is no difference in pressure between the rooms 10, 20; hence, there is no potential pressure or any air flow forces on the ball. Accordingly, because the conduit remains at a slight angle of incline θ with respect to the horizontal h, the ball 120 rolls and/or falls back to the lower end of the conduit, within room 10. In FIG. 1, the outer wall flange of room 10 is positioned substantially lower than the outer wall flange of room 20. Accordingly, the conduit 110 is oriented according to a relatively steep angle. Though, in FIG. 2, the outer wall flange of room 10 is positioned to be in much closer alignment, vertically, with respect to the outer wall flange of room 20. Such positioning permits the conduit 110 to be oriented according to a much smaller angle of incline.

Other arrangements are possible. For example, as discussed further below, a device may include an angled conduit where only one end extends outwardly from a wall, rather than two ends. Accordingly, depending on the differential pressure between spaces, the ball may move between a vertically higher region of the conduit and a vertically lower region of the conduit within the same room, or at least partially within a wall cavity.

In some embodiments, the device includes a differential pressure set point indicator that provides an indication (e.g., via a pointer referencing various markings) of a minimum differential pressure threshold that would cause the ball to move from a lower end region toward a higher opposite end region of the conduit. Markings of the differential pressure set point indicator may refer to actual units of pressure indicating the directional threshold pressure differential set point between rooms. Markings may include alphanumeric values to which a correlating table may be referred, to determine the corresponding directional threshold differential pressure set point. Or, in some embodiments, markings of the differential pressure set point indicator may provide the actual inclination angle θ of the conduit with respect to a horizontal reference plane h, also to which a correlating table may be referred, to determine the corresponding directional threshold differential pressure set point.

The differential pressure set point indicator may include a suitable pointer that senses the true gravitational horizontal or vertical plane (e.g., via an air bubble within a liquid, a ball within a fluid, a tip pointer, a pendulum, a pivotally arranged member, a weighted member, etc.) and associated markings that, when referred to by the indicator, provide information regarding the angle of inclination of the conduit and corresponding directional threshold differential pressure set point. The markings may be calibrated such that steady alignment of the indicator with a particular region of the markings, resulting in a particular angle of incline of the conduit, provides an indication to an observer of the threshold differential pressure required to cause the ball to move from a lower region to a higher region of the conduit.

It may be desirable for the device to provide assurance to an observer that the direction of air flow and the associated differential pressure between separate spaces meets certain requirements. For example, the differential pressure requirement in a particular direction between neighboring rooms may be approximately 0.01 inches of H$_2$O, and the directional differential pressure set point indicator may have markings that, given a particular angle of incline of the conduit, correspond to the different levels of differential pressure required to create sufficient forces to cause the ball to move from a lower region (e.g., lower end) to a higher region (e.g., higher end) of the conduit. In this example, upon installation or adjustment of the device, the conduit may be set at a particular angle θ such that the pointer or bubble or ball of the differential pressure set point indicator comes into steady alignment with markings that correspond to a 0.01 inches of H$_2$O pressure differential. Accordingly, when the actual differential pressure between rooms is approximately 0.01 inches of H$_2$O or above, the pressure difference and any air flow forces on the ball will be sufficient to overcome the force of gravity on the ball so as to move the ball toward the higher end of the conduit.

When the directional differential pressure between rooms degrades (e.g., a door/window is opened between rooms or the ventilation system air flows degrade from proper settings), then the directional differential pressure between rooms may fall below approximately 0.01 inch of H$_2$O in the direction from the lower end to the higher end of the conduit, and the ball falls back to the lower end of the conduit due to gravity, indicating to an observer that the minimum directional differential pressure is not present. In some embodiments, when the directional differential pressure between rooms inadvertently falls below the desired directional threshold pressure differential, an alarm may sound alerting the appropriate personnel that the direction of air flow or the directional threshold differential pressure requirements of the room are not met.

It may be desirable to have an adjustable range of differential pressure set points to accommodate different requirements between neighboring rooms, which may be accomplished by adjusting any of the associated characteristics of the elements of the detector, e.g., the ball diameter and weight, the conduit passageway diameter, the end stop orifices, the incline of the conduit. For example, there may be a desired directional air flow and associated threshold differential pressure of 0.05 inches of H$_2$O, from a previous setting of 0.01 inches of H$_2$O. As a result, given all other elements of the detector unchanged, the angle of incline of the conduit should be adjusted appropriately. If the conduit remains at the angle corresponding to a differential pressure of 0.01 inches of H$_2$O, then an actual directional pressure difference between rooms of, for example, 0.03 inches of H$_2$O in the same desired direction would give an observer an erroneous indication that the directional threshold differential pressure between the rooms is at least 0.05 inches of H$_2$O. That is, for this example, the forces generated by a directional differential pressure of 0.03 inches of H$_2$O would cause the ball to move upward within the conduit, despite the desired directional threshold differential pressure of 0.05 inches of H$_2$O.

Accordingly, the angle of incline of the conduit may be re-positioned at a different angle such that the pointer of the directional threshold differential pressure set point indicator comes into steady alignment with markings that correspond to a 0.05 inches of H$_2$O directional threshold pressure differential. Thus, only when the actual directional differential pressure between rooms is 0.05 inches of H$_2$O or above, the forces generated by the pressure difference will be sufficient to overcome the force of gravity on the ball so as to move the ball toward the higher end of the conduit. If and when the differential pressure requirement between neighboring rooms is to be changed yet again, then the angle of incline of the conduit may be further re-positioned to a different orientation that corresponds to the updated threshold directional differential pressure desired, according to the read out provided by the directional differential pressure set point indicator.

Single Side Adjustment

FIGS. 3-7 show embodiments of a device that provides an indication of a threshold directional differential pressure existing between spaces separated by a wall where adjustability of the inclination is on one side of the wall. The embodiments shown in FIGS. 3-7 include a turret-type arrangement.

Figure 3:
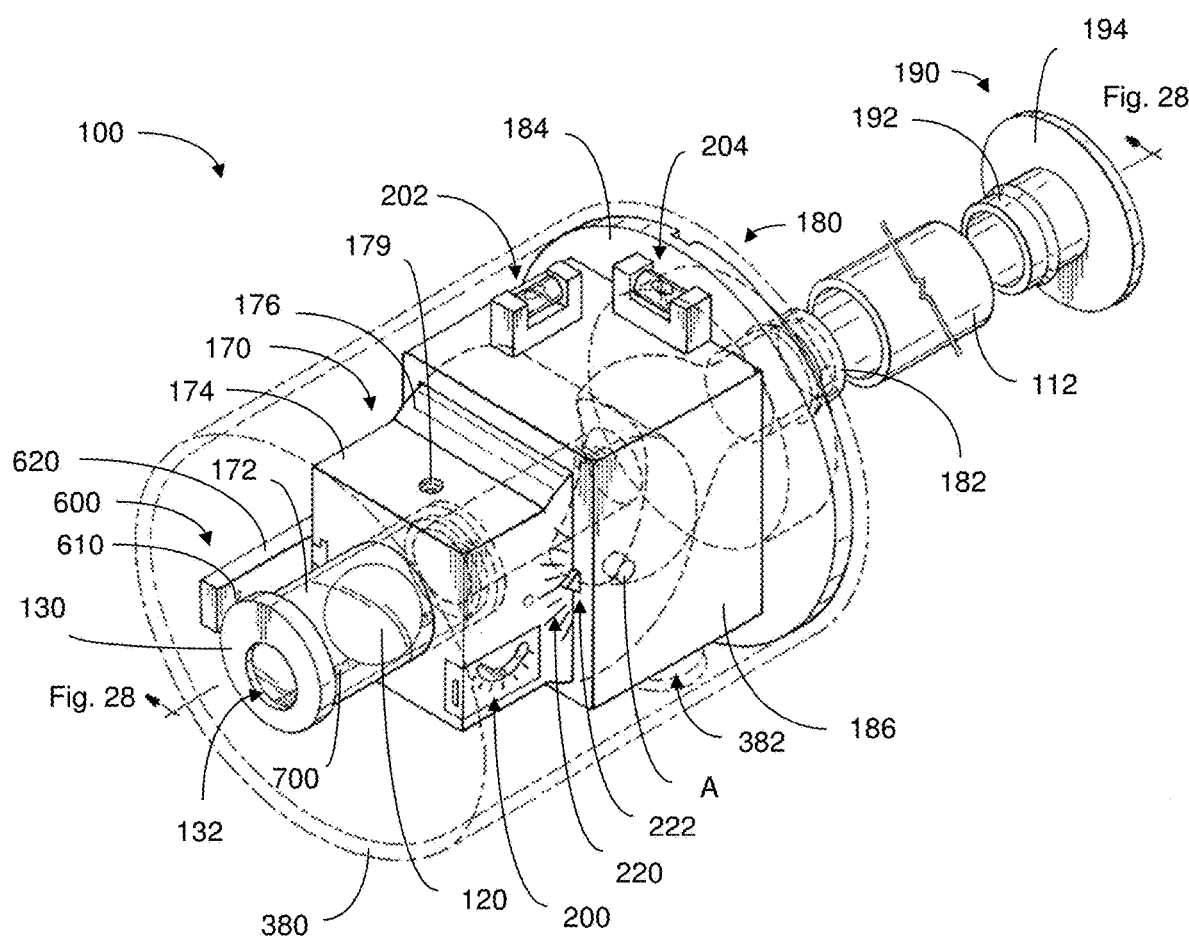
FIG. 3 is a perspective view of another device for detecting a directional differential pressure in accordance with some embodiments.
Figure 4:
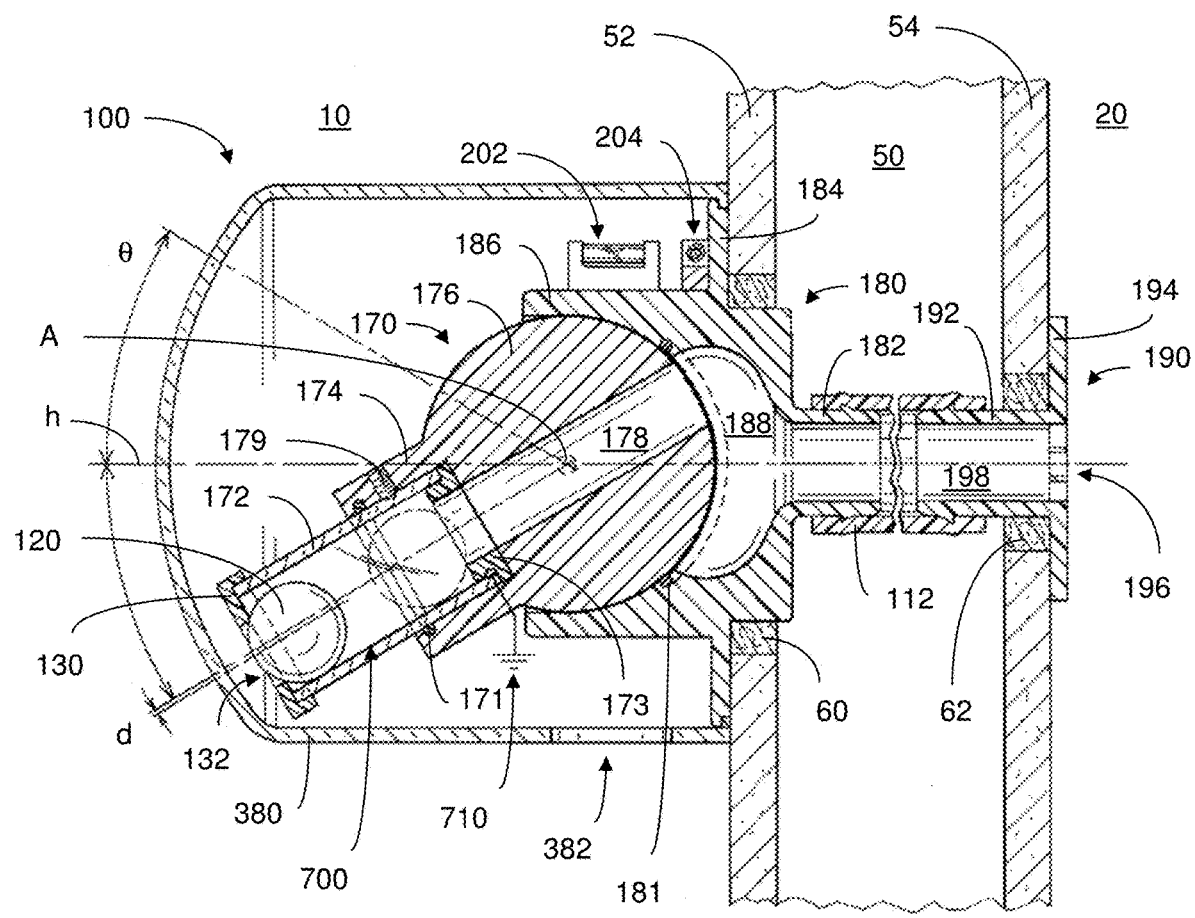
FIG. 4 is a cross-sectional view of the device of FIG. 3.
Figure 5:
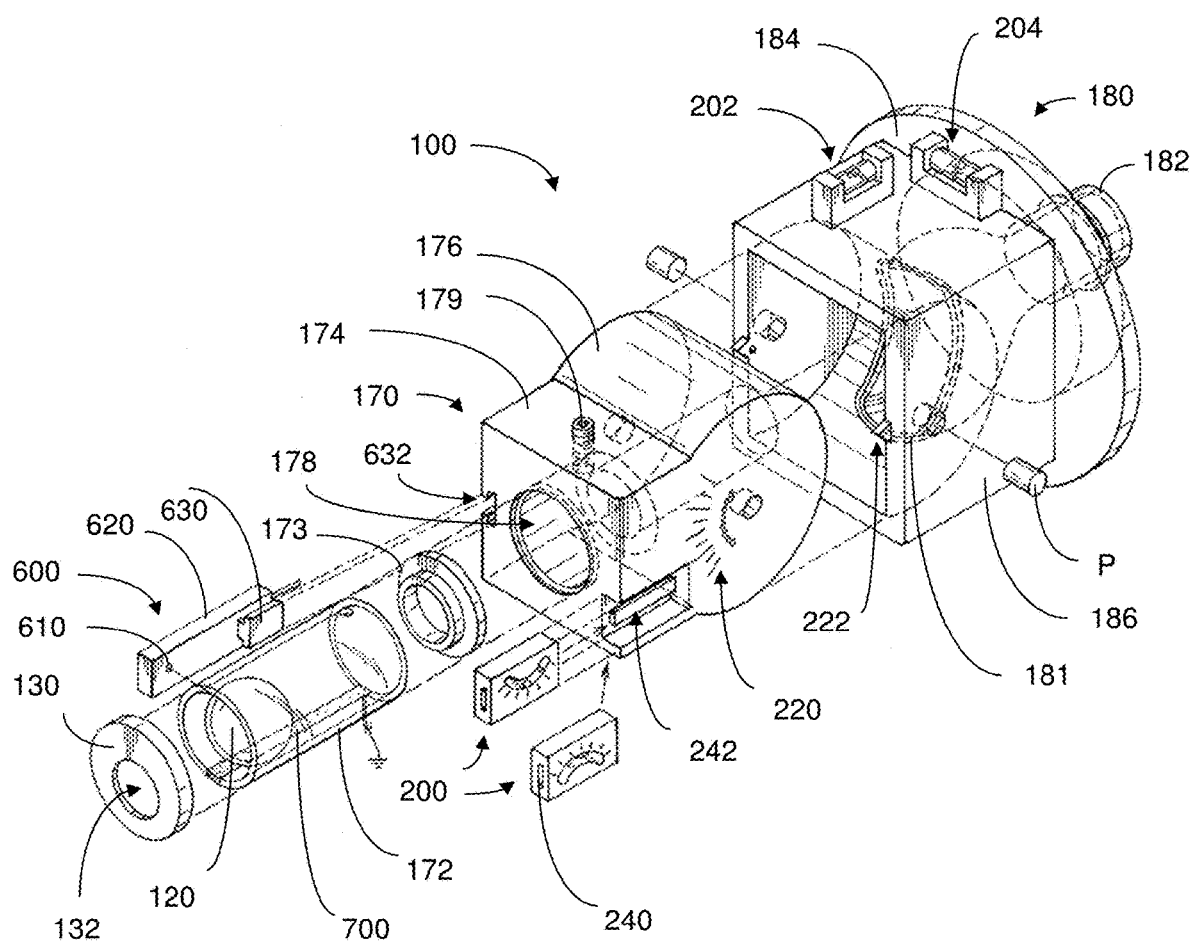
FIG. 5 is an exploded perspective view of a portion of the device of FIG. 3.

As shown in FIGS. 3-5, device 100 includes a turret portion 170, a yoke portion 180 and a terminal portion 190. In this embodiment, the turret portion 170 is coupled to the yoke portion 180 to provide a rotatable housing for the conduit 172 to be suitably inclined. The yoke portion 180 may, in turn, be coupled with the terminal portion 190 to form a passageway through the wall cavity between otherwise separate spaces. The yoke portion 180 includes structure suitable for the adjustable part of the device 100 to be attached to or otherwise installed at one side surface 52 of the wall. That is, the angle of inclination of the device 100 may be adjusted from only one side of the wall. In various embodiments, the yoke portion 180 may include a mounting flange 184 that may be appropriately secured against or interfaced with one side 52 of the wall, for example, via a fastener, interference fit, interlocking arrangement, or other suitable method. To ensure suitable alignment of the device against the wall and in the vertical (gravitational) direction, structure members such as shims or adjustable standoff screws may be optionally employed with the mounting flange, as desired.

Similarly, the terminal portion 190 includes structure suitable for the device 100, upon installation, to form a passageway through the wall cavity 50. For instance, the terminal portion 190 may include a mounting flange 194 that may be appropriately secured against or interfaced with the other side 54 of the wall, such as with a fastener, interference fit, interlocking arrangement, etc. Any suitable arrangement may be used for installing and holding the device in place across the wall cavity 50 (e.g., solid wall, space between wall surfaces). As further shown, the terminal portion 190 further includes an opening 196 that allows fluid/air to flow between the passage 198 and the room 20.

FIG. 4 shows the device 100 installed and, in this embodiment, the yoke portion 180 includes an extension 182, and the terminal portion 190 also includes an extension 192. The extensions 182, 192 may complement one another or otherwise extend toward one another so as to optionally meet. Such extensions may provide support for a first conduit 112 in extending through the wall between separated spaces 10, 20, allowing fluid (e.g., air) to flow therebetween. As shown, one end of the first conduit 112 is coupled to one side 52 of the wall via the yoke portion 180. The other end of the first conduit 112 is coupled to the other side 54 of the wall via the terminal portion 190. The coupled unit including the first conduit 112 and extensions 182, 192 provide a passage 198 through which fluid (e.g., gas, liquid, etc.) may flow between rooms 10, 20. The conduit 112 may be secured to the extensions 182, 192 via any suitable manner, for example, through an adhesive attachment, interlocking/interference fit, threaded configuration, etc.

It can be appreciated that other configurations for suitably securing a conduit 112 in place may be possible. That is, it is not necessary for the yoke portion 180 or terminal portion 190 to include extensions 182, 192 as the conduit 112 may extend across the wall cavity 50 (e.g., solid wall, space between wall surfaces, etc.) without an arrangement which includes respective extensions 182, 192. In some embodiments, while not expressly shown in the figures, the yoke portion 180 and/or terminal portion 190 may include corresponding receptacles—each having a coupling region for interfacing with respective ends of the conduit 112. For instance, the yoke portion 180 and/or terminal portion 190 may include a respective recess shaped or otherwise configured to receive and secure a corresponding end of the conduit 112 thereto. In some cases, the recess may be lined with a gasket to maintain a seal between the internal passage of the conduit and the external environment.

The yoke portion 180 may include a yoke body 186 that interfaces and is rotatably coupled with the turret body 176 of the turret portion 170. As shown, the yoke body 186 may include a receptacle for receiving the turret body 176, and the turret body 176 may rotate and/or pivot within the receptacle. The yoke body 186 also includes a passage 188 that accommodates fluid flow therethrough between the passage 178 within the turret body 176 and the passage 198. As further depicted in FIGS. 4-5, the yoke portion 180 may optionally include a gasket 181 for maintaining a seal at the interface between the yoke body 186 of the yoke portion 180 and the turret body 176 of the turret portion 170.

As shown, a second conduit 172 may be attached or otherwise coupled with the turret body 176 so as to be rotatable about a pivot axis A, which may be provided by an appropriate connection between the yoke body 186 and the turret body 176. It can be appreciated that the second conduit 172 may be pivotally or rotatably coupled to the yoke body in other ways. For instance, the second conduit itself may function as a pivoting turret, without requiring a rotatable housing (i.e., turret body) through which the second conduit may be coupled to the yoke body. As an example, the second conduit may directly be rotatably or pivotally coupled to a support structure (e.g., yoke body) via a pivoting attachment without need for a housing (e.g., turret body) to carry the conduit. Any suitable pivoting attachment may be employed, for example, a pivot pin/axle and/or fastener (e.g., wingnut) for tightening the pivoting attachment between the conduit and the support structure.

In some embodiments, a region and/or component (e.g., inclinometers) of the yoke portion may provide an indication as to whether the pivot itself is appropriately aligned or oriented according to the horizontal reference plane h, as determined by gravity, so that the device provides accurate readings. That is, such an arrangement allows the movable element or ball to translate along linear paths within the conduit that are consistent at various angles of inclination.

The second conduit 172 may be coupled with the turret body 176 in any suitable manner. For some embodiments, as shown, the turret body 176 may include a conduit receptacle 174 having a recess for receiving an end (e.g., attachment end) of the conduit 172. The conduit receptacle 174 may optionally include a retainer 171 and/or a fastener 179 for suitably holding the conduit 172 in place so that the conduit 172 is secured to the turret body 176. The end stop 173 may also serve to hold the conduit 172 in place. The retainer 171, end stop 173 and/or fastener 179 may include any appropriate structure or configuration. For example, the retainer 171 and/or end stop 173 may include a rubber gasket that provides resistance to movement of the conduit 172 when situated within the receptacle. Or, the fastener 179 may include a threaded rod that may be sufficiently turned so as to push up against the conduit 172 and keep the conduit secured in place upon establishing a suitable amount of contact force therebetween. As depicted, the opposite end (e.g., free end) of the second conduit 172 may extend away from the pivot axis A, and the wall. The turret body 176 may further include a passage 178 which, in concert with passages 188, 198, permits the fluid (e.g., gas, liquid, etc.) to flow between rooms 10, 20.

As shown, the second conduit 172 may be arranged so as to rotate about a pivot point and along a substantially vertical plane, having a pitch without appreciable horizontal offset or yaw. In some embodiments, such rotating motion may be such that the conduit rotates within the sagittal plane extending through the apparatus.

In accordance with aspects of the present disclosure, the conduit 172 may include one or more balls 120, or other movable element(s), which may provide an indication as to whether a particular differential pressure threshold exists between separated spaces on either side of the wall, as determined by the angle of incline θ of the conduit 172. For example, the ball(s) 120 may be adapted to move back and forth within the conduit 172 depending on the fluid flow through the device 100 that results from the direction and amount of differential pressure between the rooms 10, 20. In accordance with aspects of the present disclosure, when the conduit 172 is tilted at an angle with respect to the horizontal or vertical reference plane, absent net fluid forces on the ball 120, the ball 120 falls by force of gravity to the lower free end of the conduit 172. Though, given a sufficient amount of forces on the ball 120, from the lower free end of the conduit toward the higher end (e.g., due to a net pressure differential), the force of gravity on the movable element may be overcome such that the ball 120 moves toward the higher end of the conduit.

Similar to embodiments described herein, the end stops 130, 173 may be located at opposite ends of the conduit 172 and may, at least in part, be provided as cushioning for the ball 120 as it comes into contact with respective ends of the conduit. In accordance with the present disclosure, for some embodiments, the ends stops 130, 173 include an energy-absorbing material (e.g., elastomeric material, polymer, rubber gasket, etc.) that attenuates sound upon contact of the ball 120. Without such energy-absorbing capability, an audible sound (e.g., when two relatively hard surfaces come into contact) may be distinctly heard. In some cases, such a sound may be distracting and it may be preferable for the sound to be substantially eliminated or reduced.

As discussed above, the turret, along with the conduit 172, may be configured to pivot or otherwise rotate about the yoke body along a vertical plane (e.g., sagittal plane) of the device 100. In various embodiments, such a configuration may be beneficial so that the ball 120 or other movable element may be suitably aligned with the opening 132 at the free end of the conduit 172. As described herein, for some embodiments, the center axis of the opening 132 may be slightly offset a distance d from the center axis of the conduit 172, yet substantially aligned with a travel path of a center of the ball 120 or other movable element. That is, an axis perpendicular to a center of opening 132 may be substantially the same as the path of the center of ball 120, and the axis may be offset from the center axis of the conduit 172. In this manner, the ball aligns with the opening 132 at the end of the conduit and may prevent air flow through the opening 132. In embodiments where the conduit pivots in only a vertical plane, the ball may align with the opening in all angles of conduit inclination. Such a configuration may provide an added amount of stability for the ball 120, reducing the likelihood that the ball 120 spins or migrates from the opening through which fluid/air flows.

Though, it can be appreciated that it is not required for the turret to pivot along the sagittal plane. In some embodiments, while not shown in the figures, the turret is configured to rotate so as to exhibit adjustments in pitch and yaw. For example, rotation of the turret may involve movement of the end of the conduit in an approximately circular or ellipsoidal path.

Similar to that described with respect to other embodiments of the present disclosure, the device may include a protective covering 380 surrounding the turret. The protective covering 380 includes an opening 382 through which fluid may flow between rooms 10, 20 via the conduits 112, 172 and passages 178, 188, 198. In various embodiments, the protective covering 380 fits over the wall flange 184 and may include any suitable sealing material that may be associated therewith.

In accordance with aspects of the present disclosure, any suitable differential pressure set point indicator may be employed. As shown, a differential pressure set point indicator 200 is provided as an inclinometer which is mounted or otherwise located on the turret portion 170, in alignment with the inclination of the second conduit. Accordingly, the inclinometer is rotatable along with the conduit 172 and provides an indication as to the amount of pitch that exists in the orientation of the conduit 172. The angle of inclination of the conduit 172 is correlated to a threshold differential pressure between the two spaces that is sufficient to cause the ball 120, or other movable element within the conduit, to move from one region (e.g., a vertically lower position) of the conduit toward an opposite region (e.g., a vertically higher position) of the conduit. In some embodiments, as shown, the inclinometer is attached to a rotatable turret which rotates both the conduit 172 and the inclinometer together as a unit.

FIG. 5 is an exploded view of an illustrative embodiment of a device 100 where various types of differential pressure set point indicators 200 may be employed. In this figure, indicators (e.g., inclinometers with ball or bubble pointers) similar to those depicted in FIGS. 21-25 are provided, though, it can be appreciated that any suitable indicator may be employed. In various embodiments, the differential pressure set point indicator 200 includes a coupling region 240 which may, in turn, have a structure that corresponds to a complementary coupling region 242 of the turret portion 170. In this embodiment, the coupling region 240 of the indicator 200 includes a slot, and the coupling region 242 of the turret portion 170 includes a protruding ridge along which the slot may slide. Hence, the indicator 200 may slide along the ridge of the turret portion 170 for suitable coupling therewith. While not expressly shown in the figures, the indicator 200 may be suitably attached or otherwise secured to the turret portion 170, for example, via a fastener, interference fit, or other appropriate arrangement.

In some embodiments, the device 100 optionally may include markings and a pointer which provide an indication as to the desired setting for threshold pressure differential between spaces separated by the wall based on the inclined angle θ of the conduit 172. Such markings and pointer may act as a suitable differential pressure set point indicator. For instance, in the embodiment illustrated in FIG. 3, the turret body 176 includes markings 220 and the yoke body 186 includes a pointer 222 extending therefrom. In some cases, the markings 220 may indicate units of pressure. Here, the markings 220 and pointer 222 correlate the level of incline of the conduit 172 with the threshold pressure differential required between opposing spaces to cause the movable element to travel from a lower position of the conduit to a higher position.

In some embodiments, to accentuate the markings, a number of detents (e.g., respective recesses/protrusions) may be provided, for example, between the yoke body and the turret. Each detent position may correspond to an angle θ at which the conduit 172 is inclined which, in turn, corresponds to a particular threshold differential pressure across the wall that is sufficient to cause lift of the movable element at that particular angle of incline.

In some embodiments, the device may be configured so as to provide desired directional differential pressure threshold values that are calibrated against the true gravitational horizontal or vertical "plumb" planes of the earth. This provides for a greater degree of accuracy compared to a non-gravity sensing set point indicator that is coupled to a device and calibrated to a plumb vertical plane, where the indicator is mounted on a wall that is assumed to be installed "plumb," yet in fact may be significantly out of plumb and therefore indicating potentially significant inaccurate directional differential pressures. Accordingly, even if the wall upon which the device is installed is not perfectly vertical, the device still, within an acceptable tolerance, may provide an accurate indication of the threshold level of pressure differential required between rooms to move the ball between opposing ends of the conduit.

In various embodiments, the device 100 may include inclinometers 202, 204, which may provide an indication as to whether the device 100 itself is tilted. For instance, as shown in FIGS. 3-5, the inclinometers 202, 204 may be located on the yoke body 186, optionally positioned perpendicular with respect to one another. Here, a first inclinometer 202 indicates whether the yoke body 186 exhibits any variation in pitch, and the second inclinometer 204 indicates whether the yoke body 186 exhibits any variation in roll. Accordingly, during installation, the inclinometers 202, 204 may provide an indication as to whether the upper surface of the yoke body is level. For some embodiments, while not shown in the figures, a single inclinometer may be mounted on to the yoke body 186 and oriented diagonally, so as to provide an indication as to whether the yoke body 186 is suitably level (e.g., zero pitch and zero roll).

In certain embodiments, for a yoke body 186 that is suitably level, the markings 220 on the turret body 176 that are in alignment with the pointer 222 of the yoke body 186 may indicate the threshold differential pressure required to move the ball 120 between opposing ends of the second conduit 172. Though, if the first inclinometer 202 indicates that the yoke body 186 exhibits a non-level pitch with respect to gravity, then the threshold differential pressure indication provided by the markings 220 and pointer 222 may be inaccurate. If the second inclinometer 204 indicates that the yoke body 186 exhibits a non-level roll which may also affect the pitch of the conduit 172, the ball 120 might not be suitably aligned within the conduit 172 to be able to form a suitable seal with the orifice of end stop 130 when located at the end of the conduit. When this seal between the ball 120 and the orifice 132 remains malformed, movement of the ball 120 within the conduit 172 as well as the pointer markings may be unreliable and inaccurate. Accordingly, for various embodiments, it may be preferable for the inclinometers 202, 204 to indicate that the device 100 is sufficiently level to provide an accurate reading of the threshold differential pressure between spaces required to move the ball between end positions within the respective conduit. If preferred or required, the orientation of the device (e.g., pitch, roll, yaw) can be corrected, for example, by using structural elements, such as shims and/or adjustable standoff screws, etc.

The device 100 may include a detector 600 which provides an indication as to where the ball 120 or other movable element is located within the conduit 172. For example, as depicted in FIG. 3, the detector 600 may include a sensor 610 and an arm 620 on which the sensor is mounted. In some embodiments, the sensor 610 may be a photodetector, motion sensor or camera that detects whether an object is located along the direction in which the sensor is oriented. For example, when the ball is located at the free end stop 130 of the conduit 172, the amount of light received by the sensor 610 may be altered (e.g., reduced) as compared to when the ball is located at the mounted end stop 173. Upon receiving a threshold change (e.g., reduction) in light, the detector may provide an indication that the ball is located at the free end of the conduit 172.

As further shown in FIG. 5, the detector 600 may include a coupling region 630 which may, in turn, have a structure that corresponds to a complementary coupling region 632 of the turret portion 170. Here, the coupling region 630 of the detector 600 includes a T-shaped ridge and the coupling region 632 of the turret portion 170 includes a slot for receiving the corresponding T-shaped ridge. Thus, the detector 600 may slide along the slot of the turret portion 170 for suitable coupling therewith. It can be appreciated that the detector 600 may be suitably attached or otherwise secured to the turret portion 170 or other part of the device 100 through any appropriate arrangement, for example, via a fastener, interference fit, etc.

Other arrangements for detecting the location of the ball or other movable element within the conduit 172 may be possible. For example, the detector may include a suitable tactile sensor that detects contact from the ball or other movable object within the conduit, indicating the location thereof.

When the humidity of the surrounding environment is relatively low, there may be a tendency for triboelectric-electrostatic charge to build up at various regions of the device. For example, low humidity air passing through the conduit and over the ball may give rise to electrostatic build up. An accumulation of static discharge may affect the accuracy of the device in providing an indication of whether a threshold of directional differential pressure is met. For example, the movable element may be attracted to or repulsed from a particular region where electrostatic charge has built up. Thus, in such instances, gravity acting on the movable element might not be the only force to be overcome by potential differential pressure and air flow forces on the ball.

Accordingly, in some embodiments, one or more of the conduits of the device may be lined with a conductive material 700 (e.g., metal lining/band) which may, in turn, be connected to a ground 710. Such a conductive material 700 may itself act as an electrical ground that serves to dissipate electrostatic charge build-up in and/or around the device which may be otherwise undesirable. The conductive material may include a metal strip, anti-static coating, other suitable materials, or combinations thereof.

Figure 6:
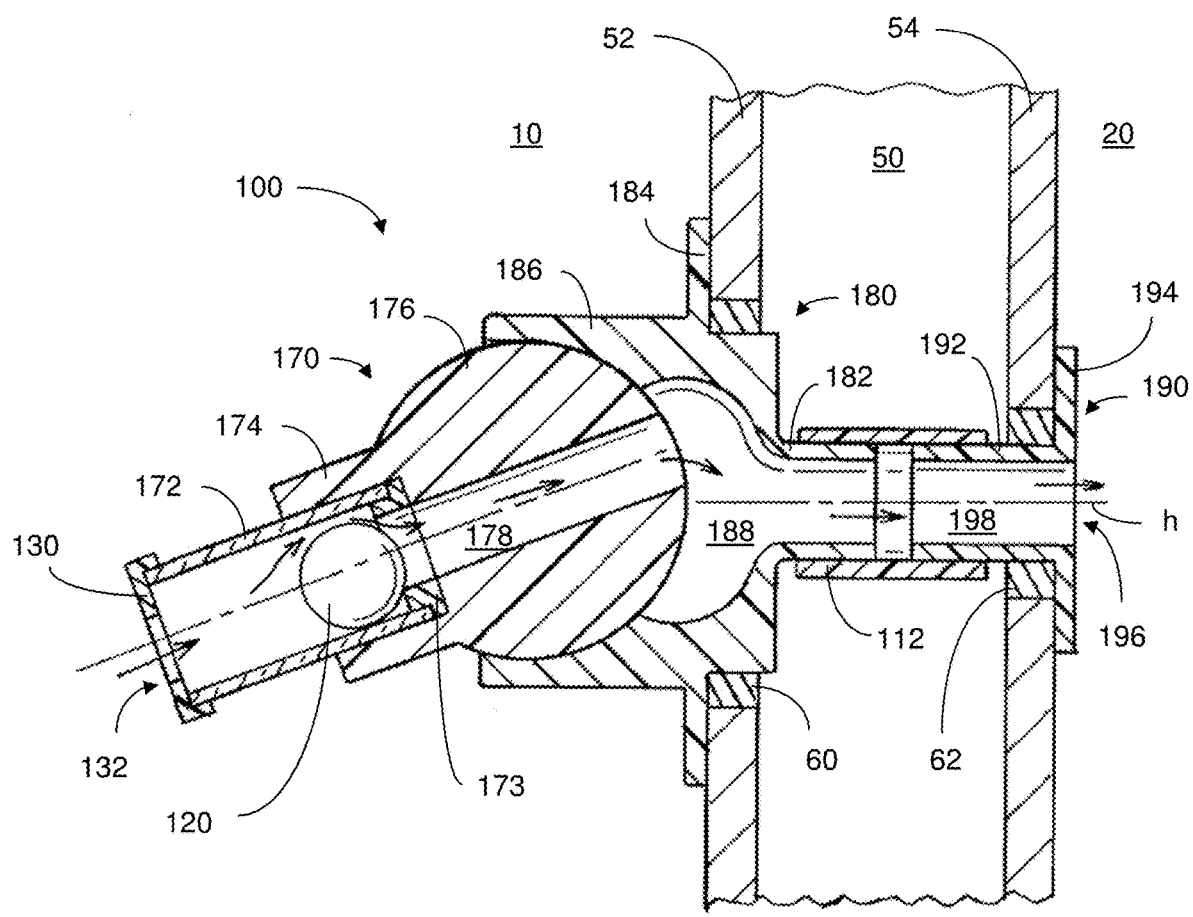
FIGS. 6 and 7 are cross-sectional views of a portion of the device of FIG. 3 for detecting a directional differential pressure in accordance with some embodiments.
Figure 7:
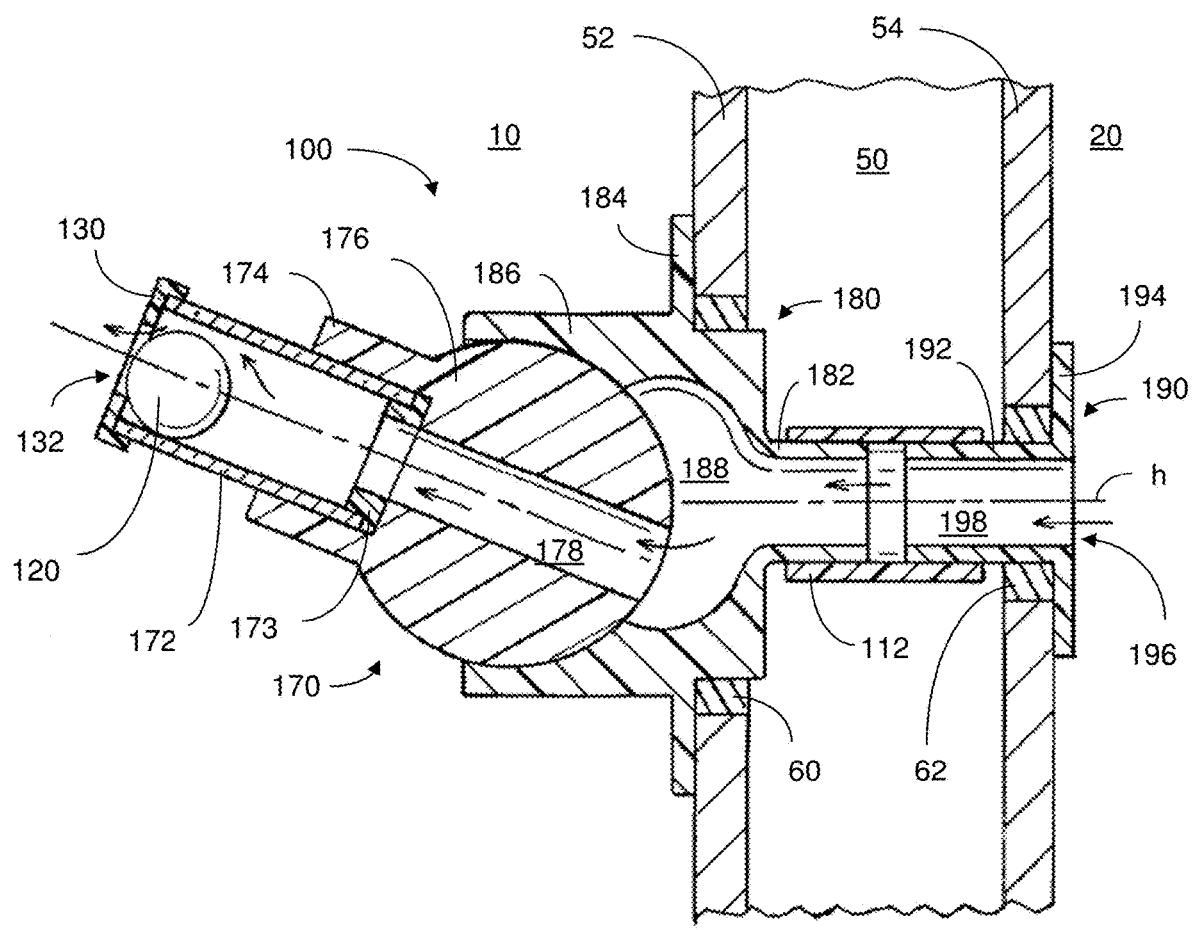

FIGS. 6-7 show various embodiments of the device 100 where the pressure difference between rooms 10, 20 generates an amount of pressure and potential air flow forces on the ball 120 sufficient to move the ball 120 from a lower end to a higher end. As described herein, the device 100, when installed, may be used to detect whether a desired directional differential pressure exists between the separate rooms 10, 20. When the air pressure between the separate rooms 10, 20 is the same, there will be no net potential flow of fluid through the conduit from one room to the other, and the ball drops toward the lowest point within the conduit 172 due to gravity.

FIGS. 6-7 depict schematics of when the air pressure between the rooms 10, 20 is not equal, resulting in a potential of net flow of fluid through the conduit 172. As shown, in FIG. 6, the turret portion 170 and conduit 172 are rotated downwardly to provide an indication of whether the pressure in room 10 is greater than the pressure in room 20 by a threshold amount. In FIG. 7, the turret portion 170 and conduit 172 are rotated upwardly to provide an indication of whether the pressure in room 20 is greater than the pressure in room 10 by a threshold amount.

In FIG. 6, the pressure within room 10 is higher than the pressure within room 20. Hence, pressure forces and potential air flow forces on the ball 120, potentially move the ball in a direction from room 10 to room 20, as indicated by the arrows shown within the conduit 172. If the force generated by the differential pressure and potential of air flow from room 10 to room 20 meets a threshold value sufficient to overcome the force of gravity on the ball, the ball will then move from the lower end of the conduit 172 toward the higher end of the conduit 172.

Thus, for the embodiment of FIG. 6, when the ball 120 moves from the end stop 130 (located at a lower position) to the end stop 173 (located at a higher position), the device provides an indication that the differential pressure between rooms 10, 20 has met a corresponding threshold differential pressure In some embodiments, the receptacle 174 extends away from the turret body 176 by a sufficient distance such that the ball 120 is covered by the wall of the receptacle 174 as it comes up against the end stop 173, so that the ball is substantially hidden from view. Accordingly, for this embodiment, when the ball 120 is moved so as to be shrouded by the receptacle 174, it can be determined that at least a threshold differential pressure between rooms 10, 20 exists.

In the embodiment shown in FIG. 7, the pressure within room 20 is higher than the pressure within room 10, causing air to potentially flow in a direction from room 20 to room 10, as indicated by the arrows. Similar to that with respect to FIG. 7, if the force generated by the differential pressure and potential of air flow from room 20 to room 10 meets a threshold value sufficient to overcome the force of gravity on the ball, the ball will then move upward within the conduit 172. Accordingly, as depicted in FIG. 7, upon movement of the ball from the end stop 173 (located at a lower position) to the end stop 130 (located at a higher position), the device provides an indication that the differential pressure between rooms 10, 20 has met a corresponding threshold differential pressure.

In some embodiments, fluid flow may not exist through the device. For example, a movable element may be sized to match the inner diameter of the conduit and have a low friction interface such that the movable element can move within the conduit without fluid flowing past the movable element. In this manner, according to some embodiments, there may be a fluidic connection that is only a fluidic pressure connection between the spaces on either side of a dividing wall, and the movable element may move in response to a pressure difference, but no air will be transferred from one space to the other through the monitoring device. Such a device may include a piston-type arrangement.

As provided herein, the device may include multiple conduits. For example, a first conduit may be located on one side of the wall and a second conduit may be located on the opposite side of the wall. In some embodiments, the angle of inclination of the first conduit on one side of the wall is adjustable independently from the angle of inclination of the second conduit on the other side of the wall. Alternatively, the angle of inclination of respective conduits on opposing sides of the wall may be adjusted together, dependent upon one another. For instance, when the angle of inclination of a first conduit on one side of the wall is adjusted, the angle of inclination of the second conduit on the other side of the wall may also be adjusted to match the new angle of the first conduit, or may remain different from the angle of inclination of the first conduit.

Differential Pressure Set Point Indicators

A number of different differential pressure set point indicators suitable for use with embodiments disclosed herein will now be described.

Figure 8:
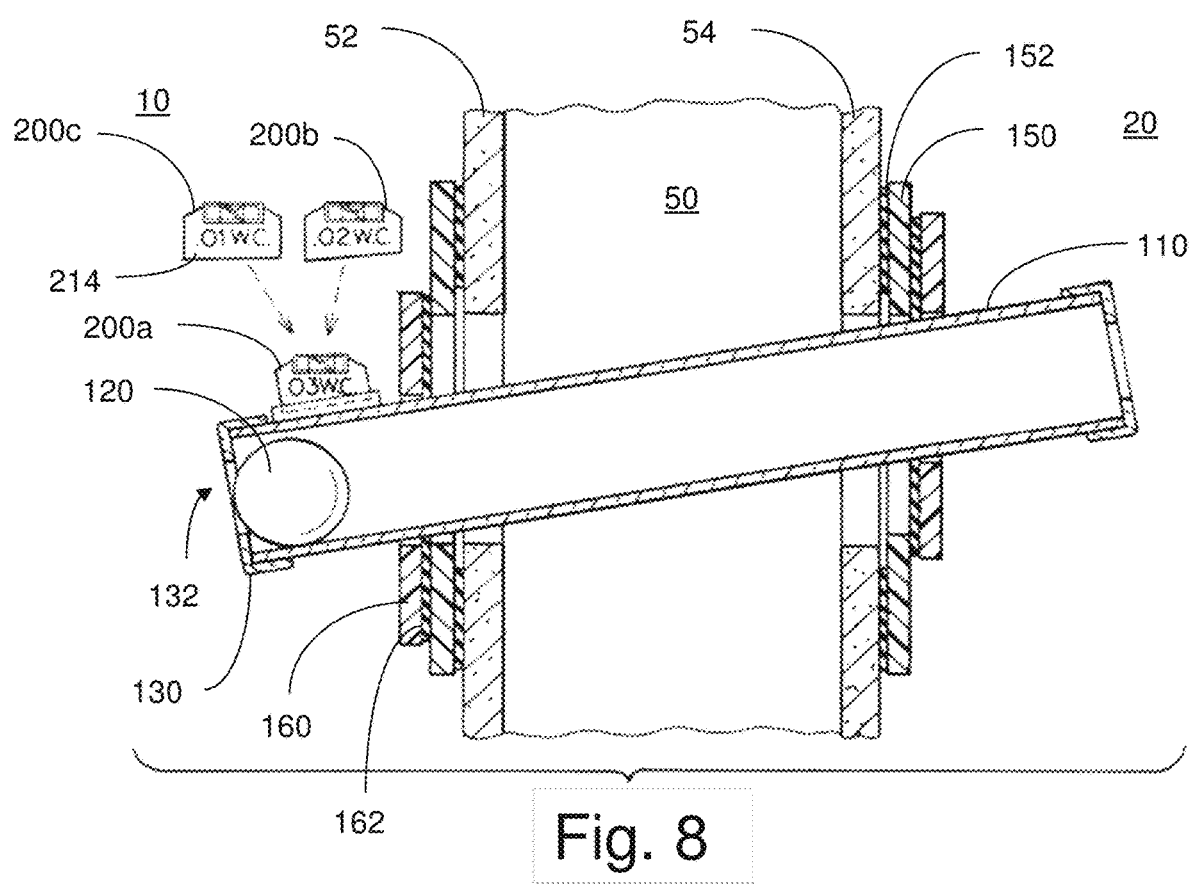
FIG. 8 is a cross-sectional view of a device for detecting a directional differential pressure in accordance with some embodiments.
Figure 9:
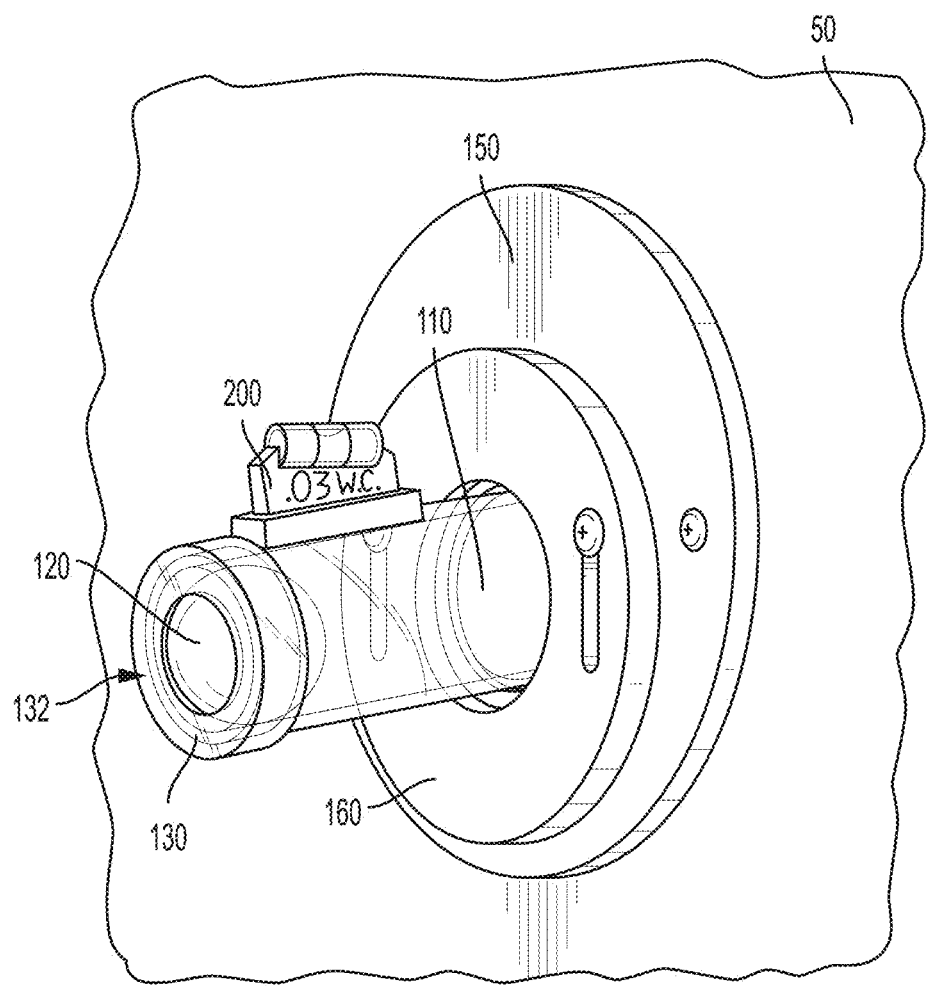
FIG. 9 is a partial perspective view of the device of FIG. 8.

FIGS. 8-9 show a device with an interchangeable bubble differential pressure set point indicator 200. Each bubble differential pressure set point indicator has a vial containing a liquid and an associated bubble. When the bubble reaches a steady equilibrium alignment between the lined markings on the vial, the differential pressure set point indicator is considered to be level with respect to the horizontal.

As shown, any one of a series of bubble differential pressure set point indicators 200a, 200b, 200c may be appropriately secured to the conduit. Each bubble differential pressure set point indicator 200 has a base plate 214 constructed for appropriate attachment to a surface of the conduit. The bottom surface of each base plate 214 is sloped so that when the respective differential pressure set point indicator is installed, the bubble will attain steady alignment between the lined markings when the conduit is set at a particular angle of incline. That is, the conduit will be positioned at an angle of incline that will allow the bubble of the differential pressure set point indicator to steadily remain within the middle of the vial between the lined markings. Such an angle of incline will correspond to the desired threshold differential pressure between separate spaces that would cause the ball to be displaced from the lower end toward the higher opposite end.

Referring to FIGS. 8-9, the currently installed differential pressure set point indicator 200a corresponds to a threshold differential pressure of 0.03 inches of $H_2O$ (IWC). Accordingly, when the conduit is installed at the appropriate angle where the bubble of the differential pressure set point indicator 200a remains steadily at the middle of the vial, a directional differential pressure between rooms of 0.03 inches of $H_2O$ or greater in the direction that causes air to flow in the direction from the lower end to the higher end of the conduit and will generate enough forces to cause the ball to move from room 10 to room 20. Hence, if the directional differential pressure between rooms is less than 0.03 inches of $H_2O$ in the direction from room 10 to 20 or the directional differential pressure goes to zero or reverses, then the pressure differential and potential air flow forces on the ball will be insufficient to overcome the force of gravity on the ball. In such a case, the ball will remain at the lower end of the conduit.

The differential pressure set point indicator 200a may be appropriately replaced with either of differential pressure set point indicators 200b, 200c which, in this illustrative example, correspond to threshold pressure differentials of 0.02 inches of $H_2O$ and 0.01 inches of $H_2O$, respectively. Thus, if the device is fitted with differential pressure set point indicator 200b, when the conduit is installed at an angle such that the bubble pointer of the differential pressure set point indicator 200b remains steadily at the middle of the vial, a directional differential pressure between rooms of 0.02 inches of $H_2O$ or greater in the direction from room 10 to 20 will cause the ball 120 to be moved from room 10 to room 20. And if the differential pressure between rooms is less than 0.02 inches of $H_2O$ in the direction from room 10 to 20 or the directional differential pressure goes to zero or reverses, then the pressure differential and potential air flow forces on the ball will be insufficient to overcome the force of gravity on the ball.

Figure 10:
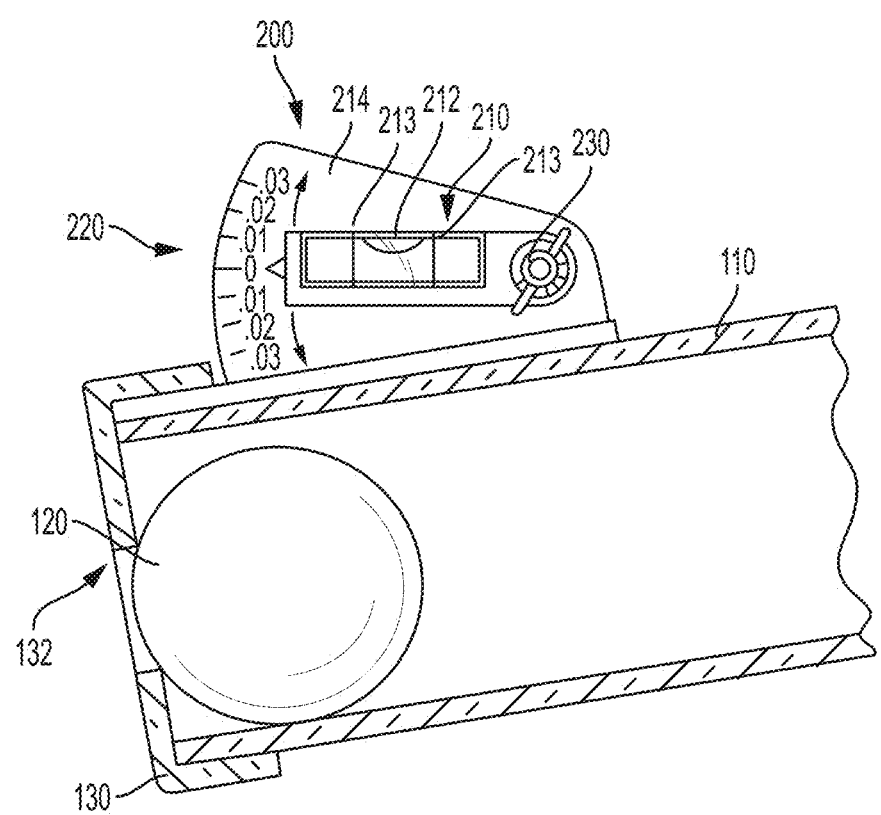
FIG. 10 is a partial cross-sectional view of another device for detecting a directional differential pressure in accordance with some embodiments.

As shown in FIG. 8, the indicator 200 senses the degree of incline of the conduit 110. The bottom surface of base plate 214 for attachment of differential pressure set point indicator 200a (corresponding to a threshold directional differential pressure of 0.03 inches of $H_2O$) to the conduit has a slope that is greater than that of differential pressure set point indicator 200b which, in turn, has a slope greater than that of differential pressure set point indicator 200c. Accordingly, for the differential pressure set point indicators of FIGS. 8-9, a greater desired threshold differential pressure will require a greater degree of slope of the conduit An embodiment of a device fitted with an adjustable bubble differential pressure set point indicator is shown in FIG. 10. Like other bubble differential pressure set point indicators, this differential pressure set point indicator includes a vial 210 with a liquid and associated bubble pointer 212. The vial may be appropriately rotated about a pivot 230 with a fastener (e.g., wing nut), capable of loosening and securing rotation of the vial about the pivot so that the vial points to markings 220 that indicate corresponding threshold differential pressure values that may be set between separate spaces which, in turn, correspond to the appropriate angle of inclination of the differential pressure set point indicator 200 and, hence, the angle of the conduit 110 itself when the bubble pointer 212 is between the boundary lines 213. For instance, when it is desired for the device to be installed so as to extend through a wall and between rooms to indicate to an observer that a directional differential pressure of at least 0.02 inches of $H_2O$ is present, then, in the embodiment of FIG. 10, the angular position of the vial on the pivot 230 is adjusted so that the vial 210 points to the particular marking that references a pressure of 0.02 inches of $H_2O$ in the desired direction of potential air flow. The desired direction of potential air flow is determined by placing the low end of the conduit in the room of desired higher pressure relative to the other room where the high end of the conduit resides. Since the differential pressure set point indicator can sense both directions of the conduit incline, there may be similar symmetric markings for the desired threshold differential pressure set point in each direction. Accordingly, the device is appropriately installed such that the pointer of the vial 210 aligns with the appropriate directional differential pressure markings resulting in the conduit having an angle of inclination that allows the bubble pointer 212 to remain steady at the middle of the vial between the boundary lines 213. Hence, after appropriate installation, a directional differential pressure in the direction from room 10 to room 20 of 0.02 inches of $H_2O$ or greater will generate enough pressure differential and potential air flow forces on the movable element to cause the ball to move from room 10 (lower end) to room 20 (higher end).

If it is further desired that the device provide indication to an observer of whether a directional different differential pressure between rooms is present, then the pivot can be appropriately adjusted so that the vial points to the appropriate one of the two similar markings which correspond to the desired pressure, of which the appropriate mark of the two is determined by adjusting the conduit incline with the low end in the desired higher pressure room and the high end in the desired lower pressure room so that the bubble 212 reaches an equilibrium state in the middle of the vial e.g., between boundary lines 213.

For example, a change in the desired pressure difference between the spaces from 0.02 inches of $H_2O$ to 0.03 inches of $H_2O$ with the same desired direction of potential air flow may involve a simple adjustment of the wing nut so that the vial 210 points to the closer marking that references 0.03 inches of $H_2O$, which would involve positioning the conduit at a steeper angle of incline to put the bubble 212 in between the boundary lines 213. Once the differential pressure set point indicator is appropriately adjusted and the angle of inclination of the conduit is set within the wall such that the bubble pointer 212 remains steady at the middle of the vial, the device is now ready to provide an accurate indication of whether the desired direction of potential air flow and directional threshold differential pressure between rooms is actually present.

Adjustable Angle of Inclination

Described below are additional embodiments of monitoring devices which may be adjustable from one side of a wall. The embodiments described below may use various levels and/or differential pressure set point indicators, including embodiments described above. The embodiments described below may provide large ranges of inclination angles for setting threshold pressure differences. In some embodiments, adjustability is possible on both sides of the wall. "Single side adjustment" does not exclude embodiments where adjustability is possible on both sides. Instead, the term is intended to include a device where an aspect of the device on one side of a barrier (such as a wall) is adjustable without necessarily resulting in or requiring adjustment of a portion of the device on an opposite side of the wall.

Figure 11:
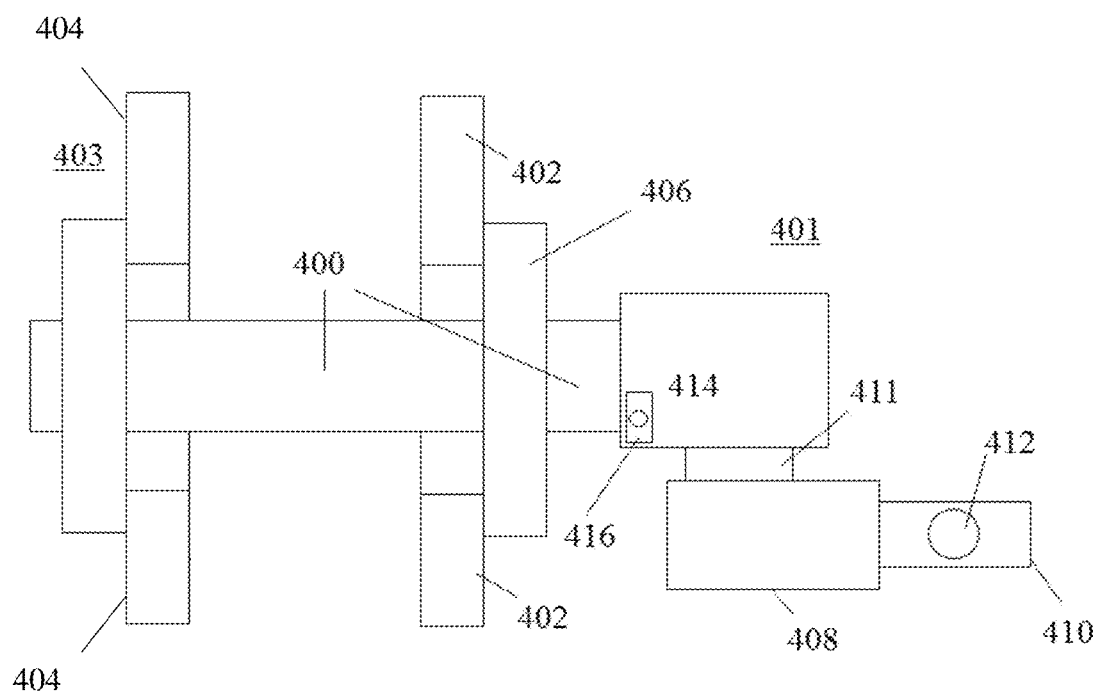
FIG. 11 is a top schematic view of one embodiment of a device for detecting a directional differential pressure in accordance with some embodiments.
Figure 12:
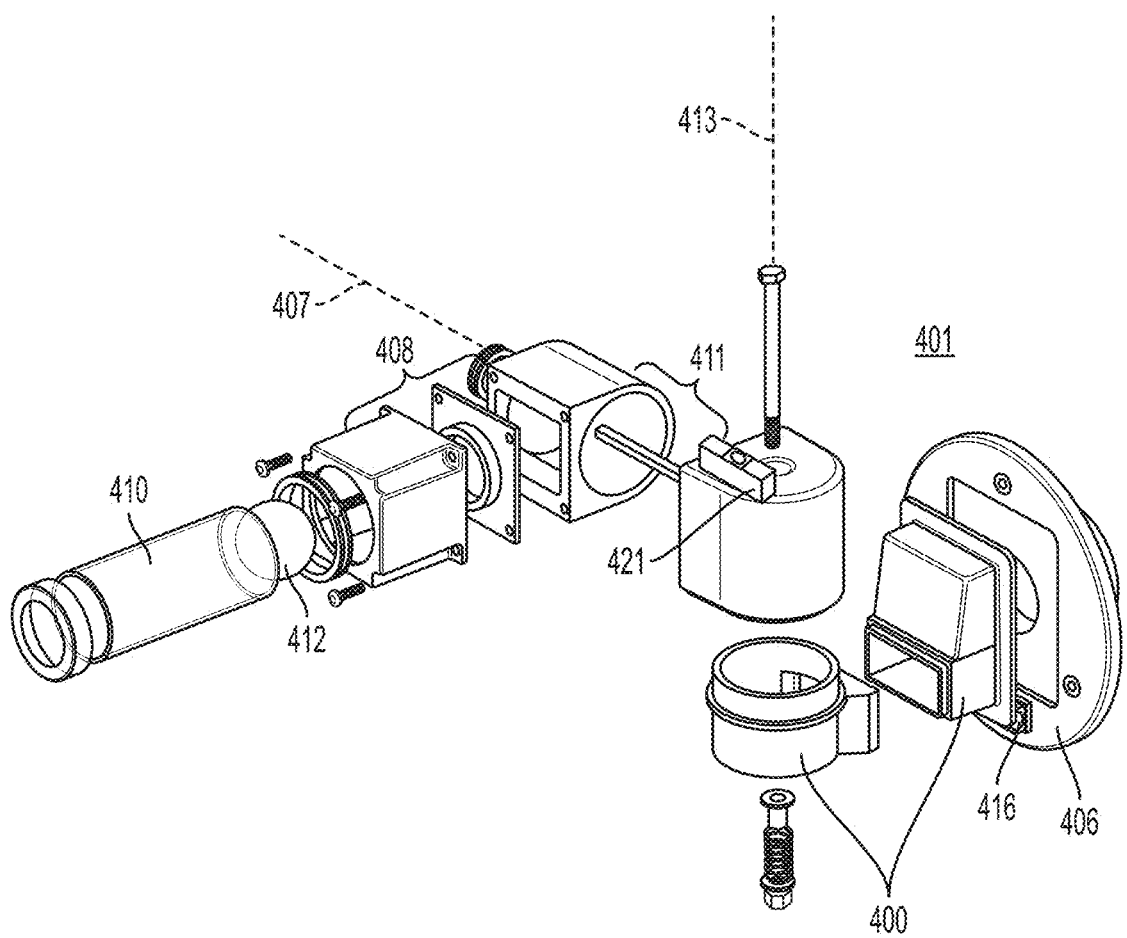
FIG. 12 is an exploded perspective view of the embodiment of FIG. 11.

FIGS. 11 and 12 show a top view and a perspective view, respectively, of one embodiment of a monitoring device. According to this embodiment, a pivot arm may be pivotable about a horizontal axis to adjust a pitch angle, and the pivot arm additionally may be pivotable about a vertical axis to adjust the yaw angle of the pivot arm. The device is braced against a first side 402 of a wall and a second side 404 of the wall using mounting flanges 406 on the exterior of each side of the wall. In various embodiments, the device may be supported in a wall, door, window, or any suitable barrier between a first space (such as a room 401) and a second space 403, such as an external environment 403. The first side 402 of the wall is associated with the room 401 having a first air pressure, and the second side 404 of the wall is associated with the external environment 403 having a second air pressure. The mounting flanges 406 are connected with a first conduit 400 that extends through at least a portion of the wall. The conduit length may be adjustable to conform to the distance between the first side 402 of the wall and the second side 404 of the wall.

An end of the first conduit 400 may be pivotally connected to one face of a swivel base 414 such that the swivel base 414 may rotate ±90° (or more or less in some embodiments) from a home position to adjust the yaw angle of the swivel base 414 about an axis 413. The interface between first conduit 400 and swivel base 414 may have an opening that fluidly connects the flow passageway of the first conduit 400 to a flow passageway of the swivel base 414. In some embodiments, the flow passageway within the swivel base 414 bends perpendicularly such that the flow path begins on a first face of the swivel base 414 and ends on a second face of the swivel base 414 that is adjacent to the first face.

A pivot arm 408 is pivotally attached to swivel base 414 such that the pivot arm 408 may rotate about a horizontal axis 407. A transparent window 410 portion of the pivot arm 408 includes a ball 412 (or other movable element) that moves in response to pressure differences between the two spaces separated by the wall.

The swivel base 414 may have a level 416 attached to aid in checking whether the device is correctly set in the wall in terms of a roll component. In one embodiment, the level 416 may use an air bubble in liquid to indicate whether the device is oriented correctly. Additional levels may be placed at other suitable locations to help with checking pitch and yaw orientations of the device. For example, in addition to, or instead of, level 416, a level 421 may be included on the device to verify whether pivot arm axis 407 is horizontal.

By using levels to confirm the horizontal orientation of the pivot arm axis, the device can compensate for a wall (or other barrier) that is not plumb. In embodiments where there is a rotating base, placing the level on the rotating base can also allow the device to compensate for out-of-alignment structure between the wall and the rotating base.

The pivot arm 408 is attached to the swivel base with a cylindrical connector 411 in this embodiment. A cylindrical insert is attached to swivel base 414 and is received by a corresponding cylindrical recess on pivot arm 408. Such an arrangement allows for a wide range of inclination angles according to an aspect of things disclosed herein. In some embodiments, the pivot arm 408 may be adjustable by ±90° relative to horizontal about axis 407. In other things, pivot arm 408 may be pivotable in only one direction. For example, pivot arm 408 may be adjustable between 0° and +90°. In some embodiments, pivot arm 408 may be adjustable by at least ±30°, ±45°, ±60°, ±75° or 360°.

The yaw angle of the pivot arm 408 may be adjusted by rotating the swivel base 414 about an axis 413. By adjusting the yaw angle, the orientation of the pivot arm relative to the wall can be tailored to desired position. For example, the arrangement shown in FIG. 12 may be used when a user is looking along the length of a corridor at the device. Rotating the swivel base 414 by 90° counterclockwise from a top view reorients the transparent window 410 so that the ball 412 is easily visible when viewing the device from in front of the wall.

The interface between the swivel base 414 and pivot arm 408 may fluidly connect the flow passageway of the swivel base 414 with one end of a flow passageway that extends through the pivot arm 408. On the other end of the pivot arm 408, the flow passageway may connect with a flow passageway that extends through transparent window 410. The transparent window 410 may have an opening that exposes the flow passageway to the air pressure of the room 401.

In a room with positive differential air pressure, air may flow from the room 401 to the external environment 403. In a room with negative differential air pressure, air may flow into the room 401 from the external environment 403. Embodiments described herein may establish a flow passageway between the room 401 and the external environment 403 using the first conduit 400, the swivel base 414, the pivot arm 408, and the transparent window 410. Within the flow passageway formed by the pivot arm 408 and the transparent window 410, ball 412 may move in and out of the transparent window, depending on the strength and direction of air flow.

For a positive pressure room 401, the pivot arm 408 may be pitched downward to correspond to a chosen differential pressure. Rotating the pivot arm 408 downward increases the force needed to push the ball 412 or other pressure indicator from the transparent window 410 and toward the pivot arm 408. A positive differential air pressure may move the pressure indicator to a stationary position in the pivot arm 408. Not viewing the pressure indicator may indicate that the room 410 has the appropriate positive air pressure. If the pressure indicator is visible within the optically transparent portion of the pivot arm 408, the air pressure may be below the pressure for which the device is calibrated and the user may be alerted.

For a negative pressure room 410, the pivot arm 408 may be pitched upward to correspond to a chosen pressure. Rotating the pivot arm 408 upward increases the force needed to push the pressure indicator 412 from the pivot arm 408 and toward the transparent window 410. A negative differential air pressure may move the pressure indicator to a stationary position in the transparent window 410. Viewing the pressure indicator may indicate that the room 401 has the appropriate negative air pressure. If the pressure indicator is not visible within the transparent window 410, the room air pressure is higher than the pressure for which the device is calibrated and the user may be alerted. In one embodiment, the pressure indicator may be a ball or some other easily movable object.

Figure 14:
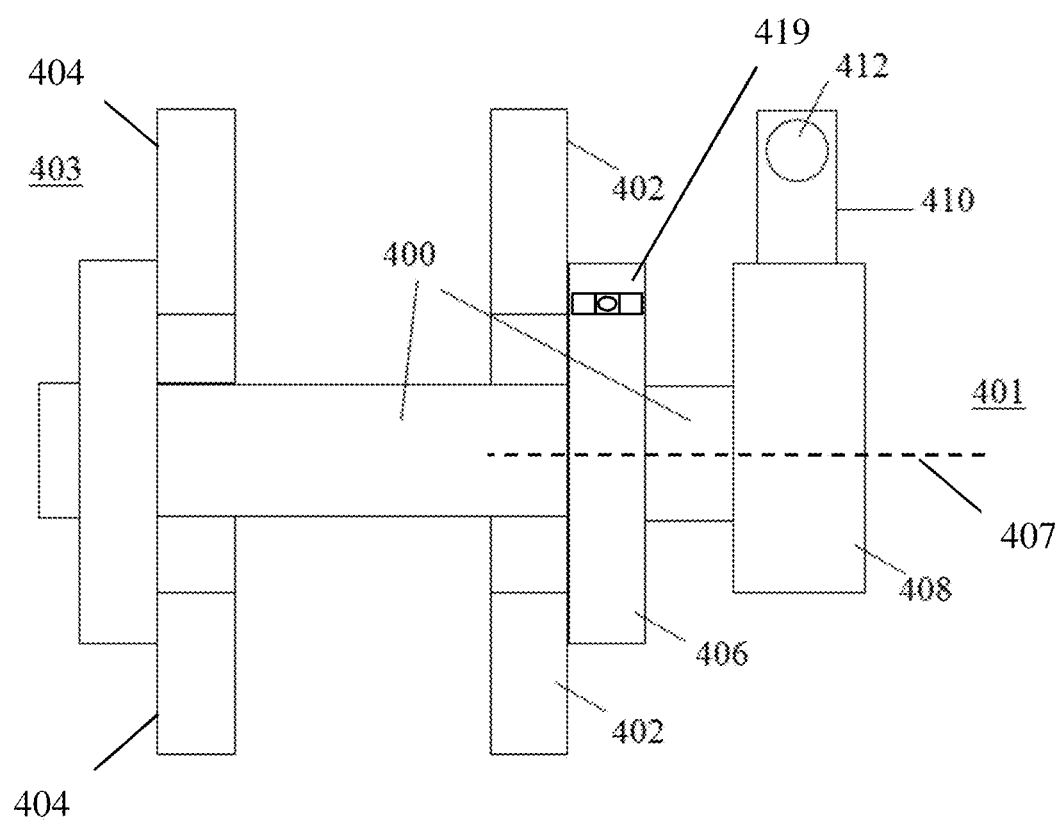
FIG. 14 is a top schematic view of one embodiment of a device for detecting a directional differential pressure in accordance with some embodiments.
Figure 15:
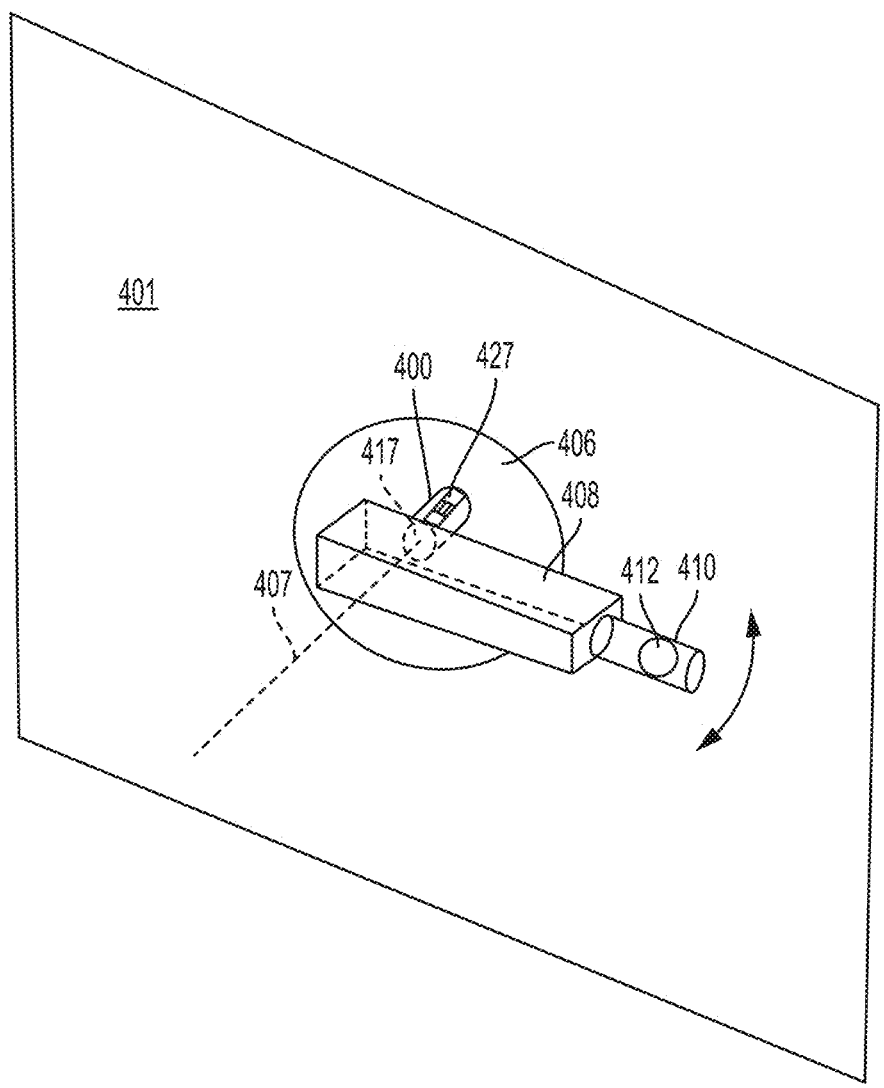
FIG. 15 is a perspective view of the embodiment of FIG. 14.

In another embodiment shown in FIGS. 14 and 15, no swivel base 414 may be present such that the pivot arm 408 is directly connected to the first conduit 400 to establish a fluidic pressure connection. This configuration may reduce the space that the device occupies, as the pivot arm 408 is parallel to the first side 402 of the wall. As with the previous embodiment shown in FIGS. 11 and 12, the device is supported in a wall by mounting flanges 406 on a first side 402 of a wall and on a second side 404 of the wall. The first side 402 of the wall faces into a room 401 with a first air pressure.

On the first side 402 of the wall, the conduit 400 is pivotally connected to pivot arm 408. The pivot arm 408 may pivot ±90° to control the air pressure differential monitoring calibration. In some embodiments, the pivot arm may pivot 360°. The flow passageway continues at the interface of the base 400 and the pivot arm 408 and through the pivot arm 408. In one embodiment, the flow path in the pivot arm 408 may bend perpendicularly to change direction.

At the end of the pivot arm 408, a transparent window 410 continues the flow passageway from the pivot arm 408. The end of the transparent window 410 may be open or only partially sealed so the flow passageway is exposed to the first air pressure of the room. Ball 412 may move into the transparent window 410 portion of the pivot arm depending on the air pressure differential between the room and the external environment 403.

The pivot arm 408 may have a level 419 attached to aid in checking whether the device is correctly set in the wall in terms of a pitch component. In one embodiment, the level 419 may use an air bubble in liquid to indicate whether the device is oriented correctly. For example, if the wall is not plump, the device may be shimmed or otherwise adjusted until the level 419 shows that the device is level. In this manner, pivot axis 407 can be verified to be horizontal.

A transition region 417 exists where the passageway is first surrounded by the pivot arm when traveling in a direction toward the pivot arm. In some embodiments, the transition region is where a cylindrical recess surrounds a cylindrical insert. In the embodiment shown in FIG. 15, the conduit 400 may extend slightly into a cylindrical recess (not shown) in pivot arm 408 where the outer surface of conduit 400 engages with an inner surface of the cylindrical recess. This engagement region would be the transition region in such an embodiment. In some cases, such as in the embodiment of FIG. 15, the pivot arm is arranged such that pivoting the pivot arm within the vertical plane does not change a location of the transition region relative to the first conduit. In some embodiments, such as the embodiment of FIG. 15, pivoting the pivot arm does not alter the flow passageway from the conduit to the pivoting arm. For example, the general path that fluid flow would follow to arrive at the pivot arm would not be altered when the pivot arm is pivoted. In this manner, significant changes to air flow resistance in the passageway may be limited, yielding a more accurate reading device.

Figure 13:
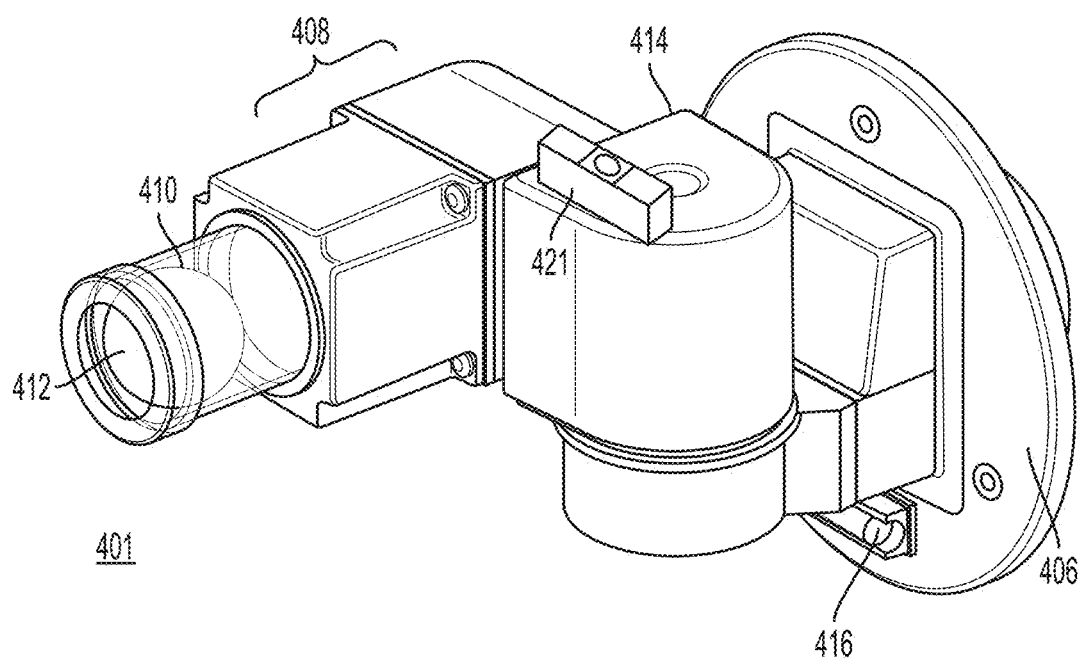
FIG. 13 is a perspective view of the embodiment of FIG. 11.

The embodiment of FIG. 15 may have a level 427 similar to level 419 of FIGS. 13-14 to verify that the pivot axis 407 is horizontal.

Figure 16:
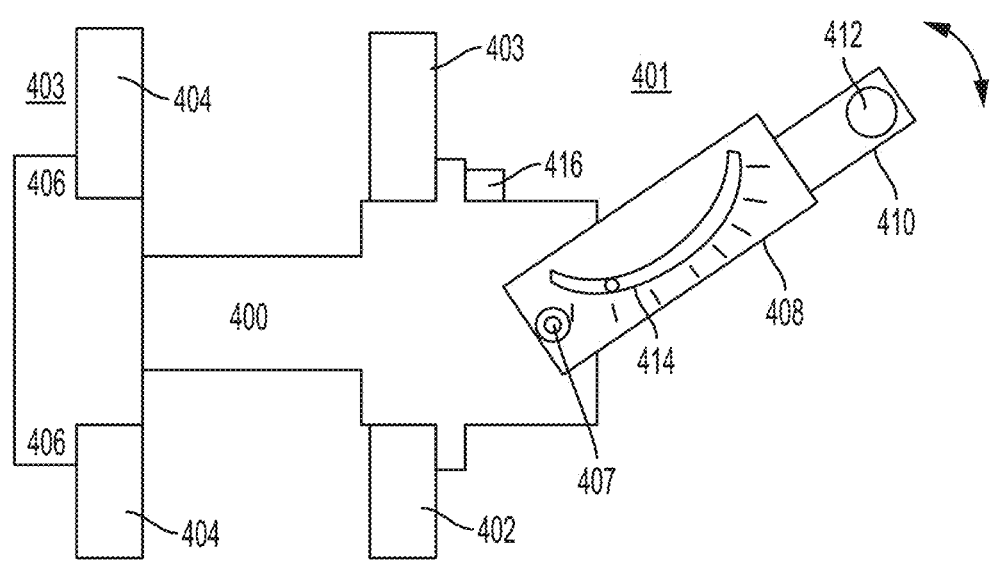
FIG. 16 is a side view of one embodiment of a device for detecting a directional differential pressure in accordance with some embodiments.

FIG. 16 is a side view of one embodiment that includes an inclinometer 414 and a level 416 to improve calibration and ease of use. As in the previous embodiments, the device is supported in a wall that separates a room 401 with a first air pressure and an external environment 403 with a second air pressure, though the device may separate other spaces. The first conduit 400 may be fluidly connected to a pivot arm 408 that pitches ±90° about a pivot axis 407 to control the air pressure differential monitoring calibration. On the pivot arm 408, the inclinometer 414 has gradations that indicate values of differential pressure. The inclinometer may have an internal indicator that moves to mark a measured differential pressure. In some embodiments, the indicator may be a ball, a bubble in fluid, or some other movable means of indicating. In other embodiments, the available range of inclined angles may be different than ±90°. For example, the pivot arm may be able to pivot ±60° or ±45°.

The inclinometer may provide a visual signal of what differential pressure the device is calibrated to measure. If the pivot arm 408 is tilted upward, the pressure indicator 412 is biased toward the rear of the pivot arm 408 and out of the transparent window. In the case of a negative pressure differential, the upward tilt requires an adequate differential pressure to move the pressure indicator 412 back to the transparent window 410 against the force of gravity. Because the inclinometer points to a different gradation depending on the tilt of the pivot arm, the inclinometer provides a straightforward method of viewing the differential pressure for which the device is set, and for changing the set point.

A level 416 may be mounted to the first conduit 400. The level 416 may be used check that the pivot axis 407 is horizontal, that is, in this embodiment, that the pivot arm 408 and inclinometer 414 travel in a vertical plane. Level 416 verifies the roll of conduit 400 is in a correct orientation. A non-horizontal pivot axis could render the inclinometer readings inaccurate or render the inclinometer inoperable. An additional level oriented similar to the level 427 shown in FIG. 15 may be included to keep the device oriented correctly even if there is an out of plumb wall or out of plumb device.

Figure 17:
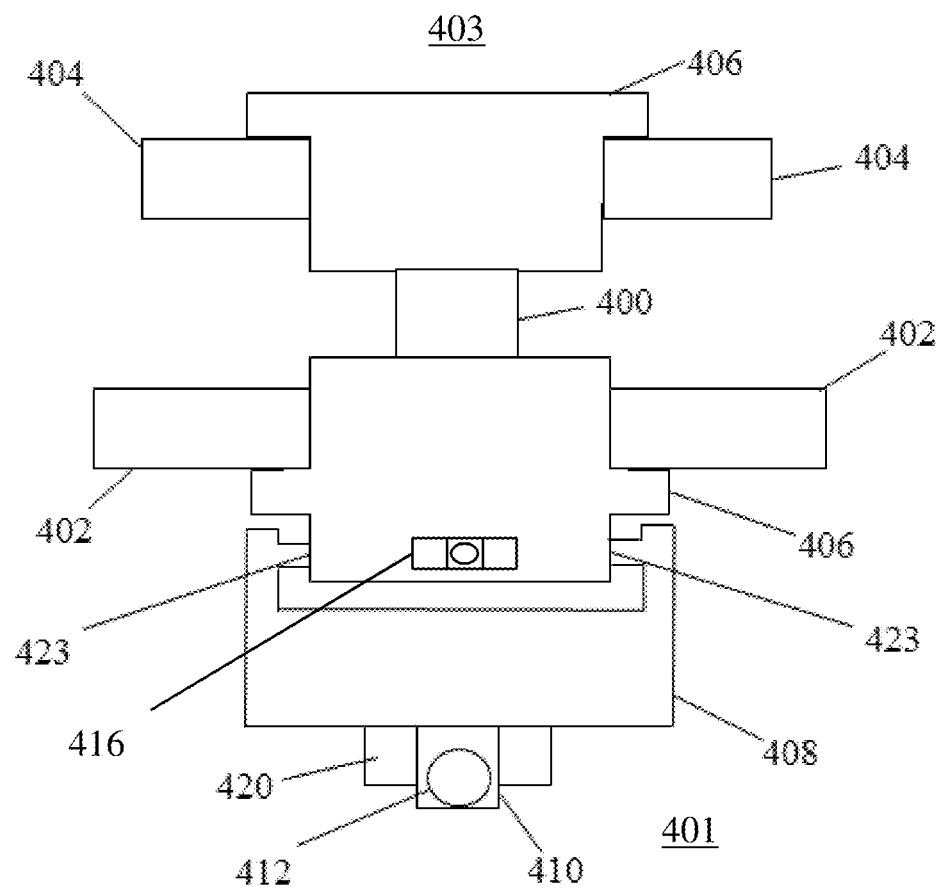
FIG. 17 is a top view of an alternative embodiment of a device for detecting a directional differential pressure in accordance with some embodiments.

FIG. 17 is a top view of an alternative embodiment. As in previous embodiments, the conduit 400 of the device is mounted in a wall that separates a room 401 with a first pressure from an external environment 403 with a second pressure. Conduit 400 provides a fluidic pressure connection between the mounting flanges 406. A pivot arm 408 is pivotally attached to the first conduit 400. The pivot arm 408 may have extended portions at opposite sides.

As in previous embodiments, a flow passageway through the pivot arm 408 fluidly connects the pivot arm 408 to the flow passageway of the first conduit 400. The flow passageway continues into a transparent window 410. As in previous embodiments, the pivot arm 408 may be pitched ±90° to set the device for a given air pressure differential threshold. A pressure indicator 412 may move within the flow path of the pivot arm 408 and the transparent window 410. Exterior to the terminal end, the transparent window 410 may have a photoeye 420 that detects the pressure indicator 412 or the absence of the pressure indicator 412. In one embodiment, the photoeye 420 may comprise an electronic sensor that triggers an alarm that the differential pressure is incorrect when the pressure indicator 412 is absent or present, depending on the configuration. In some embodiments, the electronic sensor may activate a light or other visual cue regarding the presence of ball 412 (or other movable element) indicating that the threshold pressure differential is being met. A second light may be activated when ball 412 is absent, indicating that the threshold differential pressure is not being met. As described elsewhere herein, the absence of ball 412 may indicate that the threshold pressure is being met, while the presence of ball 412 may indicate that the threshold pressure is not being met, and the sensors and visual indicators may be configured correspondingly.

The flow passageway from conduit 400 to pivot arm 408 may be through one or both of pivot connections 423. Connections 423 may be cylindrical connections where a cylindrical insert engages a cylindrical recess, and one component rotates relative to the other.

Figure 18:
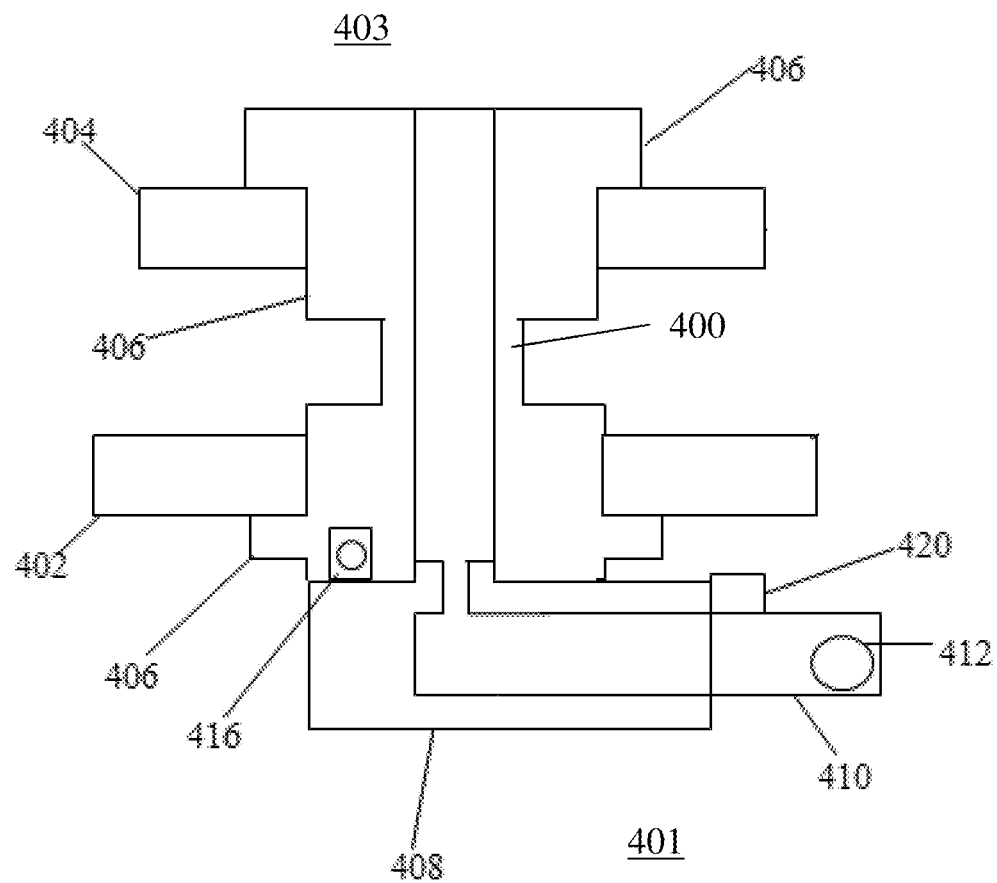
FIG. 18 is a top, cross-sectional view according to one embodiment.

FIG. 18 is a sectional top view of one embodiment of a pressure differential monitoring device. As in previous embodiments, the device is mounted to a wall using mounting flanges 406 on a first 402 and second side 404 of a wall. The mounting flanges 406 are attached to a first conduit 400, which is pivotally connected at one end to a pivot arm 408. The pivot arm 408 has a transparent window 410 at one end. The base 400, pivot arm 408, and transparent window 410 are fluidly connected with a flow path. The end of the flow path at the transparent window 410 is partially sealed and exposed to a first air pressure in a room. The end of the flow path at the second side 404 of the wall may be open or partially sealed such that the passageway is exposed to an external environment with a second air pressure.

Figure 19:
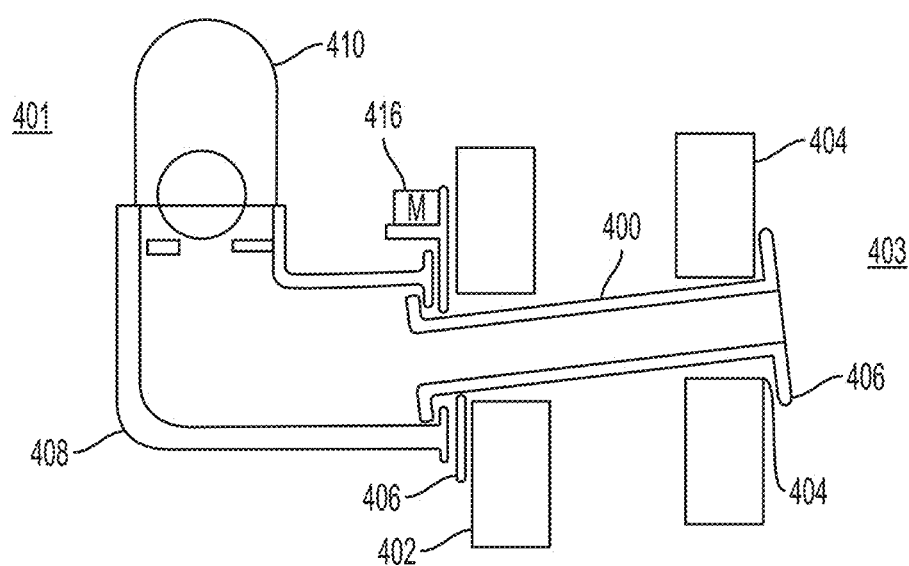
FIG. 19 is a side, cross-sectional view according to one embodiment.
Figure 20:
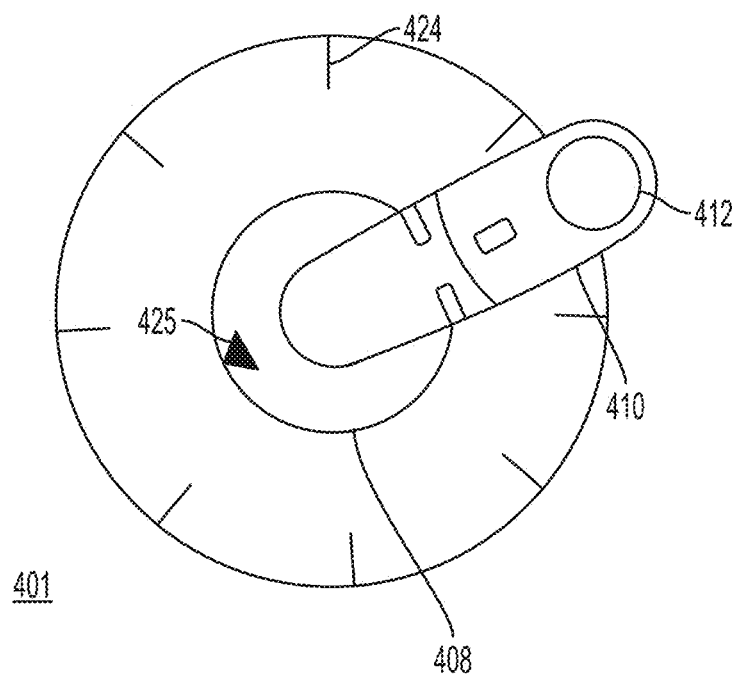
FIG. 20 is a front view of the embodiment of FIG. 19.

FIG. 19 is a side, sectional view of a further embodiment, and FIG. 20 is a front view of the embodiment of FIG. 19. Pivot arm 408 of the device shown in FIGS. 19 and 20 is arranged to rotate 360° about a horizontal pivot axis that is generally perpendicular to the wall. In some embodiments, the pivot arm may rotate in both directions—clockwise and counterclockwise. If the wall is not plumb, the flange 406 may be shimmed or otherwise adjusted such that the axis of rotation is horizontal. A level, such as a bubble level 416 in FIGS. 17, 18, 19, may be provided to check the horizontal plane pitch orientation of the conduit 400. A level also may be used to check the roll orientation of the pivot arm 408 so that pivot arm rotates in a vertical plane.

Marks 424 may be provided to indicate angles and/or threshold differential pressure levels associated with the angle of rotation of pivot arm 408. An arrow 425 or other mark may be provided on a rotating portion of the pivot arm to show which threshold differential pressure level is being set.

Differential Pressure Set Point Indicators

Additional embodiments for differential pressure set point indicators are described below. These differential pressure set point indicators may be used with the various embodiments of monitoring devices disclosed herein.

Figure 21:
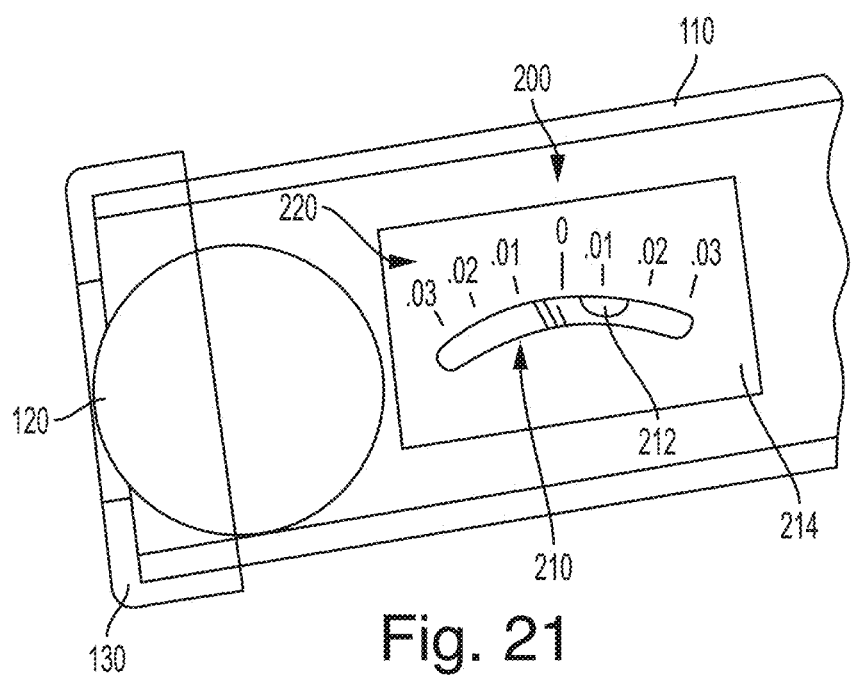
FIG. 21 is a partial view of a device for detecting a differential pressure in accordance with some embodiments.

FIG. 21 shows a device that includes a bubble differential pressure set point indicator. In this embodiment, the differential pressure set point indicator 200 is attached to the conduit, 110 via an appropriate base plate 214, and includes a vial 210 that contains liquid and an associated bubble pointer 212. Due to the geometry of the vial and gravity acting on the liquid within the vial, the bubble moves to the highest possible point within the vial. Here, the vial 210 exhibits a geometry (e.g., curvature) that allows for the bubble to provide differential pressure set point information at multiple regions along the vial. For instance, when the conduit is perfectly level, the bubble moves toward a position where the vial and base plate correlate to being level. However, when the conduit is tilted at an angle, the position of the bubble relative to the vial will change, so as to provide an indication that the conduit is set at a different angle of incline.

Accordingly, appropriate markings 220 are provided adjacent to the vial so that appropriate differential pressure set point information can be provided to an observer (e.g., someone who is adjusting the tilt of the conduit) when the conduit is angled in a manner that brings the bubble into steady alignment near particular marking(s). Since the differential pressure set point indicator can sense both directions of the conduit incline, there are two similar symmetric markings for each desired threshold differential pressure set point. Here, the markings 220 refer to the threshold directional differential pressure between rooms required to generate enough differential pressure and potential air flow forces to move the ball from the lower end of the conduit to the higher end. That is, the conduit 110 may be tilted so that the bubble pointer 212 aligns with the appropriate one of the two similar markings which correspond to the desired pressure, of which the appropriate mark of the two is determined by adjusting the conduit incline with the low end in the desired higher pressure room and the high end in the desired lower pressure room so that the bubble 212 remains in steady alignment and pointing to the desired marking that indicates a particular value of the directional pressure differential. When the conduit is installed at the angle that corresponds to that particular value of pressure differential, movement of the ball 120 to a higher region of the conduit may provide assurance to an observer that the directional differential pressure indicated by the bubble 212, at a minimum, actually exists between the separate spaces.

Figure 22:
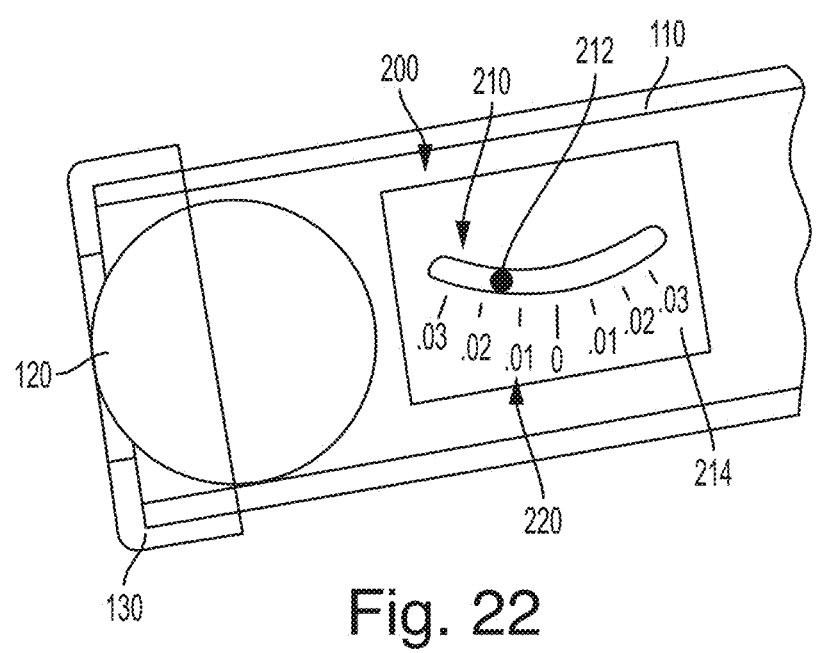
FIG. 22 is a partial view of another device for detecting a directional differential pressure in accordance with some embodiments.
Figure 23:
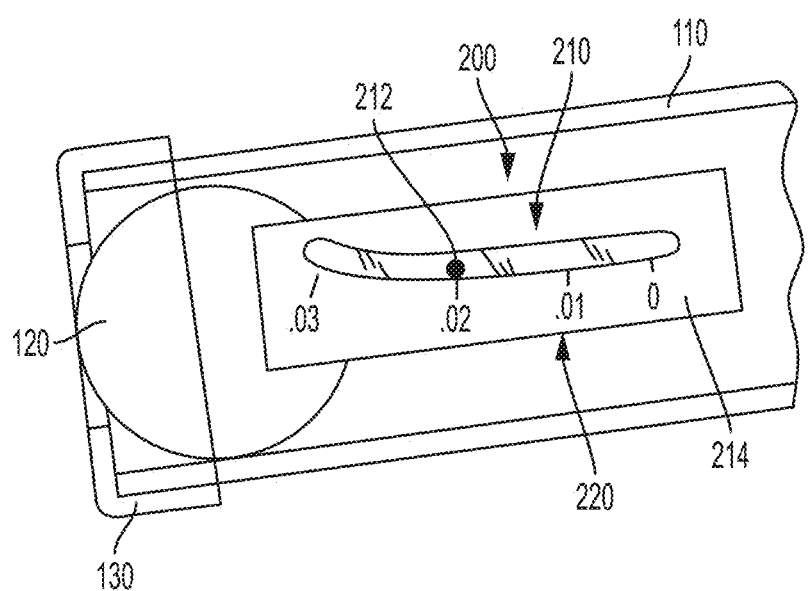
FIG. 23 is a partial view of a device for detecting a directional differential pressure in accordance with some embodiments.

FIGS. 22-23 show devices that include a weighted ball-type differential pressure set point indicators where the differential pressure set point indicator 200 includes a vial 210 with a weighted ball pointer 212. The vial 210 is filled with a fluid (e.g., gas, liquid) and the ball pointer moves to the lowest point within the vial by force of gravity. The vial 210 may exhibit a curvature that permits the ball to provide information regarding the angle of incline of the conduit when the ball 212 remains in steady alignment at various regions along the vial. For instance, when the conduit is perfectly level, the ball pointer 212 moves toward the middle of the vial. Though, when the conduit is tilted at an angle, the ball pointer 212 may still remain in steady alignment with a region of the vial that is offset from the middle of the vial.

Markings 220 are provided adjacent to the vial so that appropriate information can be provided when the conduit is tilted such that the ball pointer 212 steadily aligns with a particular set of the markings. The markings 220 refer to the threshold directional differential pressure set point between rooms required to create a sufficient degree differential pressure and potential air flow forces that moves the ball 120 within the passageway of the conduit 110 from the lower end of the conduit to the higher end. That is, the conduit 110 may be tilted so that the ball pointer 212 aligns with markings that indicate a particular value of directional pressure differential. When the conduit is installed at the angle that corresponds to that particular value of directional pressure differential, movement of the ball 120 within the passageway from the lower end of the conduit to the higher end of the conduit may provide assurance to an observer that the directional differential pressure indicated by the ball pointer 212, at a minimum, actually exists between the rooms.

FIGS. 22 and 23 are various embodiments of ball-type differential pressure set point indicators 200 where the shape of the vial differs. Depending on how the vial of a ball-type differential pressure set point indicator is shaped, the markings 220 which relate the angle of incline of the conduit to the threshold pressure differential(s) between rooms will be calibrated and appropriately positioned.

The ball-type differential pressure set point indicator of FIG. 22 provides for different threshold differential pressure set points. Since the differential pressure set point indicator can sense both directions of the conduit incline, there are two similar symmetric markings for each desired threshold differential pressure set point. The ball-type differential pressure set point indicator of FIG. 23 provides for threshold differential pressure information for tilt of the conduit in only one direction, and so the markings may be unidirectional. In some embodiments, the ball-type differential pressure set point indicator of FIG. 23, as compared to, for example, that of FIG. 22, provides for a finer degree of set point adjustment for indicating whether the threshold differential pressure between rooms is present.

Figure 24:
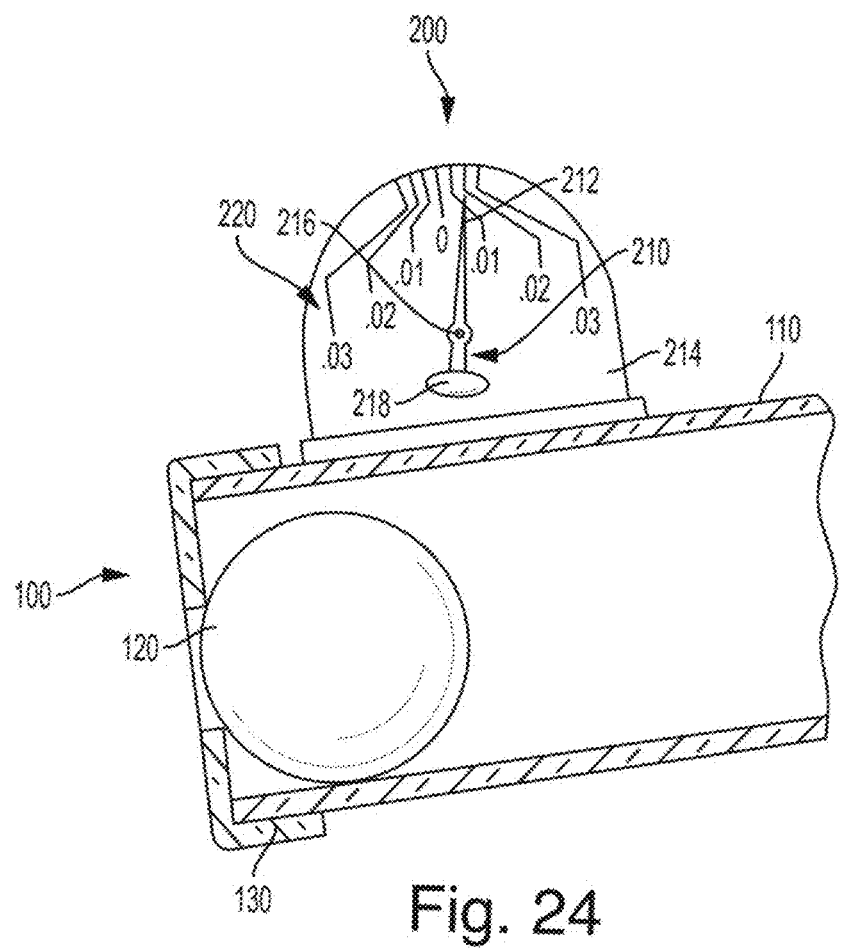
FIG. 24 is a partial view of a device for detecting a directional differential pressure in accordance with some embodiments.

In the embodiment of FIG. 24, the device 100 includes a differential pressure set point indicator 200 having a weighted pointer 210. As shown, the differential pressure set point indicator 200 is rigidly secured to the outer surface of the conduit 110 via base plate 214. The differential pressure set point indicator 200 includes a tip pointer 212 that is pivotally connected to the base plate 214. A weight 218 is provided at an end opposite the tip pointer below the pivot point 216. When the conduit 110 is placed within a wall at an angle of inclination with respect to the horizontal, the tip pointer 212 will vary in its position and pivot to reflect the degree to which the conduit is tilted with respect to the horizontal.

The tip pointer is further adapted to rotate about the pivot point so as to point to the bi-directional reference markings 220, which are calibrated to match the angle of incline with the threshold differential pressure between opposite ends of the conduit 110 at which the ball 120 will be urged against the force of gravity to move from the lower end toward the opposite higher end of the conduit. As such, depending on the angle of incline of the conduit, the tip pointer will come into steady alignment with reference markings 220 that are calibrated to represent minimum differential pressures required to move and maintain the ball 120 at a desired position within the conduit, for instance, at the highest point.

Figure 25:
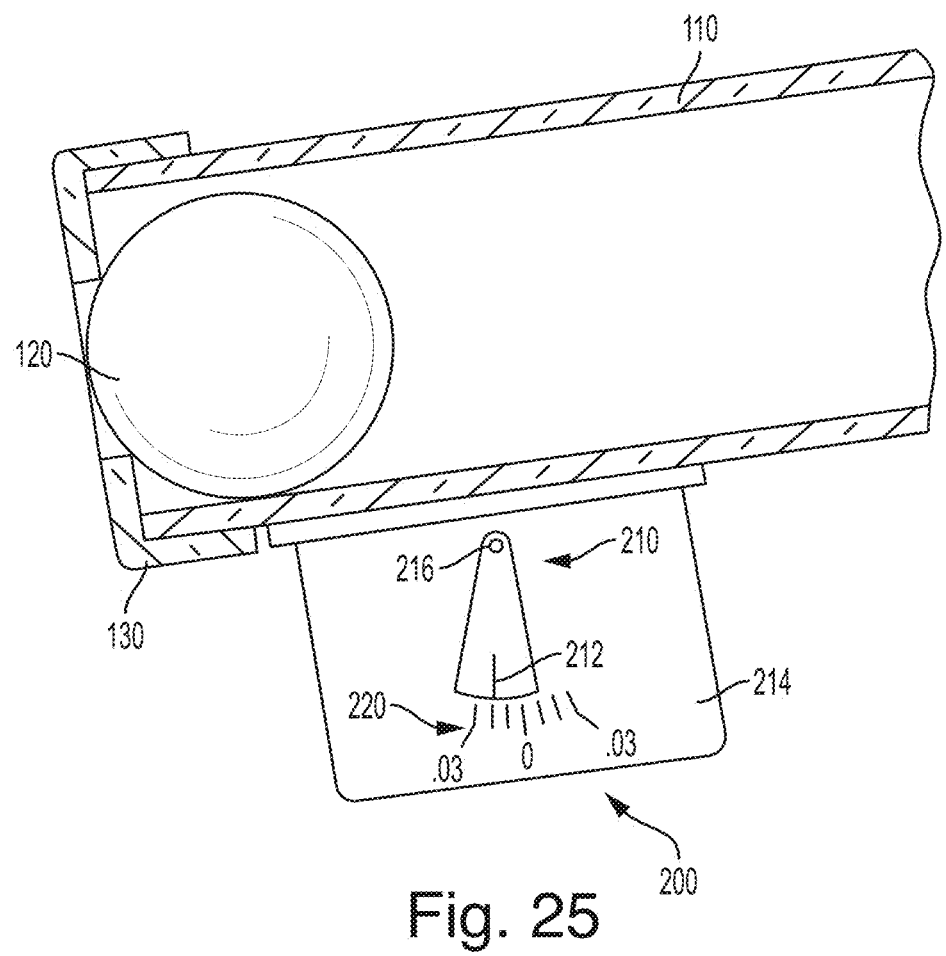
FIG. 25 is a partial view of a device for detecting a directional differential pressure in accordance with some embodiments.

FIG. 25 shows a device 100 that includes a pendulum directional differential pressure set point indicator 200. The differential pressure set point indicator 200 is rigidly secured to the outer surface of the conduit 110 via base plate 214. The differential pressure set point indicator 200 includes a pendulum pointer 212 that is pivotally connected to the base plate 214 at a point 216. Here, the pendulum pointer 212 extends downwardly and rotates about the pivot point 216 so as to point to the bi-directional reference markings 220 which are calibrated similarly to that described above regarding FIG. 24.

Thus, given a desired minimum differential pressure between enclosed spaces that are separated by a wall through which the conduit extends, appropriately calibrated differential pressure set point indicators with accurate markings may allow the angle of inclination of the conduit according to the present disclosure to be easily adjusted to suit the desired directional pressure differential. That is, the conduit of a device installed into a wall separating two enclosed spaces may be oriented at a particular angle that corresponds to a threshold differential pressure between the separate spaces sufficient to cause a ball, or other movable element, disposed within the conduit to move from the lower end to the higher end of the conduit. When it is desired for that threshold differential pressure between the separate enclosed spaces to be altered, the differential pressure set point indicator, with appropriately calibrated reference markings, may be used as an easy reference to determine what the adjusted angle of the conduit should be to correspond to the new threshold pressure differential.

Such an adjustment of the angle of the conduit may be a relatively simple procedure. For instance, in some embodiments, fasteners attaching respective outer wall flanges 160 to inner wall flanges 150 of the device may be loosened and the outer wall flanges, which provide support for the conduit, may be shifted vertically with respect to the inner wall flanges so as to suitably alter the angle of incline of the conduit. An appropriately calibrated differential pressure set point indicator may be used as a reference to determine what angle of incline to which the conduit should be set so as to correspond to the desired threshold differential pressure between opposite ends of the conduit. Once the conduit is oriented in accordance with the appropriate angle of incline, the fasteners of respective outer wall flanges are then tightened to set the conduit firmly in place. Respective gaskets secured to the outer wall flanges may assist in holding the conduit securely at the desired orientation.

Suitable adjustments of the angle of incline of the conduit may be performed manually or automatically. For example, an operator may use the above procedure to adjust the angle of incline of the conduit manually.

Or, the device may be set up in accordance with an automated system that is configured to adjust orientation of the conduit automatically depending on the desired level of differential pressure between spaces on opposite sides of the wall. In some embodiments, the device may be configured with a control system that automatically adjusts the angle of incline of the conduit according to input provided by a user, or related computer system, of a desired differential pressure to be established between neighboring spaces. For example, a user may simply input the minimum differential pressure that is required between two rooms into a user interface and the system may automatically, without further user interaction, adjust the angle of incline of the conduit to correspond to the desired minimum differential pressure between rooms. In some cases, the control system may refer to the differential pressure set point indicator by any suitable detection method, to determine the appropriate angle of incline of the conduit.

As discussed, physical features other than the incline of the conduit may provide an indication of whether the directional differential pressure between spaces meets a certain threshold.

For instance, the type of ball placed within the passageway of the conduit may be chosen based on particular characteristics, such as weight or surface finish of the ball. That is, a greater differential pressure will be required to move a heavier ball from a lower region of the conduit to a higher region of the conduit. Conversely, if the ball is lighter, a smaller differential pressure will be required to move the ball toward the higher end of the conduit. Alternatively, a ball having a rough surface finish may require a greater degree of air flow provided through differential pressure to move the ball toward the higher end of the conduit. Accordingly, different balls, or movable elements, may be marked according to the range of differential pressure that the detector, incorporating the particular ball(s), may indicate.

Alternatively, the type of stops at the ends of the conduit may be chosen according to the particular range of directional differential pressure(s) to be detected. For example, for a given ball within the conduit, an end stop having a small orifice that limits the exposed surface area for which pressure acts on the ball from outside of the conduit when the ball is closing or mating with the end stop or limits the rate of air flow through the conduit may be used as an indicator for the differential pressure between the spaces. That is, where end stops of a detector have relatively small openings such that the exposed surface area for which pressure acts on the ball from outside of the conduit when the ball is closing or mating with the end stop or limits the rate of air flow through the openings is limited, a greater differential pressure will be required to move a ball from a lower region of the conduit to a higher region of the conduit. Conversely, if the openings are wider, allowing a greater surface area or exposed ball to the environment when mating with the end stop or a great flow rate of air through the conduit, a smaller differential pressure may be required to move the movable element toward the higher end of the conduit. As a result, different end stops having different orifice sizes may be marked according to the range of differential pressure that the detector incorporating the particular end stop(s), may indicate.

Thus, different components of the differential pressure detector may be marked so as to provide an indication of the minimum differential pressure threshold that would cause the movable element to move from a lower end region toward a higher opposite end region of the conduit. Markings of the ball, conduit, end stops of the conduit, etc. may refer to actual units of pressure indicating the directional threshold pressure differential set point between rooms; such markings may be alphanumeric values to which a correlating table may be referred; alternatively, the markings may provide an actual property (e.g., ball weight, end stop orifice size, conduit curvature, conduit/ball surface finish, etc.) to which a correlating table may be referred, to determine the corresponding directional threshold differential pressure set point.

A differential pressure set point indicator may be secured to any portion of a device using any suitable manner. In some embodiments, differential pressure set point indicators are secured to a device (e.g., on the outer surface of the conduit) by an appropriate adhesive or fastener. Or, as discussed below, an appropriate holder may be used to mount the differential pressure set point indicator.

Figure 26:
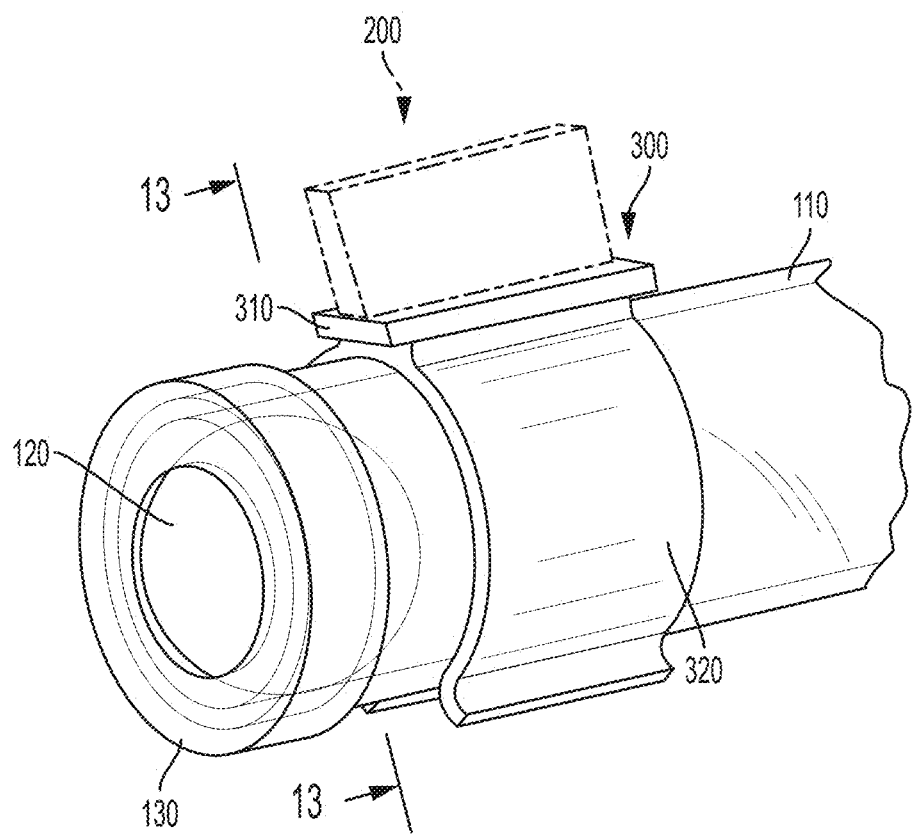
FIG. 26 is a partial perspective view of a holder used with a device for detecting a differential pressure in accordance with some embodiments.
Figure 27:
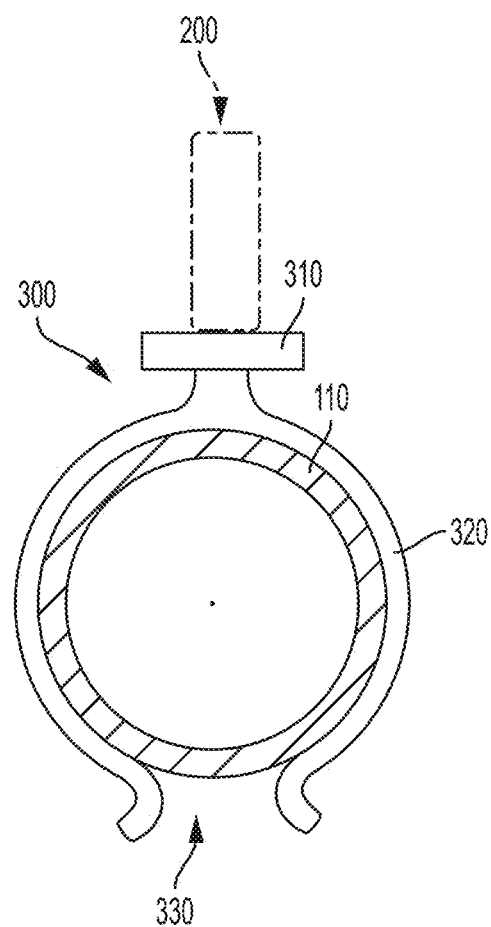
FIG. 27 is a cross-sectional view of the holder used with the device of FIG. 26.

FIGS. 26 and 27 show an embodiment of a holder 300 for mounting the differential pressure set point indicator 200 on to the conduit 110. The holder 300 includes a plate 310 to which a surface of a differential pressure set point indicator may be attached. The holder 300 further includes an elastically deformable spring clip 320 that wraps around the exterior of the conduit 110. In some embodiments, the spring clip 320 has an opening 330 with ends that may be spread apart so that the conduit 110 may be suitably secured within the clip 320. As an alternative, a split ring divided at one or more locations along the ring, capable of fastening tight about the perimeter of the conduit may be used to mount the differential pressure set point indicator.

Sound Attenuation

In another aspect of the present disclosure, it may be desirable for noise to be attenuated upon impact of the ball, or other movable element, against either end stop that is useful for keeping the movable element contained within the conduit. For instance, the ball and end stops of the device may be made of materials that produce a noticeable sound when the ball drops on to an end stop at the lower position or when the ball is pushed up against the end stop at the higher position. For example, a ping pong ball makes a distinct noise upon impact with a relatively rigid surface. In some cases, such a sound may be irritating to people that may be located within either of the rooms that share the device. Thus, a sound attenuator or device may be included for substantially reducing noise when the ball moves from one end of the conduit to the opposite end and is subject to impact.

The sound attenuator may include any suitable material or combination of materials. In some embodiments, the sound attenuator may include a relatively soft energy-absorbing material, such as an elastomer, rubber, neoprene, silicone, plastic, polymer, foam, fibrous material, paper, tissue, netting, etc. In some embodiments, the sound attenuator may exhibit a geometry that cushions the impact of the movable element on a stop.

In some embodiments, a sound attenuator separate from the end stops is fitted with the end stop(s) of the conduit, as shown by way of example, in FIGS. 28, 29, 30, and 32. In other embodiments, the end stop(s) include an energy-absorbing material which is sound attenuating and, hence, comprise the sound attenuator, for example, shown in FIG. 31.

Figure 28:
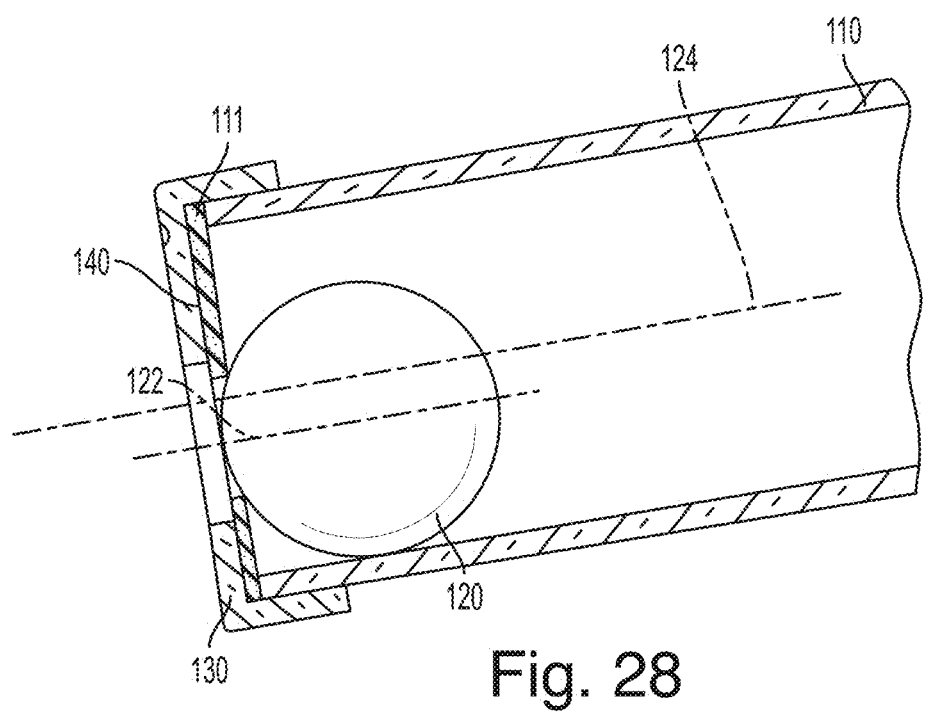
FIG. 28 is a partial cross-sectional view of a sound attenuator used with a device for detecting a directional differential pressure in accordance with some embodiments.
Figure 29:
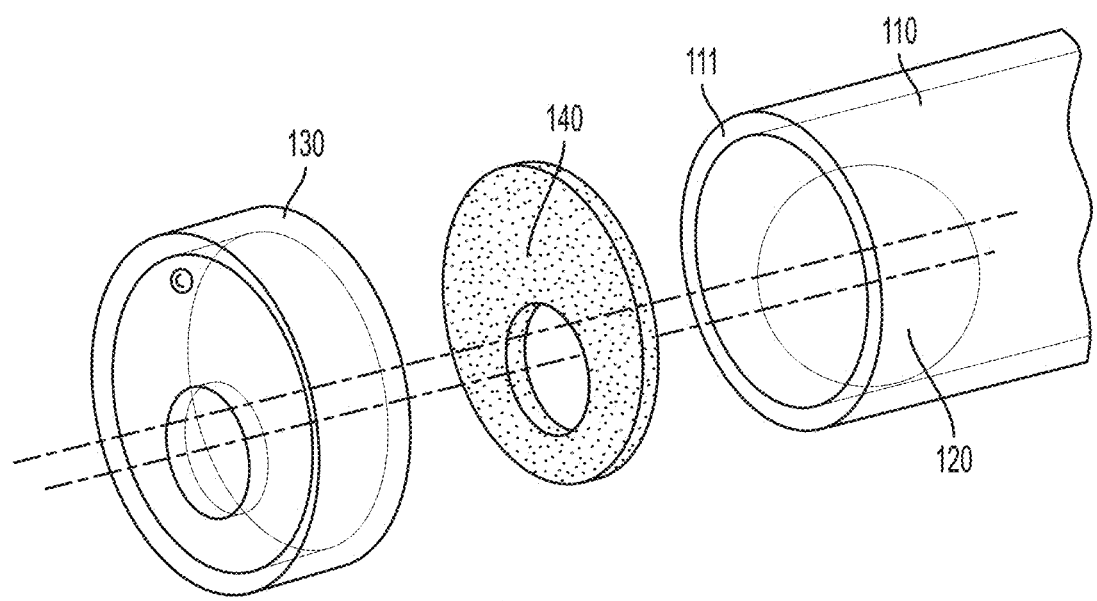
FIG. 29 is a partial exploded view of the sound attenuator used with the device of FIG. 28.

FIGS. 28-29 show conduit 110 with an end stop 130 that forms a suitable fit (e.g., interference fit, snap fit) over an edge 111 of the conduit. Positioned between the edge 111 of the conduit and the end stop 130 is a sound attenuator 140. In this embodiment, the ball 120 is a ping pong ball and the end stop 130 is made of a hard plastic. Thus, without appropriate placement of the sound attenuator 140 between the conduit and the end stop, when the ball impacts against the end stop 130, an abrupt sound is produced which can be easily heard by a person located in the room where the impact occurs, and possibly in an adjacent room where the other open end of the conduit resides. When the sound attenuator 140 is appropriately placed between the conduit and the end stop, impact of the ball against the sound attenuator 140 will produce a much softer sound which is not as readily noticeable as compared with the sound produced when the energy-absorbing material is not present.

Figure 30:
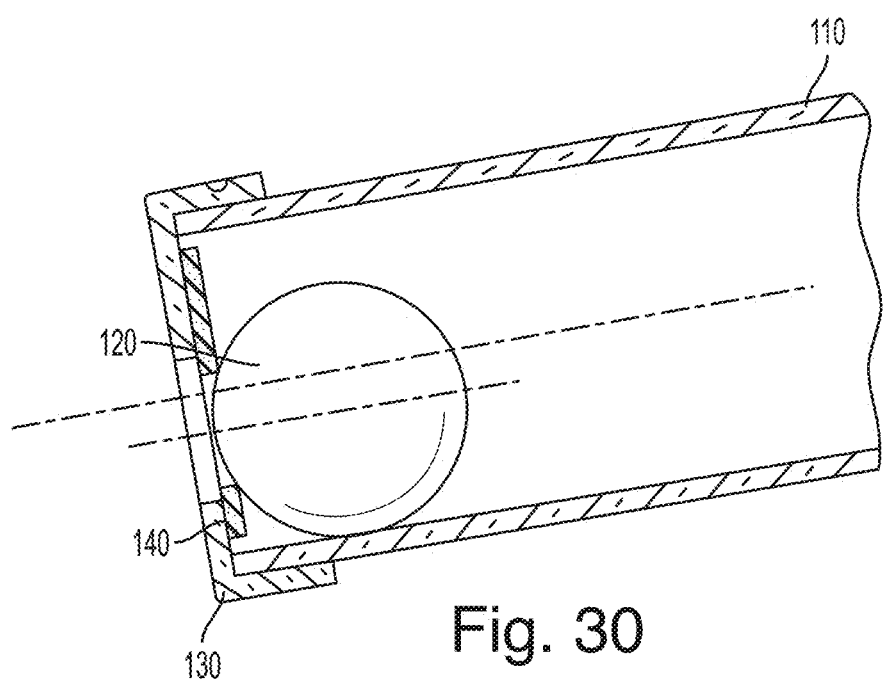
FIG. 30 is a partial cross-sectional view of another sound attenuator in accordance with some embodiments.

FIG. 30 depicts another embodiment of an end stop 130 associated with a sound attenuator 140. Here, the sound attenuator 140 is attached (e.g., adhered) to the inside surface of the end stop. The sound attenuator is made of a material that is shaped in a geometry that absorbs impact energy. Accordingly, when the ball impacts the sound attenuator 140, a relatively soft sound is produced as compared to instances where the energy-absorbing material in an energy-absorbing geometry is not present.

As shown in FIGS. 28-30, a center axis 122 of the opening of the sound attenuator 140 and the opening of the end stop 130 is offset from the center axis 124 of the conduit. The center axis 122 is substantially aligned with a path 124 along which a center of the ball 120 travels. Such alignment of the opening of the sound attenuator with the center of the ball aid in lessening the amount of sound generated upon impact at the end(s) of the conduit than would otherwise be the case without the alignment. Additionally, alignment of the opening of the end stop and/or sound attenuator may prevent air flow through the conduit (via the opening of end stop 130) when the ball is positioned at the end of the conduit. That is, the alignment may contribute to having the ball or other movable element form a seal and limit the transfer of air between rooms whenever the ball abuts the end stop or sound attenuator.

By having the pivot arm of various embodiments herein pivot only in a single plane (e.g. a vertical plane), the path of the center of the ball may align with the opening in the end stop in many or all of the possible inclinations of the pivot arm. Such an arrangement may allow the ball to close the opening when it reaches an end stop. Another end stop may be positioned in the conduit closer to the wall such that when the ball moves toward the wall, it contacts the end stop. This second end stop may have a sound attenuator and/or an opening as with end stop 130.

In some embodiments, there may not be an alignment of the travel path of the center of the ball and an opening at the end of the conduit. For example, an interior-facing portion of an opening at the end of the conduit may be arranged and positioned such that the movable element substantially prevents air flow when the movable element abuts the interior-facing portion of the opening, yet a center axis of the opening (e.g., the centroid of the area of the opening) is not be aligned with a travel path of a center of the movable element. A ramp may be present toward the end of the conduit such that the movable element is pushed up into the opening. In some embodiments, an axis perpendicular to the centroid of the opening is downwardly offset from a center axis of conduit. In embodiments where the conduit pivots only in the vertical plane, such an arrangement may permit the movable element to seal the conduit in some, most, or all of the inclination angles of the conduit.

Figure 31:
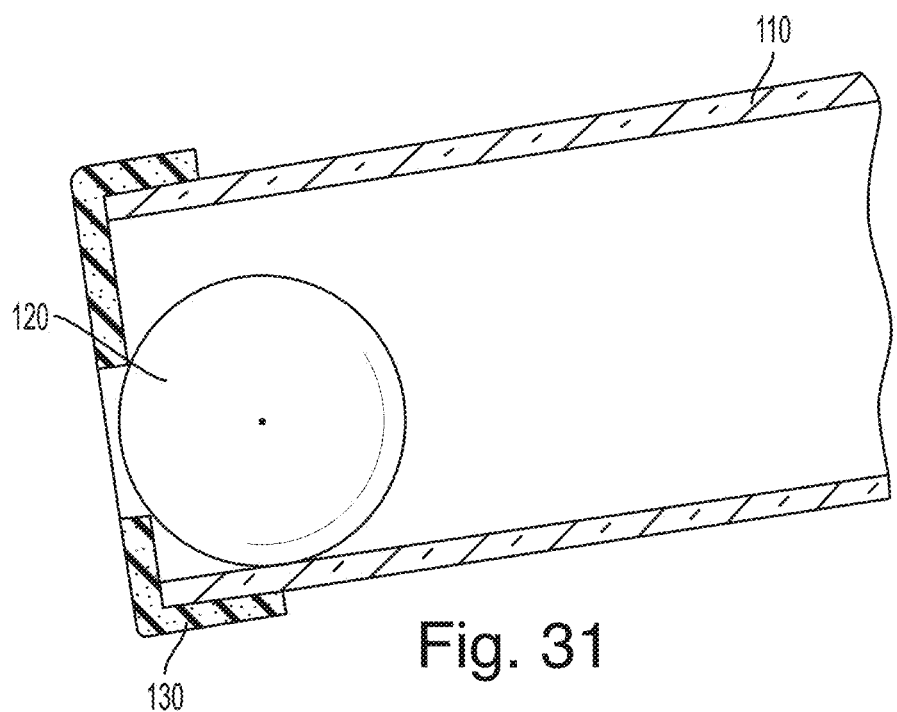
FIG. 31 is a partial cross-sectional view of another sound attenuator in accordance with some embodiments.

In some embodiments, the end stop itself is sound attenuating. As shown in FIG. 31, the end stop 130 includes an energy-absorbing material. In some embodiments, the end stop may exhibit a geometry similar to a diaphragm. As a result, a softer sound is produced when the ball impacts the sound attenuating end stop as compared to an arrangement where the end stop was made of a relatively hard plastic.

Figure 32:
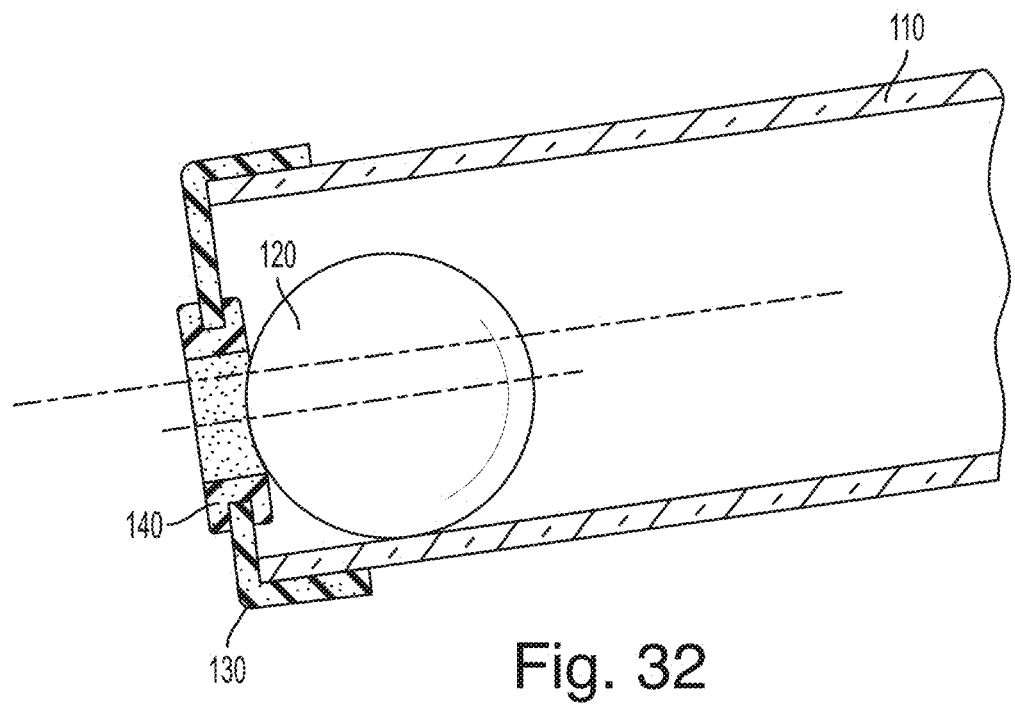
FIG. 32 is a partial cross-sectional view of another sound attenuator in accordance with some embodiments.
Figure 33:
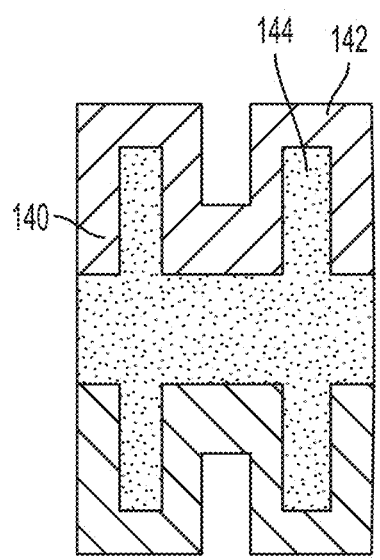
FIG. 33 is a cross-sectional view of another sound attenuator in accordance with some embodiments.

FIG. 32 shows a device where a sound attenuator 140 (e.g., grommet) is fitted at the opening of the end stop 130. The sound attenuator may attenuate sound that would otherwise be produced upon impact of the ball against the end stop of the conduit. In some embodiments, the sound attenuator is flexible so as to be removable from the opening of the end stop and subsequently replaced. In some embodiments, such as shown in FIG. 33, the sound attenuator includes a flexible flap 142 surrounding a space 144 that includes air and/or a soft material that absorbs the impact of the ball. In other embodiments, the sound attenuator is integrally formed with or permanently attached to the end stop.

Protective Covers

Figure 34:
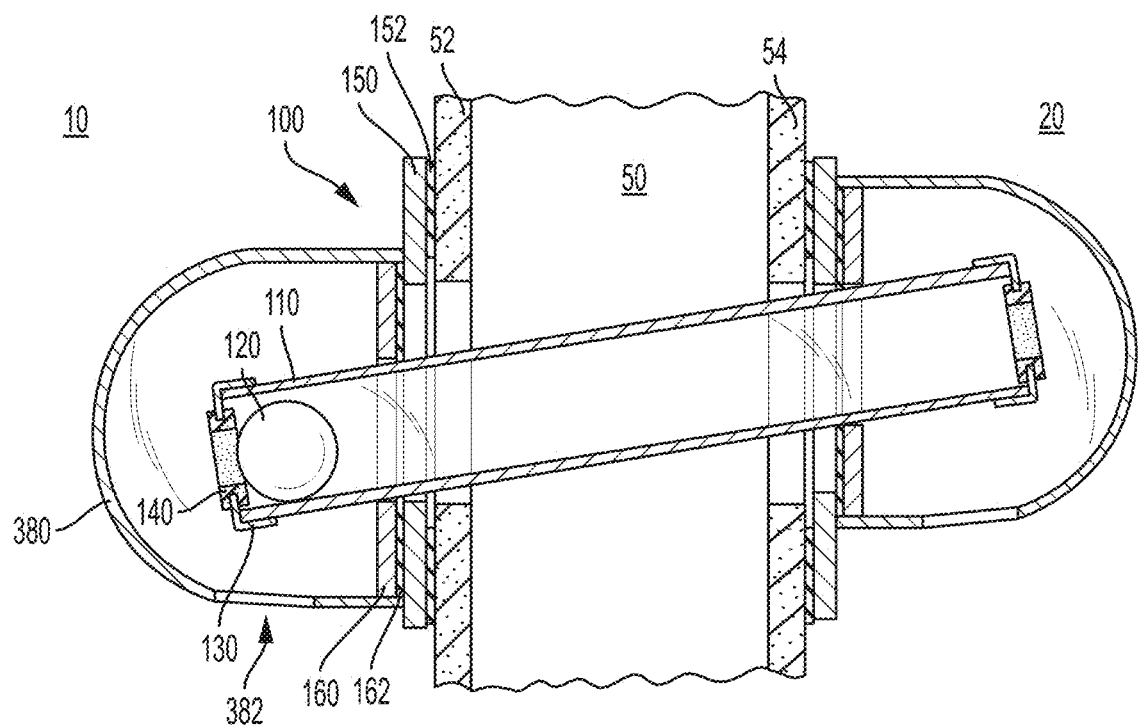
FIG. 34 is a cross-sectional view of a device for detecting a directional differential pressure in accordance with some embodiments.

FIG. 34 shows a device 100 in an installed configuration where the conduit is positioned at an angle with respect to the horizontal. The ball 120 rests against a replaceable sound attenuator 140, provided as a grommet which is, in turn, coupled to the end stop 130. The device further includes protective coverings 380 surrounding each end of the conduit. The protective coverings 380 include openings 382 through which fluid (e.g., air, gas) may flow from one room 10, through the conduit, and to the room 20 on the other side of the wall. The protective coverings 380 are shown in this embodiment to fit over the wall flange 160 and the associated sealing material 162 in a secured manner, with the edge of the coverings being in contact with the wall flange 150.

Protective coverings may be useful to shield the openings of the conduit, or the ball itself, from contamination or sudden rushes of air that may affect positioning of the ball within the conduit (e.g., a rush of air that occurs when a door between rooms is opened, equalizing the pressure difference between rooms, or when a window is opened). Such coverings also may discourage people from playing with or inappropriately manipulating various parts of the device, which could lead to damage to the device. For instance, absent the protective coverings, a person might be more likely to pull the end stop off of a conduit or inappropriately grasp the conduit as compared to if the ends are surrounding by the protective coverings. Thus, protective coverings may provide shielding for components of the device as well as deter people from potentially rendering the device nonfunctional.

To allow observers to view whether the ball is present at a particular end or other region of the conduit, protective coverings may be transparent, or substantially see-through.

Figure 35:
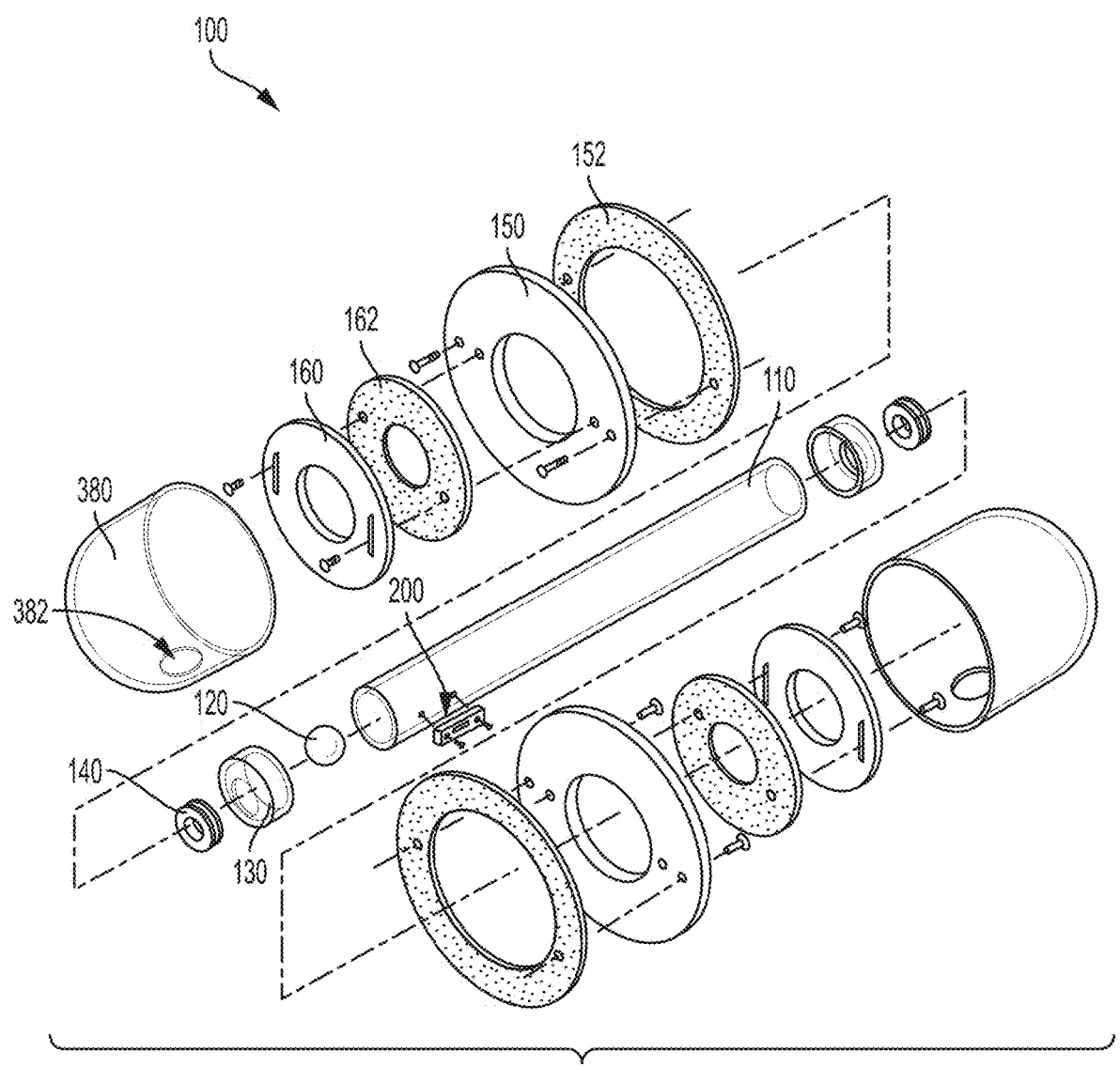
FIG. 35 is an exploded view of the device of FIG. 34.

FIG. 35 shows an exploded view of the device 100. As shown, the protective covering 380 fits over the outer wall flange 160 and sealing material 162. The outer wall flange 160 and outer sealing material 162 are attached to an inner wall flange 150 via a suitable set of fasteners. As discussed previously, the vertical position of a fastener for the outer wall flange 160 may be adjustable to suit the desired angle of incline of the conduit 110. The inner wall flange 150, in turn, is attached to the inner sealing material 152 and the exterior surface of the wall (not shown in this figure) via another set of fasteners.

Referring to the conduit 110, the differential pressure set point indicator 200 is attached to the exterior surface of the conduit. The ball 120 is disposed within the passageway of the conduit and the ends of the conduit are fitted with end stops 130 that prevent the ball from exiting the conduit while, at the same time, having openings 132 on opposite ends that allow fluid to flow through the length of the conduit. Sound attenuating grommets 140 are placed within respective openings 132 of the end stops so that the ball does not make a substantially noticeable noise upon impact with the end of the conduit.

Sealing Material

In some embodiments, the sealing material 162 has an opening that has a diameter slightly smaller than the outer diameter of the conduit. Accordingly, the sealing material 162 may form a snug seal with the exterior surface of the conduit, preventing fluid from flowing through the opening of the wall flange 160, except through the passageway of the conduit. The diameter of the sealing material 162 is also slightly smaller than the opening diameter of the wall flange 160 so as to accommodate various orientations of the angled conduit within the opening of the wall flange 160.

Figure 36:
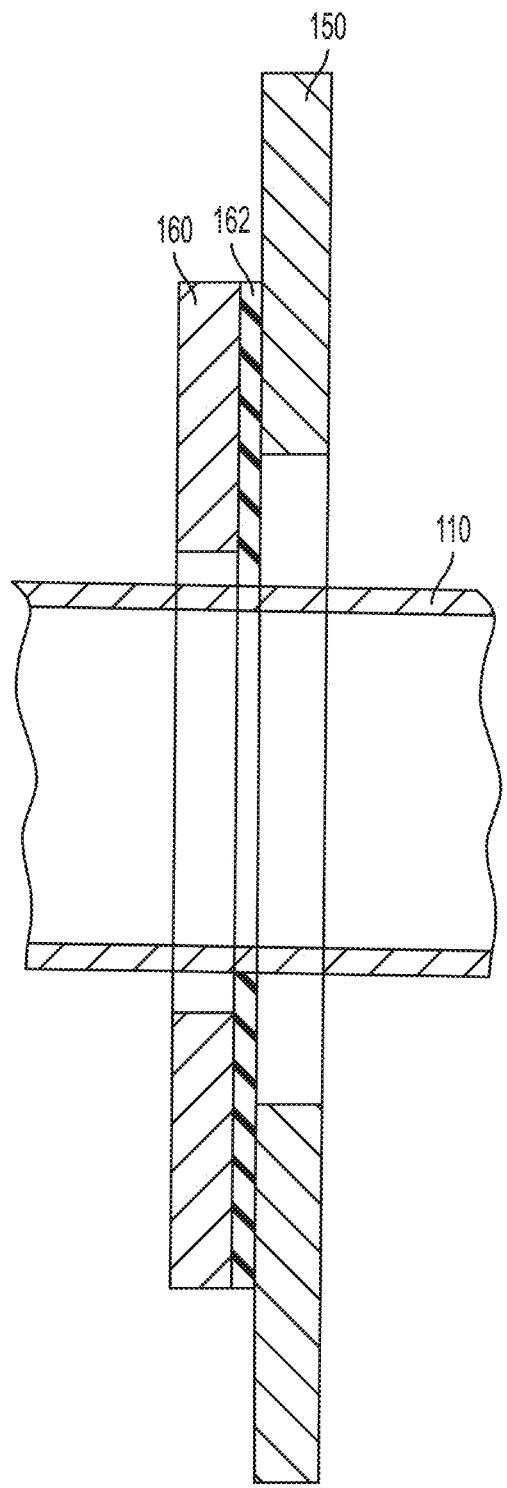
FIG. 36 is a partial cross-sectional view of a support used with a device for detecting a directional differential pressure in accordance with some embodiments.

As shown in FIG. 36, when the device is installed, the sealing material 162 is in contact with the exterior surface of the conduit so as to form a seal between the surface of the wall (via the wall flanges) and the conduit. The opening of the wall flange 160 may also provide vertical tolerance for the position of the conduit to be adjusted (e.g., adjusting the angle of inclination of the conduit).

Figure 37:
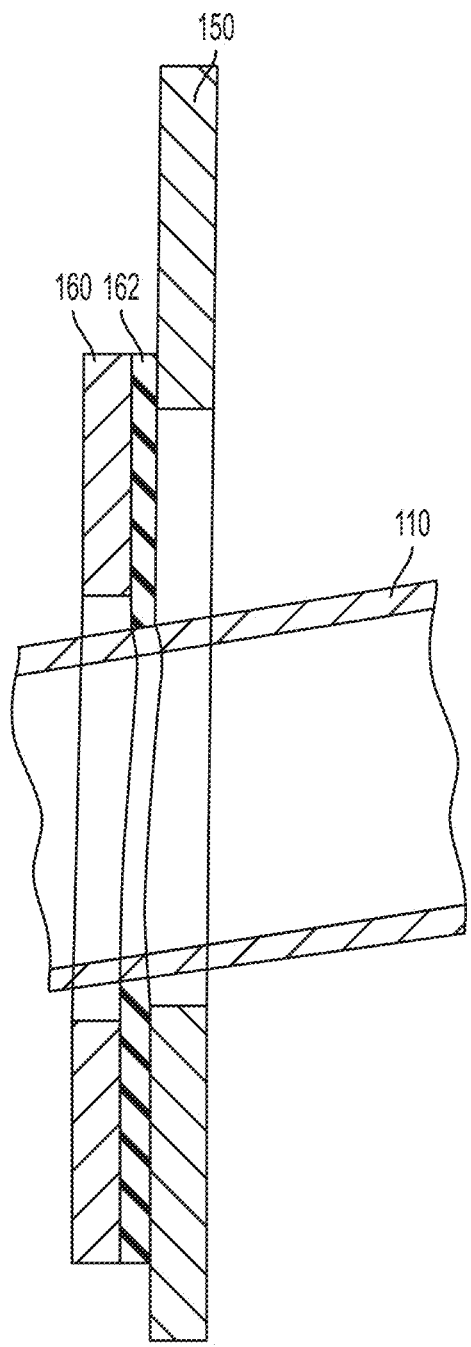
FIG. 37 is a partial cross-sectional view of the support used with the device of FIG. 36 in a tilted orientation.

The sealing material may be a gasket that is flexibly deformable. Such a characteristic allows for the sealing material to accommodate adjustments in position of the conduit, while also maintaining the seal between the surface of the wall and the conduit. For example, as shown in FIG. 37, while the conduit may be positioned at a particular angle of inclination, the seal remains unbroken. Further, the sealing material 162 may be composed of a composition that also provides an appropriate degree of support for the conduit while placed in the angled position.

The sealing material may comprise any suitable composition that is flexible, yet is appropriate for maintaining a seal. In some embodiments, the sealing material includes at least one of an elastomer, rubber, silicone, any other suitable composition and/or combinations thereof.

While FIG. 37 shows how the sealing material distorts upon adjustment of the conduit into an angled orientation, the sealing material 162 not only maintains the seal so as to prevent fluid flow from one side of the wall to the other over the exterior of the conduit, but also provides support for the conduit in the angled orientation. That is, the sealing material 162 may function as a gasket that substantially holds the conduit at the angled orientation. Accordingly, the sealing material mitigates the occurrence of creep of the conduit from its set angled orientation, reducing potential inaccuracies in the overall indication(s) of differential pressure between rooms within which opposite ends of the conduit are present.

Adjustable Length

In some embodiments, the device includes features that are adjustable in length so as to accommodate installation of the device into different walls of varying thickness.

Figure 38:
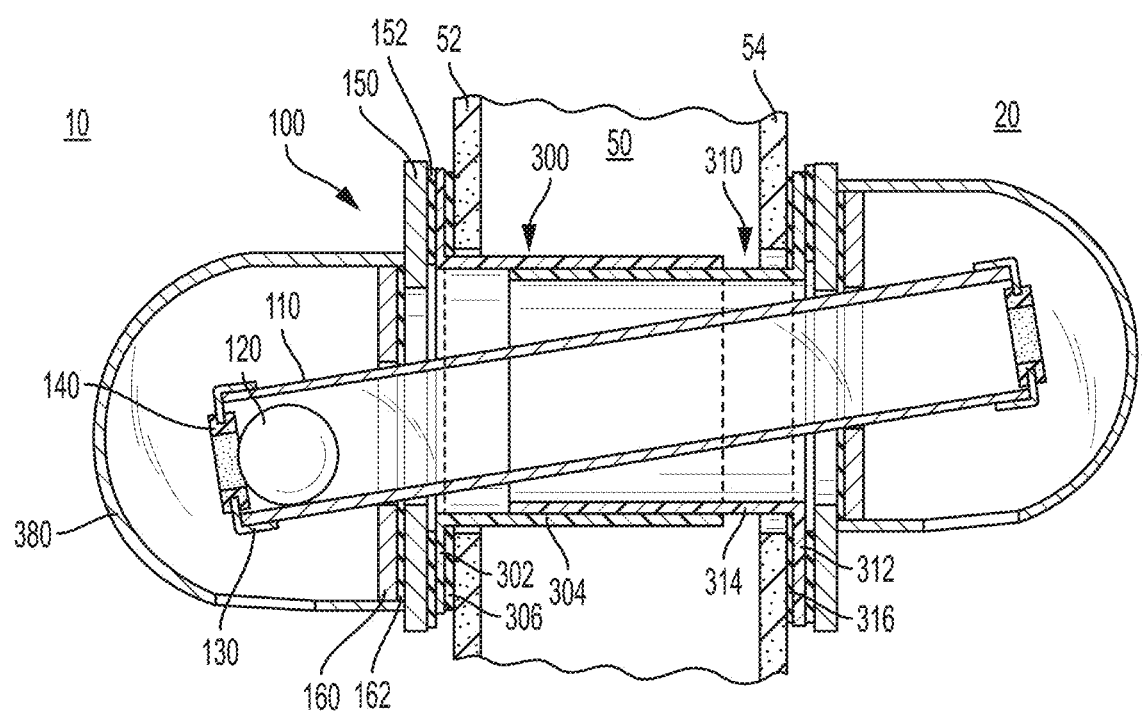
FIG. 38 is a cross-sectional view of another device for detecting a directional differential pressure in accordance with some embodiments.
Figure 39:
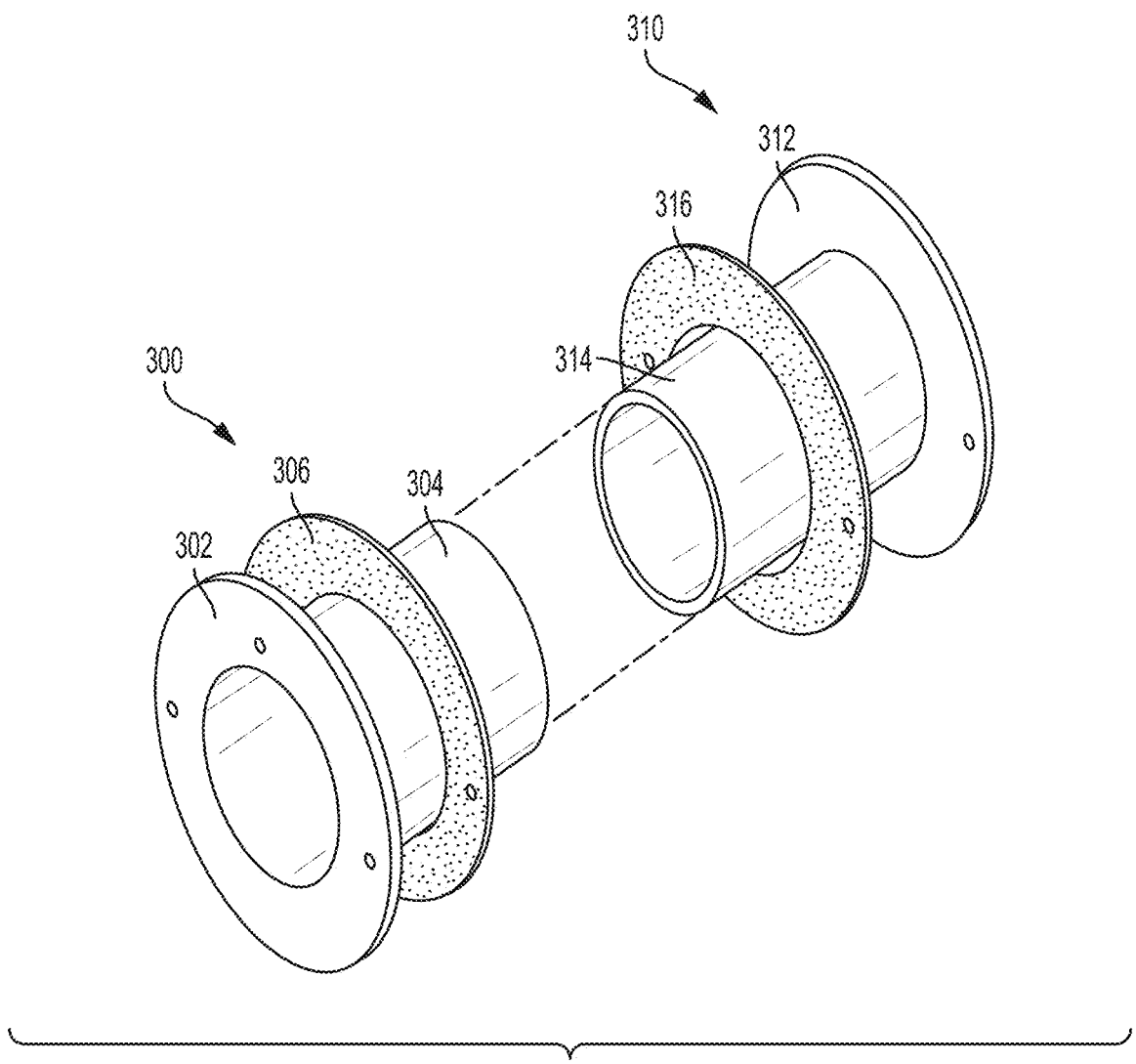
FIG. 39 is a perspective view of an adjustable portion of a device for detecting a directional differential pressure in accordance with some embodiments.

The embodiment illustrated in FIGS. 38-39 includes the device installed with telescoping wall cavity barriers 300, 310. Here, the wall flanges 150 and associated sealing materials 152 are attached to respective wall cavity barriers 300, 310, which are, in turn, attached to the exterior surfaces of the walls 52, 54. As shown in FIG. 38, when installed, the wall cavity barriers 300, 310 define a space within which the conduit 110 is housed, providing an additional degree of protection for the conduit within the wall. In some embodiments, wall cavity barriers provide protection for the conduit from any contaminants within the wall cavity 50 outside the passageway of the wall tubes 304, 305 from transmission into either of the rooms 10, 20 or conversely, any contaminants from either room 10, 20 from entering into the wall cavity outside the passageway of the wall tubes 304, 305.

As depicted in FIG. 39, the wall cavity barriers 300, 310 may include respective wall plates 302, 312, wall tubes 304, 314 and sealing materials 306, 316. The wall plates 302, 312 provide for attachment of the device to the wall during installation. That is, the wall plates may be attached (e.g., via fasteners, adhesives, etc.) on opposite sides of the wall to surfaces 52, 54 so that the wall tubes 304, 314 may extend into the wall and provide protection and support for the angled conduit. Sealing materials 306, 316 may protect transmission of air between rooms 10, 20 and the wall cavity 50.

The wall tubes 304, 314 operatively engage with one another, as shown in FIG. 23, so as to provide a housing for the conduit. For example, the wall tubes may be telescoping or otherwise slidable with respect to one another so that the wall cavity barrier may be appropriately installed in walls having different thicknesses. In some embodiments, the wall tubes may include features, such as spring-loaded protrusions along the length of one tube and corresponding holes along the length of another tube that allow the overall length housed by the wall tubes to be fixedly adjustable. Or, the wall tubes may include appropriate interference/snap fit features that provide length adjustability of the tubes with respect to one another. Alternatively, the wall tubes may be removably attached to each other via a suitable fastener and/or adhesive material. Telescoping tube arrangements may be of a sufficient interface fit so as to prevent transmission of contaminated or unwanted air between the wall cavity 50 and the passageway of the wall tubes 304, 314.

As shown in FIGS. 38-39, the sealing materials 306, 316 may have openings for respective wall tubes 304, 314 so that a seal is formed between the exterior surfaces of the wall 52, 54 and the wall plates 302, 312.

Figure 40:
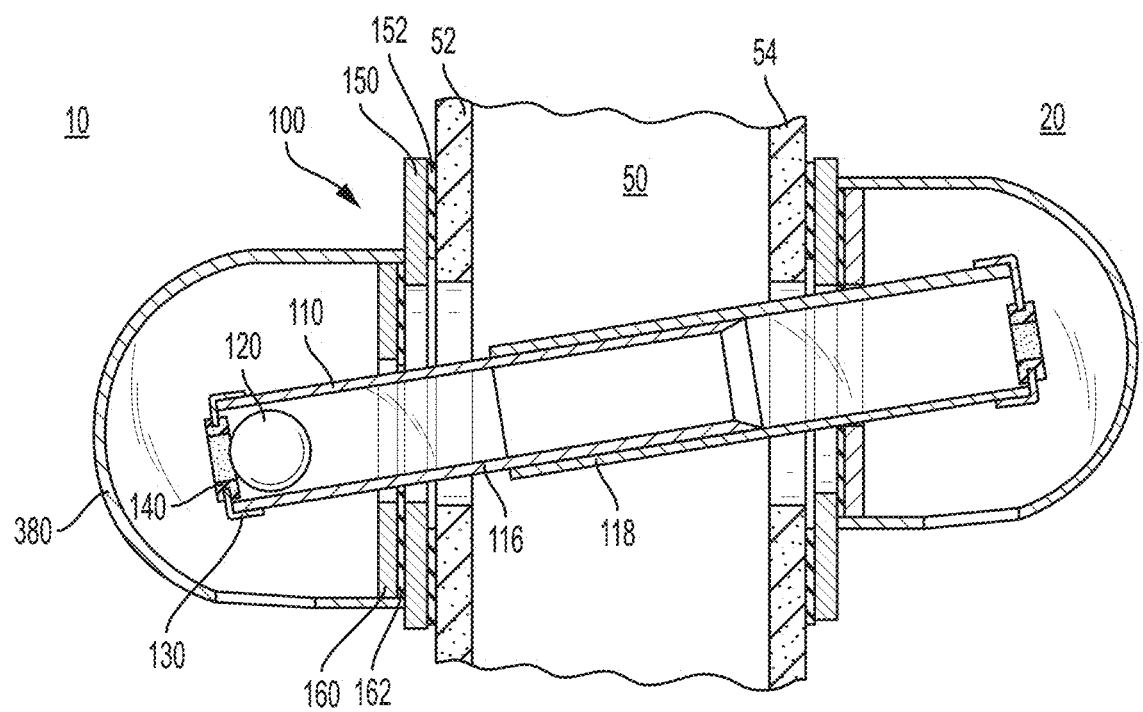
FIG. 40 is a cross-sectional view of another device for detecting a directional differential pressure in accordance with some embodiments.
Figure 41:
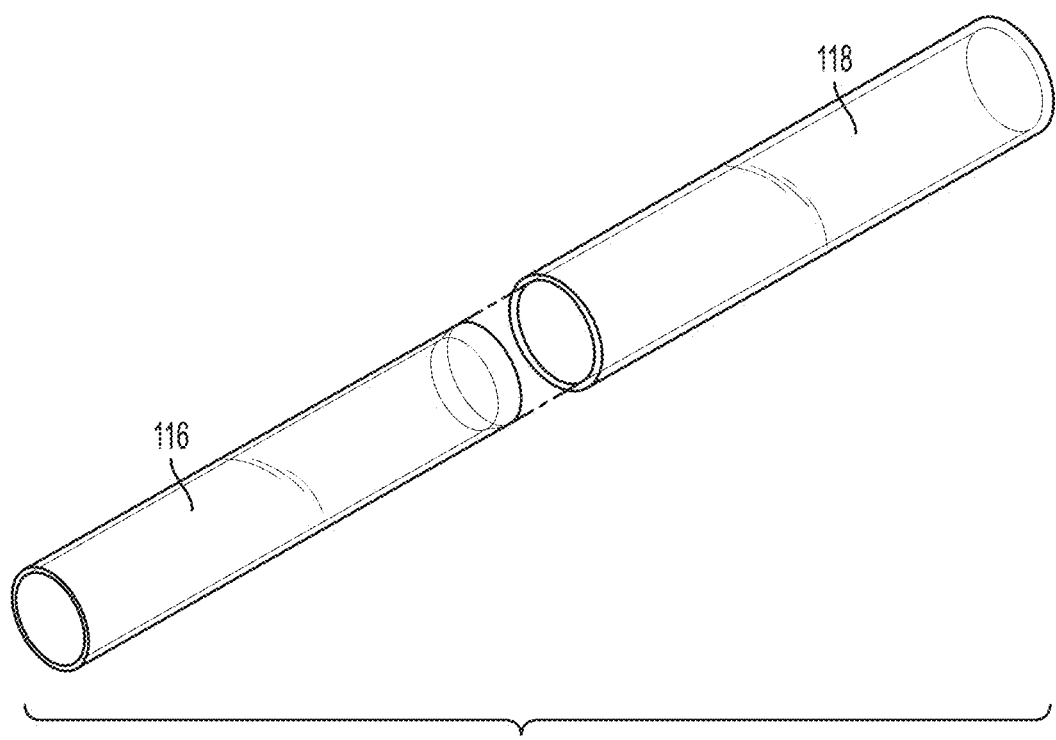
FIG. 41 is a perspective view of another adjustable portion of a device for detecting a directional differential pressure in accordance with some embodiments.

In some embodiments, the conduit itself may be adjustable in length. FIGS. 40-41 depict a telescoping conduit. In this embodiment, the conduit includes a first portion 116 and a second portion 118 that are operatively engaged with one another so as to provide for length adjustability of the conduit. For instance, the first and second portions of the conduit are configured to be telescoping or otherwise slidable with respect to one another. As a result, the device may be installed into different walls having varying thickness.

Similar to the wall tubes discussed above, the first and second portions of the conduit may include features that allow the length of the conduit to be appropriately adjusted. For example, such portions may include spring-loaded protrusions along the length of one portion and corresponding holes along the length of the other portion so that the overall length of the conduit is fixedly adjustable. Or, the conduit portions may have appropriate interference/snap fit features that provide length adjustability of the conduit. In some embodiments, the respective portions of the conduit may be removably attached to each other via a suitable fastener and/or adhesive material.

Fire Stop System

In certain embodiments, the device may include a fire stop system that, upon the detection of a threshold level of smoke or fire, provides a barrier that blocks or otherwise mitigates travel of the smoke/fire from one room to another. The fire stop system may include various components used to seal the passage within the wall. For example, the fire stop may include an intumescent substance that swells significantly as a result of heat exposure. The fire stop materials may be appropriately installed, for example, employing intumescent material as known to those of ordinary skill in the art. In some cases, the intumescent substance may produce char, which is a substance that acts to retard heat transfer.

Figure 42:
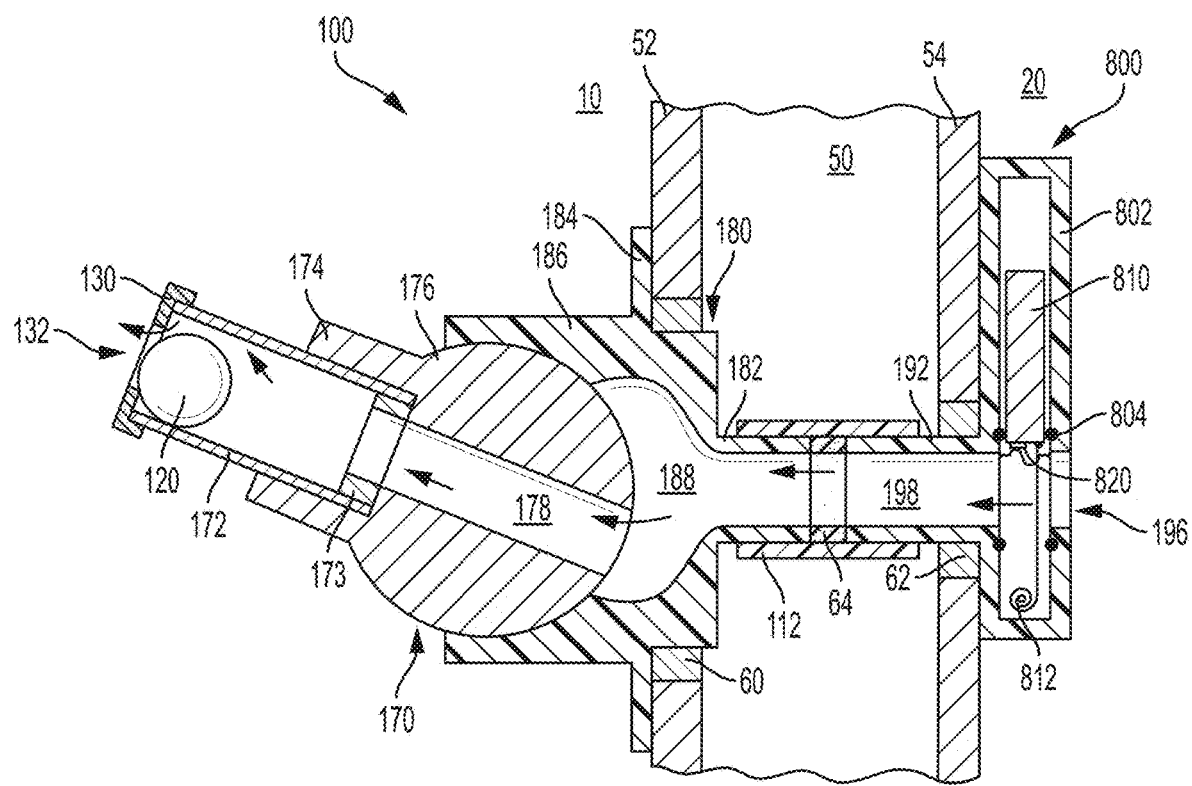
FIGS. 42-43 are cross-sectional views of yet another device for detecting a directional differential pressure in accordance with some embodiments.

FIG. 42 shows an embodiment where intumescent fire stops 60, 62 are provided as rings that are located along the wall surfaces 52, 54. Once exposed to a sufficient level of heat, various parts of the device 100 such as the yoke portion 180 and terminal portion 190 may melt or otherwise degrade, and the fire stops 60, 62 will expand radially inward so as to substantially block the passageway within the wall cavity 50 between rooms 10, 20. While FIG. 4 depicts the fire stop system to be located along the wall surfaces 50, 52 (e.g., formed of a non-combustible material), it can be appreciated that the fire stop system may be located at any other suitable location. In some embodiments, a fire stop system may be provided as an intumescent strip or ring located within the passage 198 or sleeve, as shown in FIGS. 42-46. Such a configuration may be beneficial where, for certain temperature ranges, the yoke and/or terminal portions of the device may not degrade and the intumescent strip or ring more readily expands into the otherwise open passageway to obstruct travel of smoke or fire therethrough.

In some embodiments, the device may include a gate system installed on one or both sides of the wall which is configured to block the passageway between rooms upon detection of smoke or fire. FIGS. 42-46 depict various embodiments that depict such a gate system, described further below.

Figure 43:
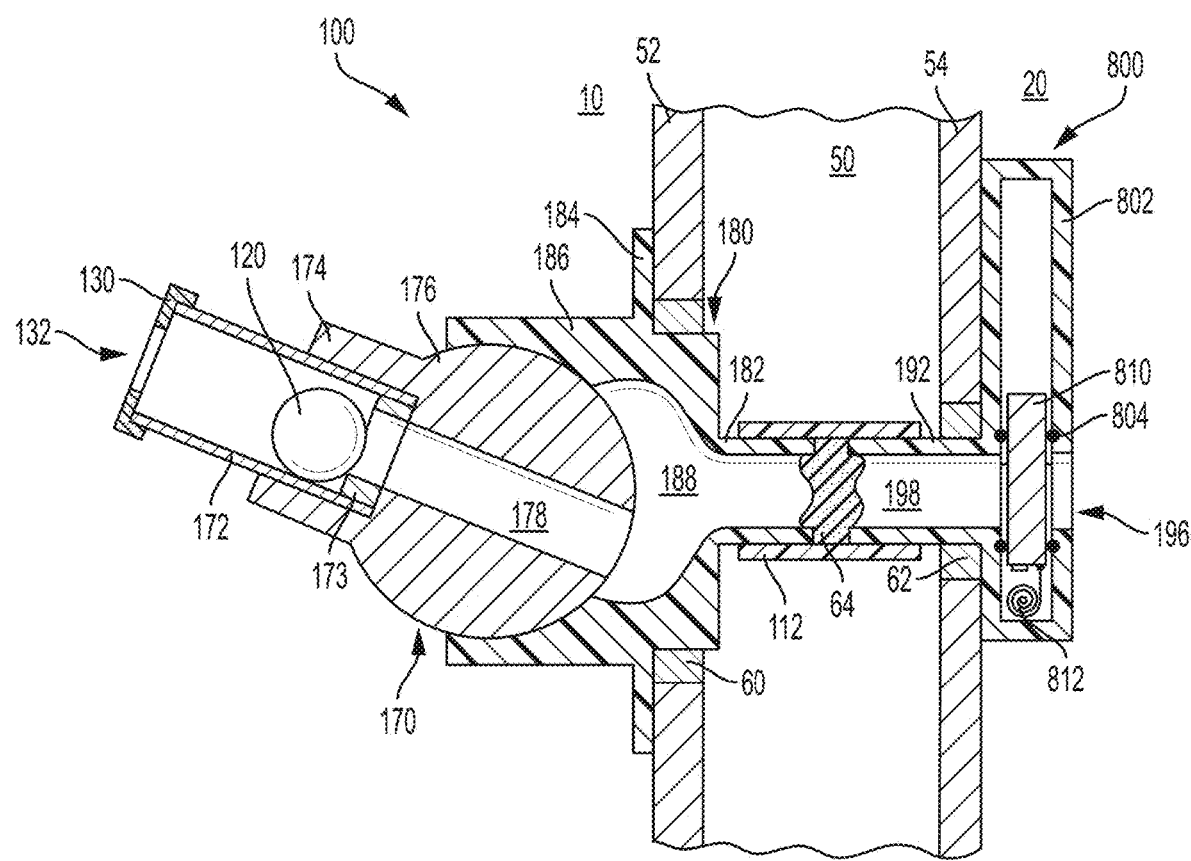

FIGS. 42-43 depict an illustrative embodiment of a gate system 800 that includes a housing 802 and a shutter 810 provided within the housing, which provides a mechanical guide for the shutter 810 to move between open and closed positions. In various embodiments, the housing 802 may provide structure that allows the shutter 810 to slide back and forth (as shown in FIGS. 42-43), swing open and shut (not expressly shown), or have any other suitable arrangement. The gate system 800 may include a barrier 820 (e.g., fusible link) that keeps the shutter 810 in an open position, preventing closure thereof until the barrier is broken or otherwise opened. The housing 802 may further include sealing material 804 for maintaining a seal between the passage 198 and the surrounding environment when the shutter 810 is closed. When the level of smoke or fire reaches a certain threshold, the shutter 810 moves from an open position to a closed position.

Actuating the gate system 800 in a manner that closes the shutter 810 may serve to obstruct air flow within the passageway between rooms, resulting in containment of the smoke and/or fire. Actuation of the gate system 800 may involve moving the shutter 810 between open and closed positions by a suitable stimulus, such as heat, an electrical signal and/or any other appropriate signal. As further shown, an intumescent fire stop material 64 may be located within the passage 198, for forming an occlusion to smoke/fire travel therethrough.

The shutter 810 may be constructed in any suitable manner. For example, the shutter 810 may be weighted such that upon breakage of the barrier 820 (e.g., via melting, degradation, etc.), the shutter 810 falls or slides downward (e.g., similar to a guillotine) so as to block the opening into the passageway. Or, as shown for some embodiments, when in the open position, the shutter 810 is biased toward a closing position by a spring 812. When the barrier 820 breaks, the spring 812 pulls the shutter from the open position to the closed position. Alternatively, a barrier for holding the shutter to prevent it from closing may not be required. For example, the shutter 810 may be electromechanically controlled to move back and forth, similar to a sliding gate or garage door system. Upon detection of a threshold level of smoke or fire, the gate system may cause the shutter to automatically close, blocking the passage of smoke/fire between rooms.

The gate system 800 may be mechanically controlled. For instance, as shown in FIGS. 42-43, the barrier 820 for the shutter 810 may be fusible such that, when the barrier 820 is exposed to a sufficient amount of heat (e.g., temperature up to 165 degrees F. or greater), the barrier may melt or otherwise degrade. Upon degradation of the barrier to a sufficient degree, the shutter 810 may be permitted to close, for example, via weight and/or pulling force caused by the spring 812.

FIG. 42 shows an illustrative embodiment where the passages 178, 188, 198 are sufficiently open such that air is able to flow between rooms 10, 20, as indicated by the solid arrows. As depicted, the pressure difference between rooms 10, 20 is large enough that air flowing through the conduit 172 causes the ball 120 to be pushed up against the end stop 130. Upon exposure to a threshold level of heat (e.g., 150-165 degrees F. or greater), should the ball 120 melt and allow hot fluid/air to reach the barrier, the barrier 820 breaks and the shutter 810 is pulled shut, as depicted in FIG. 43, blocking air flow into the opening 196. In addition, FIG. 43 shows the intumescent material of the fire stop material 64 having expanded so as to further block air from traveling through the passageway.

Figure 44:
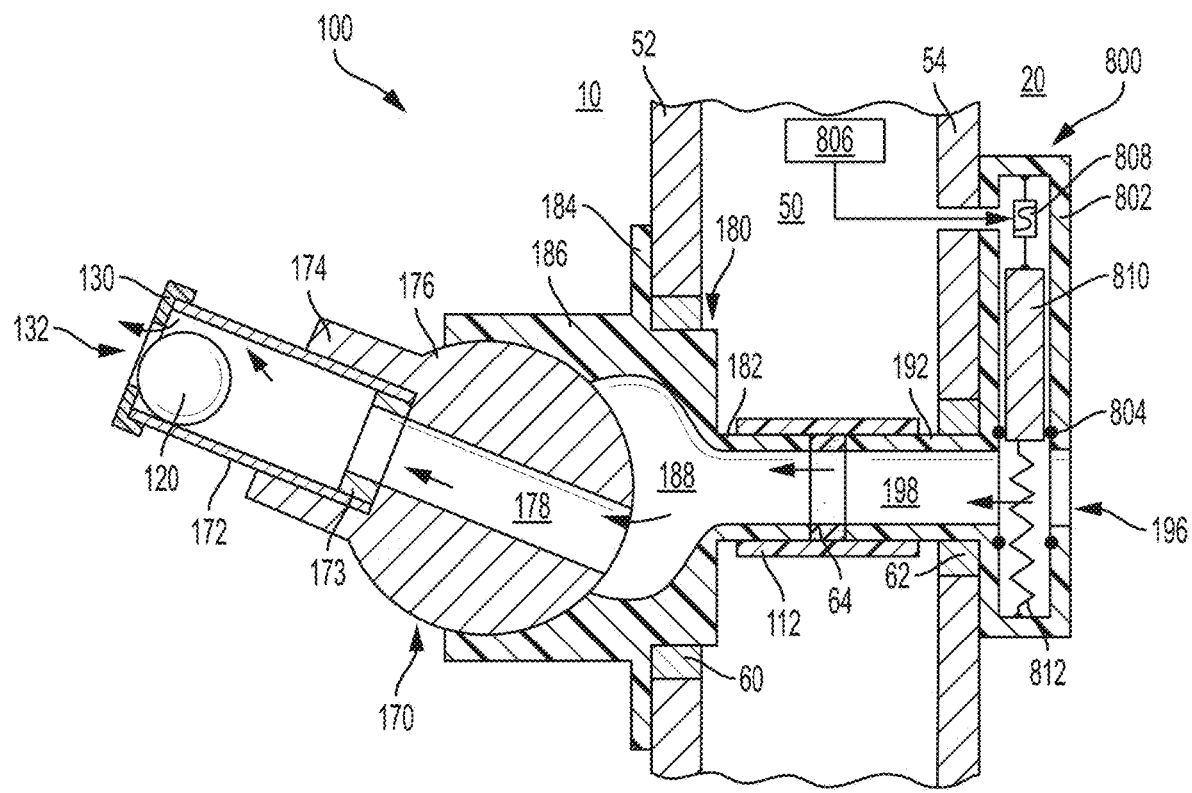
FIGS. 44-45 are cross-sectional views of another device for detecting a directional differential pressure in accordance with some embodiments.
Figure 45:
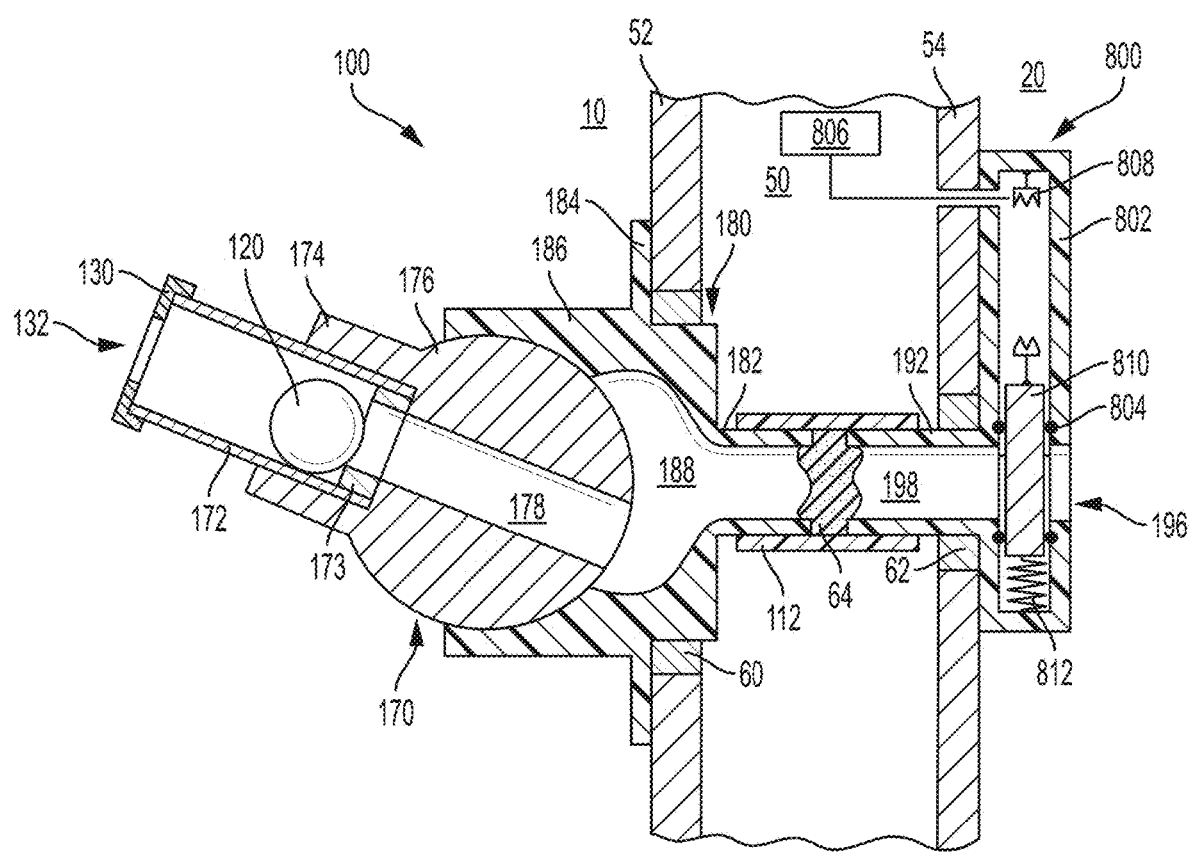

In some embodiments, the gate system 800 may be electrically controlled. For example, as shown in FIGS. 44-45, the gate system 800 may be in electrical communication with a smoke or fire detector/alarm 806. When the smoke or fire detector/alarm 806 senses the presence of a hazardous amount of fire or smoke in either room, a respective signal is sent to an actuator or fusible link 808, allowing for the shutter 810 to move from the open position to the closed position. FIG. 44 depicts air flow through the passages 198, 188, and 178 causing the ball 120 to be pushed up against the end stop 130. Upon exposure to a threshold level of heat as sensed by the detector 806, the link 808 is caused to break and the shutter 810 is pulled shut by the spring 812, blocking air flow into the opening 196. It can be appreciated that the detector 806 may be located at any appropriate location and is not required to be within the wall cavity between spaces. In fact, the detector 806 may be located remotely exterior to the device (e.g., within one of the rooms). As also provided for other smoke or fire sensing systems, upon detection of hazardous amounts of fire/smoke, appropriate emergency systems and/or personnel may also be alerted.

Figure 46:
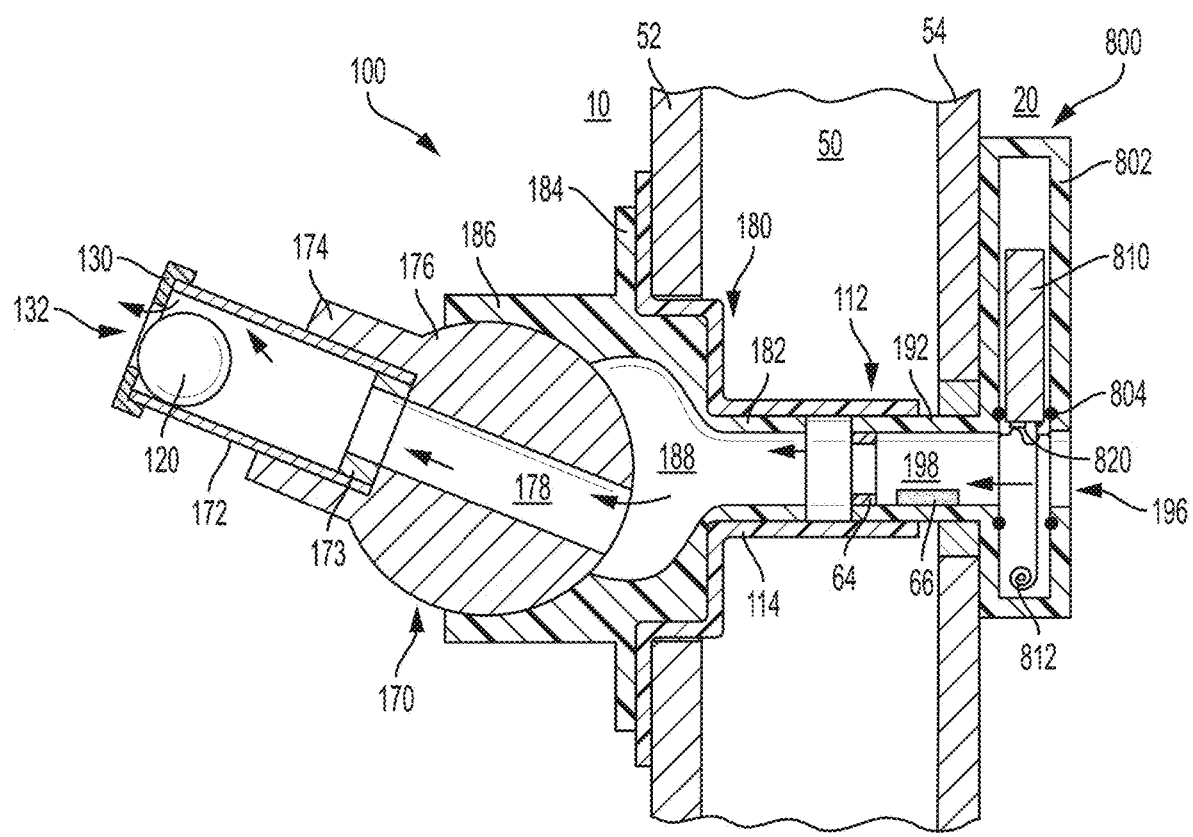
FIG. 46 is a cross-sectional view of another device for detecting a directional differential pressure in accordance with some embodiments.

In some embodiments, as shown in FIG. 46, the device 100 may include a sleeve 114 forming a secured attachment between other parts of the device and the wall. As shown, the sleeve 114 may be located between the wall and the yoke portion 180, and may be mated or coupled therewith. The sleeve 114 may also be attached or otherwise coupled to the housing 802 of the gate system 800. The sleeve 114 may also include any suitable material, such as metal, non-combustible material, or another appropriate material. In some embodiments, the sleeve 114 may be adjustable in length (e.g., telescoping). FIG. 46 further depicts an intumescent strip 66 located within the passage 198, as noted above. It can be appreciated that features of this embodiment such as the sleeve and intumescent strip may be suitably employed for any other embodiment in accordance with the present disclosure.

Additional Considerations

Once a room is configured for a particular positive or negative pressure mode, for some cases, the room will typically remain in that positive or negative pressure mode, despite adjustments in the magnitude of the desired pressure differential. That is, the net direction of fluid flow between spaces may remain the same such that the room remains a positive or negative pressure room. However, for some applications, it may be desirable for the pressure mode of a room to be switched between positive and negative pressure.

Accordingly, in various embodiments described herein, to accommodate a reversal in the pressure mode between spaces, the overall inclination of the conduit may be reversed. That is, the incline of the conduit may be adjusted such that gravity causes the movable element to fall in the other direction. For instance, a straight conduit may be tilted on one side of the wall from an upwardly inclined to a downwardly inclined position, to accommodate for the net directional change in fluid flow.

In an example, animal holding rooms in vivarium research laboratories may have applications that require the room pressure to be switched between positive and negative flow, yet the overall magnitude of differential pressure between spaces remains substantially the same. Accordingly, instead of or in addition to adjusting the incline of the conduit, it may further be convenient for a differential pressure indicator to provide an indication as to whether a particular magnitude of minimum differential pressure exists between spaces and whether the pressure flow is positive or negative.

The device may include a differential pressure set point indicator that responds to the angle of inclination of the conduit with respect to a horizontal plane. In particular, the differential pressure set point indicator may be configured and calibrated (e.g., based on a given size/weight of the movable element, parameters of the conduit, size of the openings at each end of the conduit) to correlate the angle of inclination of the conduit to a threshold differential pressure between the two spaces that is sufficient to cause the movable element within the conduit to move from one region (e.g., at a vertically lower position) of the conduit toward an opposite region (e.g., at a vertically higher position). For example, the greater the degree of tilt of the conduit, the greater the differential pressure required to generate sufficient fluid flow in the conduit to move the movable element from a lower region toward a higher region.

In some embodiments, a gravity sensing differential pressure set point indicator may be calibrated according to the gravitational field of the earth so as to display the directional differential pressure threshold required to move one or more movable elements from a vertically lower position of a conduit to a vertically higher position of the conduit.

In some embodiments, an elongated conduit may be adjustable in length. For example, the conduit may have two separate telescoping components that are slidable with respect to one another. Such adjustability in length may accommodate installation of the device into walls of varying thicknesses.

The movable element within the conduit may be contained by a stop near each of the ends of the open ended conduit. When the movable element impacts either of the stops of the conduit, in some cases, a noticeable sound may be heard, largely depending on the relative compositions of the movable element and the stop(s) of the conduit. For instance, with the conduit installed at an incline from the horizontal, when the differential pressure between spaces becomes equal (e.g., the door between the room and an outside corridor is opened resulting in pressure equalization), the movable element may drop down from a higher vertical position back to a lower vertical position within the conduit, and the impact of the movable element with a lower end stop of the conduit may produce a sound. Such a sound may be irritating to those in close proximity to the lower end of the conduit, particularly if repeated frequently. For example, hospital inpatients in an infectious isolation room or laboratory mice in a vivarium, may be awakened during their sleep cycle each time the staff enters and exits the room. Accordingly, the device may include a sound attenuator that is adapted to reduce noise upon impact of the movable element from one region of the conduit to an opposing region. In some embodiments, the sound attenuator may be a relatively soft energy-absorbing material or include an energy-absorbing geometry provided as part of an end stop.

The device may further include a sealing material (e.g., gasket) placed in contact with the exterior surface of the conduit so as to provide a seal between the surface of the wall and the conduit when the device is installed. Accordingly, transfer of potentially contaminated air between a space and the interior cavity of a hollow wall may be substantially prevented. As the conduit may be positioned at a particular angle of inclination when installed, the sealing material may be flexible to provide and maintain a seal as well as accommodate appropriate adjustment(s) in position of the conduit (e.g., from one angle of incline to another). Yet, for some embodiments, the sealing material may also be firm enough to provide a suitable amount of support for the tilted conduit (e.g., to maintain the position/orientation of the conduit).

In an illustrative embodiment, a device for indicating directional differential pressure between two spaces is provided. The device may include an elongated conduit arranged to be coupled with and substantially located on one side of a wall separating a first space from a second space. The conduit may have openings that permit fluid flow through the conduit from the first space toward the second space. The conduit may be arranged to be adjustably inclined with respect to a horizontal reference plane such that a first region of the conduit associated with the first space is vertically lower than a second, vertically higher region of the conduit that is associated with the second space. The device may include at least one movable element disposed within the conduit adapted to be moved from the first, vertically lower region of the conduit to the second, higher region or from the second higher region to the first vertically lower region, in response to a differential pressure between the first and second spaces. The device may include a differential pressure set point indicator configured to correlate each of a plurality of angles of inclination of the conduit with respect to the horizontal reference plane to a respective threshold differential pressure between the first and second spaces that is sufficient to cause the at least one movable element to move from the first, lower region of the conduit to the second, higher region.

In another illustrative embodiment, a device for indicating a directional differential pressure between two spaces is provided. The device may include an elongated conduit arranged to be coupled with a wall separating a first space from a second space, the conduit having openings that permit fluid flow through the conduit from the first space toward the second space, the conduit arranged to be inclined with respect to a horizontal or vertical reference plane such that a first region of the conduit associated with the first space is vertically lower than a second, vertically higher region of the conduit that is associated with the second space. The device may include at least one movable element disposed within the conduit adapted to be moved from the first, vertically lower region of the conduit to the second, higher region or from the second higher region to the first vertically lower region, in response to a differential pressure between the first and second spaces. The device may further include a differential pressure set point indicator configured to correlate each of a plurality of angles of inclination of the conduit with respect to the horizontal or vertical reference plane to a respective threshold differential pressure between the first and second spaces that is sufficient to cause the at least one movable element to move from the first, lower region of the conduit to the second, higher region.

In another illustrative embodiment, a device for indicating a directional differential pressure between two rooms is provided. The device may include an elongated conduit arranged to be coupled with a wall separating the two spaces, the conduit having openings ends that permit fluid flow between the two spaces through the conduit, the conduit being adjustable in length, and at least one movable element disposed within the conduit adapted to be moved from one region of the conduit toward an opposing region in response to the differential pressure.

In yet another illustrative embodiment, a device for indicating a directional differential pressure between two rooms is provided. The device may include an elongated conduit arranged to be coupled with a wall separating the two spaces, the conduit having openings that permit fluid flow between the two spaces through the conduit; at least one movable element disposed within the conduit adapted to be moved from one region of the conduit toward an opposing region in response to the differential pressure, and a sound attenuator adapted to reduce noise upon the movable element reaching one of the two conduit ends.

In another illustrative embodiment, a device for indicating a directional differential pressure between two rooms is provided. The device may include an elongated conduit arranged to be coupled with a wall separating the two spaces, the conduit having openings that permit fluid flow between the two spaces through the conduit; a sealing material in contact with an exterior surface of the conduit and adapted to support the conduit in an installed orientation, and at least one movable element disposed within the conduit adapted to be moved from one region of the conduit toward an opposing region in response to the differential pressure.

In an illustrative embodiment, a device for indicating directional differential pressure between two spaces is provided. The device may include an elongated conduit arranged to extend through a wall separating a first space from a second space, the conduit having openings that permit fluid flow through the conduit from the first space to the second space, the conduit arranged to be inclined with respect to a horizontal reference plane such that a first region of the conduit associated with the first space is vertically lower than a second, vertically higher region of the conduit that is associated with the second space. The device may include a plurality of movable elements each adapted to provide a set point indication of a respective threshold differential pressure between the first and second spaces that is sufficient to cause the movable element, when disposed within the conduit, to move from the first, vertically lower region of the conduit to the second, vertically higher region in response to a differential pressure between the first and second spaces.

In another illustrative embodiment, a device for indicating directional differential pressure between two spaces is provided. The device may include an elongated conduit arranged to extend through a wall separating a first space from a second space, the conduit having openings that permit fluid flow through the conduit from the first space to the second space, the conduit arranged to be inclined with respect to a horizontal reference plane such that a first region of the conduit associated with the first space is vertically lower than a second, vertically higher region of the conduit that is associated with the second space. The device may include a movable element disposed within the conduit, wherein the conduit is adapted to provide a set point indication of a respective threshold differential pressure between the first and second spaces that is sufficient to cause the movable element to move from the first, vertically lower region of the conduit to the second, vertically higher region in response to a differential pressure between the first and second spaces.

In an illustrative embodiment, a device for indicating directional differential pressure between two spaces is provided. The device may include a conduit arranged to be coupled with and substantially located on one side of a wall, the wall separating a first space and a second space, the conduit having openings that permit fluid flow through the conduit as part of allowing flow between the first space and the second space, wherein an angle of inclination of the conduit is adjustable with respect to a horizontal reference plane such that a first region of the conduit is vertically lower than a second, vertically higher region of the conduit. The device may further include at least one movable element disposed within the conduit and adapted to move from the first, vertically lower region of the conduit to the second, higher region, in response to a differential pressure between the first and second spaces. The device may include a differential pressure set point indicator configured to correlate each of a plurality of angles of inclination of the conduit with respect to the horizontal reference plane to a respective threshold differential pressure between the first and second spaces that is sufficient to cause the at least one movable element to move from the first, lower region of the conduit to the second, higher region.

In another illustrative embodiment, a device for indicating directional differential pressure between two spaces is provided. The device may include a first conduit arranged to extend through a portion of a wall, the wall separating a first space from a second space. The first conduit may have openings that permit fluid flow through the first conduit between the first space and the second space. The device may include a yoke body adapted to be coupled to one side of the wall and to house an end of the first conduit that extends through the portion of the wall. The device may include a second conduit rotatably (e.g., pivotally) coupled to the yoke body and in fluid communication with the first conduit. The second conduit may have openings that permit fluid flow through the second conduit between the first space and the second space. The second conduit may be arranged to be adjustably inclined with respect to a horizontal or vertical reference plane such that a first region of the second conduit associated with the first space is vertically lower than a second, vertically higher region of the second conduit associated with the second space. The device may include at least one movable element disposed within the second conduit adapted to be moved from the first, vertically lower region of the second conduit to the second, vertically higher region, in response to a differential pressure between the first and second spaces. The device may include a differential pressure set point indicator to correlate each of a plurality of angles of inclination of the second conduit with respect to the horizontal or vertical reference plane to a respective threshold differential pressure between the first and second spaces that is sufficient to cause the at least one movable element to move from the first, vertically lower region of the conduit to the second, vertically higher region.

In yet another illustrative embodiment, a method of installing a device for indicating a differential pressure between two spaces is provided. The method may include positioning an elongated conduit on one side of a wall separating a first space from a second space, the conduit having openings that permit fluid flow through the conduit from the first space to the second space, the conduit arranged to be inclined with respect to a horizontal reference plane such that a first region of the conduit associated with the first space is vertically lower than a second, vertically higher region of the conduit that is associated with the second space, wherein at least one movable element disposed within the conduit is adapted to be moved from the first, vertically lower region of the conduit to the second, higher region in response to a differential pressure between the first and second spaces. The method may include referring to a differential pressure set point indicator to determine a first angle of inclination of the conduit with respect to a horizontal reference plane that corresponds to a first threshold differential pressure between the first and second spaces that is sufficient to cause the at least one movable element to move from the first, lower region of the conduit to the second, higher region. The method may include tilting the conduit to achieve the determined first angle of inclination of the conduit with respect to the horizontal reference plane that corresponds to the first threshold differential pressure. The method may include referring to the differential pressure set point indicator to determine a second angle of inclination of the conduit with respect to the horizontal reference plane that corresponds to a second threshold differential pressure between the first and second spaces, different from the first threshold differential pressure, that is sufficient to cause the movable element to move from the first, lower region of the conduit to the second, higher region. The method may include tilting the conduit to achieve the determined second angle of inclination of the conduit with respect to the horizontal reference plane that corresponds to the second threshold differential pressure.

In another illustrative embodiment, a device for indicating directional differential pressure between two spaces is provided. The device may include at least one conduit arranged to extend through a wall separating a first space from a second space, the at least one conduit having openings that permit fluid flow through the at least one conduit between the first space and the second space, the at least one conduit having a first portion, a second portion and a middle portion, the first portion extending from the first space toward the middle portion and inclined with respect to a horizontal reference plane such that an end of the first portion located within the first space is vertically higher than the middle portion, the second portion extending from the second space toward the middle portion and inclined with respect to the horizontal reference plane such that an end of the second portion located within the second space is vertically higher than the middle portion. The device may further include at least one movable element disposed within the at least one conduit and movable from the first portion of the at least one conduit to the second portion of the at least one conduit in response to a differential pressure between the first and second spaces.

In some embodiments, the conduit includes a conductive material adapted to dissipate electrostatic charge build-up that may otherwise arise therein.

In some embodiments, the air flow traveling through the conduit from one room to an adjacent room may be stopped, reversed or otherwise regulated as desired, by any suitable method regardless of the angle of the apparatus' vertically-adjustable conduit.

Having thus described several aspects of at least one embodiment of the present disclosure, it is to be appreciated various alterations, modifications, and improvements will readily occur to those skilled in the art. Such alterations, modification, and improvements are intended to be part of this disclosure, and are intended to be within the spirit and scope of the present disclosure. Accordingly, the foregoing description and drawings are by way of example only.

What is claimed is:

1. A device for indicating a presence of a directional differential pressure between a first space and a second space separated from the first space by a barrier, the device permitting fluidic pressure connection between the second space and a pivot arm in the first space, the device comprising:
   a first conduit arranged to extend through at least a portion of the barrier separating the first space and the second space;
   a rotating base which is rotatable relative to the first conduit;
   a pivot arm arranged to form a fluidic pressure connection with the first conduit, the pivot arm rotatably attached to the rotating base to permit adjustment of an inclination of the pivot arm relative to a horizontal plane among a plurality of inclination angles in which a first, vertically lower region of the pivot arm is vertically lower than a second, vertically higher region of the pivot arm; and
   at least one movable element disposed within the pivot arm and movable from the first, vertically lower region of the pivot arm to the second, vertically higher region of the pivot arm in response to a differential pressure between the first and second spaces.

2. A device as in claim 1, wherein the pivot arm is rotatably attached to the rotating base to permit adjustment of an inclination of the pivot arm within a plane.

3. A device as in claim 2, wherein the pivot arm is rotatably attached to the rotating base to permit adjustment of an inclination of the pivot arm within a vertical plane.

4. A device as in claim 1, wherein the first conduit, rotating base, and pivot arm form a passageway for fluid.

5. A device as in claim 1, wherein the device indicates a presence of a threshold directional differential pressure.

6. A device as in claim 1, wherein the pivot arm includes a transparent or translucent conduit portion such that the movable element is viewable through the pivot arm.

7. A device as in claim 1, wherein the pivot arm rotates about a pivot arm axis, and further comprising a level configured to indicate whether the pivot arm axis is horizontal.

8. A device as in claim 7, wherein the level is positioned on the rotating base.

9. A device as in claim 1, further comprising a level positioned on the rotating base and configured to indicate whether the device is mounted to the barrier such that an axis of rotation of the rotating base is at a desired orientation.

10. A device as in claim 1, further comprising:
a housing plate configured to be mounted to the barrier; and
a level mounted to the housing plate to indicate whether the housing plate is set at a desired rotation about a roll axis which is perpendicular to the barrier.

11. A device as in claim 1, wherein the pivot arm comprises a second conduit through which the movable element moves, and the device further comprising a first end stop positioned at an end of the second conduit, and wherein the end stop includes an opening.

12. A device as in claim 1, wherein the rotating base rotates about a vertical axis.

13. A device for indicating differential pressure between two spaces, the device permitting fluidic pressure connection of a first space and a second space separated by a barrier, the device comprising:
a first conduit arranged to extend through at least a portion of the barrier separating the first space and the second space;
a pivot arm fluidically connected to the first conduit and arranged to pivot relative to the first conduit to adjust an inclination of the pivot arm within a vertical plane and relative to a horizontal plane among a plurality of inclination angles in which a first, vertically lower region of the pivot arm is vertically lower than a second, vertically higher region of the pivot arm, wherein the first conduit and the pivot arm form a passageway for fluid;
a transition region where the passageway is first surrounded by the pivot arm when traveling in a direction toward the pivot arm, wherein the pivot arm is arranged such that pivoting the pivot arm within the vertical plane does not change a location of the transition region relative to the first conduit; and
at least one movable element disposed within the pivot arm and movable from the first, vertically lower region of the pivot arm to the second, vertically higher region of the pivot arm in response to a differential pressure between the first and second spaces.

14. A device as in claim 13, wherein the pivot arm is connected to the first conduit via a swivel pivot which permits yaw pivoting of the pivot arm.

15. A device as in claim 13, wherein the transition region comprises a cylindrical connector, and wherein the pivot arm pivots about a pivot axis that is co-linear with or parallel to a center axis of the passageway at the transition region.

16. A device for indicating differential pressure between two spaces, the device permitting fluidic pressure connection of a first space and a second space separated by a barrier, the device comprising:
a first conduit arranged to extend through at least a portion of the barrier separating the first space and the second space;
a pivot arm fluidically connected to the first conduit and arranged to pivot relative to the first conduit about a pivot axis, wherein pivoting the pivot arm about the pivot axis adjusts an inclination of the pivot arm relative to a horizontal plane among a plurality of inclination angles in which a first, vertically lower region of the pivot arm is vertically lower than a second, vertically higher region of the pivot arm, and wherein pivoting the pivot arm about the pivot axis does not change a direction of the pivot axis, wherein the first conduit and the pivot arm form a passageway for fluid;
a transition region where the passageway is first surrounded by the pivot arm when traveling in a direction toward the pivot arm, wherein the pivot arm is arranged such that pivoting the pivot arm within the vertical plane does not change a location of the transition region relative to the first conduit; and
at least one movable element disposed within the pivot arm and movable from the first, vertically lower region of the pivot arm to the second, vertically higher region of the pivot arm in response to a differential pressure between the first and second spaces.

17. A device as in claim 16, wherein the pivot arm is arranged such that when the pivot arm is pivoted about the pivot axis, the pivot arm remains in a vertical plane.

18. A device as in claim 16, wherein the pivot arm is pivotable between at least −30° and +30° relative to the horizontal plane.

19. A device as in claim 18, wherein the pivot arm is pivotable by no more than 90° relative to the horizontal plane.

20. A device as in claim 16, further comprising a level positioned to indicate whether the pivot axis is horizontal.

* * * * *